(12) United States Patent
Lee et al.

(10) Patent No.: US 12,167,188 B2
(45) Date of Patent: *Dec. 10, 2024

(54) SOUND GENERATING APPARATUS FOR VEHICLES AND VEHICLE INCLUDING THE SAME

(71) Applicant: LG Display Co., Ltd., Seoul (KR)

(72) Inventors: Sungtae Lee, Paju-si (KR); KwanHo Park, Paju-si (KR); YeongRak Choi, Paju-si (KR); Sungsu Ham, Paju-si (KR); Joongsup Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,749

(22) Filed: Nov. 30, 2023

(65) Prior Publication Data

US 2024/0098396 A1    Mar. 21, 2024

Related U.S. Application Data

(63) Continuation of application No. 17/315,863, filed on May 10, 2021, now Pat. No. 11,950,035.

(30) Foreign Application Priority Data

May 11, 2020   (KR) .................. 10-2020-0056213

(51) Int. Cl.
*H04R 1/02*    (2006.01)
*B60R 11/00*   (2006.01)
(Continued)

(52) U.S. Cl.
CPC .......... *H04R 1/025* (2013.01); *B60R 11/0223* (2013.01); *H04R 1/028* (2013.01);
(Continued)

(58) Field of Classification Search
CPC .......... H04R 1/025; H04R 1/028; H04R 9/06; H04R 17/00; H04R 5/02; H04R 2400/11;
(Continued)

(56) References Cited

U.S. PATENT DOCUMENTS

| 5,684,884 A | 11/1997 | Nakaya et al. |
| 2006/0280321 A1 | 12/2006 | Miura et al. |

(Continued)

FOREIGN PATENT DOCUMENTS

| CN | 109561374 A | 4/2019 |
| CN | 109905801 A | 6/2019 |

(Continued)

OTHER PUBLICATIONS

Office Action dated Jul. 5, 2022, issued in corresponding Taiwanese Patent Application No. 1120665170.
Office Action dated May 31, 2022, issued in corresponding Japanese Patent Application No. 2021-080085.
Office Action dated Dec. 29, 2023 for corresponding Taiwanese Divisional Patent Application No. 11221317490. (Note: CN 110854262 Awas cited in a prior IDS.).

(Continued)

*Primary Examiner* — Sean H Nguyen
(74) *Attorney, Agent, or Firm* — Morgan, Lewis & Bockius LLP

(57) ABSTRACT

A sound generating apparatus for vehicles may include a sound generator including a sound generating member configured to vibrate a vehicle interior material of a vehicle. The sound generating member may include a plurality of vibration generator spaced apart from one another, a first protection member at a first surface of the plurality of vibration generators, and a second protection member at a second surface opposite to the first surface of the plurality of vibration generators.

35 Claims, 13 Drawing Sheets

(51) Int. Cl.

| | | |
|---|---|---|
| *B60R 11/02* | (2006.01) | |
| *H04R 5/02* | (2006.01) | |
| *H04R 9/04* | (2006.01) | |
| *H04R 9/06* | (2006.01) | |
| *H04R 17/00* | (2006.01) | |
| *H04S 3/00* | (2006.01) | |

(52) U.S. Cl.
CPC .............. *H04R 9/046* (2013.01); *H04R 9/06* (2013.01); *H04R 17/00* (2013.01); *B60R 2011/0005* (2013.01); *B60R 2011/0012* (2013.01); *B60R 2011/0021* (2013.01); *B60R 2011/0022* (2013.01); *B60R 2011/0026* (2013.01); *B60R 2011/0028* (2013.01); *B60R 2011/0029* (2013.01); *B60R 2011/0033* (2013.01); *B60R 2011/0035* (2013.01); *B60R 2011/0036* (2013.01); *B60R 2011/0063* (2013.01); *H04R 5/02* (2013.01); *H04R 2400/11* (2013.01); *H04R 2499/13* (2013.01); *H04R 2499/15* (2013.01); *H04S 3/008* (2013.01); *H04S 2400/01* (2013.01)

(58) Field of Classification Search
CPC ............ H04R 2499/13; H04R 2499/15; B60R 11/0223; B60R 2011/0005; B60R 2011/0012; B60R 2011/0021; B60R 2011/0022; B60R 2011/0026; B60R 2011/0028; B60R 2011/0029; B60R 2011/0033; B60R 2011/0035; B60R 2011/0036; B60R 2011/0063; H04S 3/008; H04S 2400/01
USPC .......................................................... 381/86
See application file for complete search history.

(56) References Cited

U.S. PATENT DOCUMENTS

| | | |
|---|---|---|
| 2007/0230732 A1 | 10/2007 | Matsufuji et al. |
| 2009/0184589 A1 | 7/2009 | Yamagishi |
| 2014/0029773 A1 | 1/2014 | Kano et al. |
| 2017/0280216 A1 | 9/2017 | Lee et al. |
| 2019/0182572 A1 | 6/2019 | Kim |
| 2019/0208299 A1 | 7/2019 | Kim et al. |
| 2019/0217773 A1 | 7/2019 | Sasaki et al. |
| 2020/0059733 A1 | 2/2020 | Shin et al. |
| 2020/0154207 A1 | 5/2020 | Ham et al. |
| 2020/0254943 A1 | 8/2020 | Gijrath |
| 2021/0120324 A1 | 4/2021 | Seo et al. |
| 2022/0272437 A1 | 8/2022 | Homma et al. |

FOREIGN PATENT DOCUMENTS

| | | |
|---|---|---|
| CN | 109996142 A | 7/2019 |
| CN | 110040066 A | 7/2019 |
| CN | 110854262 A | 2/2020 |
| JP | H04-097699 A | 3/1992 |
| JP | H07-327297 A | 12/1995 |
| JP | 2004-343453 A | 12/2004 |
| JP | 2005-014793 A | 1/2005 |
| JP | 2007-318623 A | 12/2007 |
| JP | 2019-191587 A | 10/2019 |
| KR | 10-2006-0130492 A | 12/2006 |
| KR | 10-2020-0021392 A | 2/2020 |
| TW | 200629953 A | 8/2006 |
| WO | 2013/121715 A1 | 8/2013 |

OTHER PUBLICATIONS

Office Action dated Sep. 12, 2024 issued in corresponding Korean Patent Application No. 10-2020-0056213. (Note: JP 2005-014793 A, JP H04-097699 A and JP 2004-343453 A were previously cited).

SOUND GENERATING APPARATUS FOR VEHICLES AND VEHICLE INCLUDING THE SAME

CROSS-REFERENCE TO RELATED APPLICATIONS

This application is a continuation of co-pending U.S. patent application Ser. No. 17/315,863, filed on May 10, 2021, which claims the benefit of and priority to Korean Patent Application No. 10-2020-0056213 filed on May 11, 2020. The entirety of each of the above prior U.S. and Korean patent applications is hereby incorporated by reference.

TECHNICAL FIELD

The present disclosure relates to a sound generating apparatus for vehicles and a vehicle including the same.

DISCUSSION OF THE RELATED ART

Vehicles include a sound generating apparatus which outputs a sound based on an audio signal output from a multimedia device such as a car audio device. For example, the sound generating apparatus applied to vehicles may include a front speaker and a rear speaker, which are configured as a coil type.

However, a sound generating apparatus for vehicles has a limitation in outputting a realistic sound or stereo sound of a multichannel through a front speaker and a rear speaker. In the sound generating apparatus for vehicles, in a case where the number of speakers increases, a stereo sound may be output, but due to a size of a speaker based on a coil type and a limitation of a space in vehicles, there is a limitation in increasing the number of speakers.

SUMMARY

The inventors have recognized problems of a sound generating apparatus for vehicles and a vehicle including the same and have performed various experiments on a sound generating apparatus for vehicles, which may output a realistic sound or stereo sound of a multichannel, and a vehicle including the sound generating apparatus. The inventors have invented, through various experiments, a sound generating apparatus for vehicles and a vehicle including the same, in which an interior material of the vehicle is used as a sound vibration plate. Also, based on various experiments, the inventors have invented a sound generating apparatus for realizing a stereo sound and a vehicle including the same.

Accordingly, embodiments of the present disclosure are directed to provide a sound generating apparatus for vehicles and a vehicle including the same that substantially obviate one or more problems due to limitations and disadvantages of the related art.

An aspect of the present disclosure is to provide a sound generating apparatus for vehicles and a vehicle including the same, which may output a sound by a vehicle interior material and/or a vehicle glass window.

Another aspect of the present disclosure is to provide a sound generating apparatus for vehicles and a vehicle including the same, which may output a stereo sound by a vehicle interior material and/or a vehicle glass window.

Additional features and aspects will be set forth in part in the description which follows and in part will become apparent from the description or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a sound generating apparatus for vehicles comprises a sound generating device to be covered by a vehicle interior material of a vehicle, the sound generating device is configured to vibrate the vehicle interior material.

In another aspect of the present disclosure, a vehicle comprises a vehicle interior material covering a vehicle structure, and at least one sound generating apparatus disposed at the vehicle interior material, the vehicle interior material is configured to vibrate according to a vibration of the sound generating apparatus and to output a sound.

The sound generating apparatus for vehicles and the vehicle including the same according to the present disclosure may output a sound or a stereo sound by a vehicle interior material and/or a vehicle glass window.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
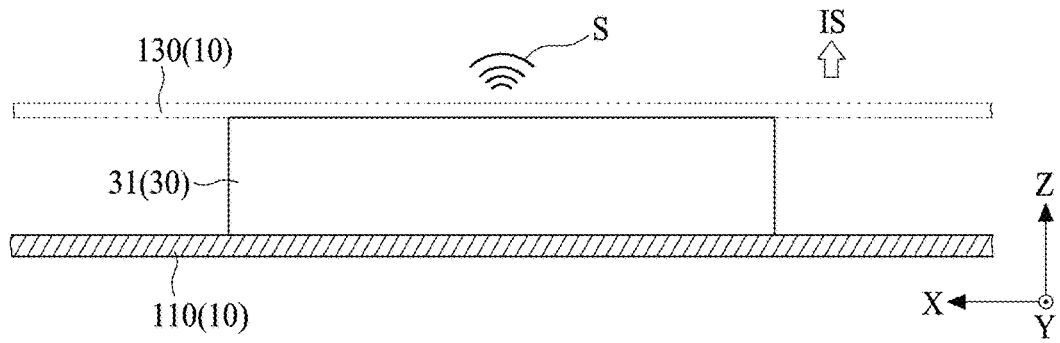
FIG. 1 illustrates a sound generating apparatus for vehicles according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments are not limited thereto, unless otherwise specified.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a sound generating apparatus for vehicles and a vehicle including the same according to embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

FIG. 1 illustrates a sound generating apparatus for vehicles according to an embodiment of the present disclosure.

With reference to FIG. 1, the sound generating apparatus 30 for vehicles according to an embodiment of the present disclosure may include a sound generating device 31 which is disposed or equipped in a vehicle 10 to output a sound S toward one or more of an indoor space IS and an outside of the vehicle 10.

The vehicle 10 may include a structure 110 and an interior material (or an interior finish material or an interior) 130. In the following description, for convenience of description, "the structure 110" may be referred to as "a vehicle structure 110," and "the interior material 130" may be referred to as "a vehicle interior material 130".

The vehicle structure 110 may include a main frame, a side frame, a door frame, a glass window, and a seat frame, but embodiments of the present disclosure are not limited thereto. For example, the main frame may include a dash panel, a pillar panel, a roof panel, and a floor panel, but embodiments of the present disclosure are not limited thereto. For example, the door frame may include a door inner panel and a door outer panel, but embodiments of the present disclosure are not limited thereto.

The vehicle interior material 130 may include all elements configuring an inner portion of the vehicle 10, or may include all elements disposed at the indoor space IS of the vehicle 10. For example, the vehicle interior material 130 may be an interior member or an inner finish material of the vehicle 10, but embodiments of the present disclosure are not limited thereto.

The vehicle interior material 130 according to an embodiment of the present disclosure may cover the vehicle structure 110 at an inner portion or the indoor space IS of the vehicle 10 and may be exposed at the inner portion or the indoor space IS of the vehicle 10. For example, the vehicle interior material 130 may be configured to cover one or more surfaces (or an interior surface) of at least one or more of a main frame (or a vehicle body), a side frame (or a side body), a door frame (or a door body), a handle frame (or a steering hub), and a seat frame, which are exposed at the indoor space IS of the vehicle 10. The vehicle interior material 130 according to an embodiment of the present disclosure may include a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor illumination interior material), a rear view mirror, a glove box, and a sun visor, etc.

The vehicle interior material 130 according to an embodiment of the present disclosure may include one material of plastic, fiber, leather, metal, and glass, but embodiments of the present disclosure are not limited thereto. For example, the vehicle interior material 130 including a plastic material may include an injection material. The vehicle interior material 130 including a plastic material may be an injection material which is implemented by an injection process (or injection molding process) using a thermoplastic resin or a thermosetting resin, but embodiments of the present disclosure are not limited thereto. The vehicle interior material 130 including a fiber material may include at least one or more of a plastic composite fiber, a carbon fiber (or an aramid fiber), and a natural fiber. A surface member 133 including a fiber material may include a textile sheet, a knit sheet, or a nonwoven fabric, but embodiments of the present disclosure are not limited thereto. The vehicle interior material 130 including a leather material may include natural leather or artificial leather, but embodiments of the present disclosure are not limited thereto.

The vehicle interior material 130 according to an embodiment of the present disclosure may include at least one or more of a flat portion (or flat surface portion) and a curved portion (or curved surface portion). For example, the vehicle interior material 130 may have a surface structure corresponding to a surface structure of a corresponding vehicle structure 110, or may have a surface structure which differs from a surface structure of a corresponding vehicle structure 110.

According to an embodiment of the present disclosure, the sound generating apparatus 30 for vehicles may be disposed between the vehicle structure 110 and the vehicle interior material 130 or may be disposed at the vehicle interior material 130. The sound generating apparatus 30 for vehicles may vibrate the vehicle interior material 130 to generate a sound S based on a vibration of the vehicle interior material 130. For example, the sound generating apparatus 30 for vehicles may directly vibrate the vehicle interior material 130 to generate the sound S based on a vibration of the vehicle interior material 130. For example, the sound generating apparatus 30 for vehicles may include one or more sound generating devices 31 which are disposed between the vehicle structure 110 and at least one or more of a dashboard, a pillar interior material, a floor interior material, a roof interior material, a door interior material, a handle interior material, and a seat interior material, or is disposed at one or more of a rear package interior material, an overhead console, a rear view mirror, a glove box, and a sun visor.

The sound generating device 31 may be disposed on the vehicle structure 110 and may be covered by the vehicle interior material 130. For example, the sound generating device 31 may be disposed between the vehicle structure 110 and the vehicle interior material 130, or may be disposed at the vehicle interior material 130.

The sound generating device 31 may be configured to vibrate the vehicle interior material 130 to output the sound S toward one or more of the indoor space IS and the outside of the vehicle 10. According to an embodiment of the present disclosure, the sound generating device 31 may vibrate the vehicle interior material 130 to generate the sound S based on a vibration of the vehicle interior material 130. For example, the sound generating device 31 may directly vibrate the vehicle interior material 130 to generate the sound S based on a vibration of the vehicle interior material 130. The vehicle interior material 130 may perform a function of a vibration plate, a sound vibration plate, or a sound generating plate for outputting the sound S. For example, the vehicle interior material 130 may have a size which is greater than that of the sound generating device 31, and thus, may perform a function of a vibration plate, a sound vibration plate, or a sound generating plate having a large area, thereby enhancing a sound characteristic of a low-pitched sound band. For example, a frequency of a sound of the low-pitched sound band may be 500 Hz or less, but embodiments of the present disclosure are not limited thereto.

The sound generating device 31 according to an embodiment of the present disclosure may include a coil type sound generator or a piezoelectric type sound generator. For example, a sound generator may be referred to as the term such as an actuator, an exciter, a transducer, a vibrator, a vibration member, or a vibration generator, but embodiments of the present disclosure are not limited thereto.

Therefore, the sound generating apparatus 30 for vehicles according to an embodiment of the present disclosure may output the sound S, generated by a vibration of the vehicle interior material 130 based on a vibration of the one or more sound generating devices 31 disposed between the vehicle structure 110 and the vehicle interior material 130, toward the indoor space IS of the vehicle 10, and thus, may use the vehicle interior material 130 as a vibration plate or a sound vibration plate. The sound generating apparatus 30 for vehicles according to an embodiment of the present disclosure may vibrate a corresponding vehicle interior material 130 by one or more of a plurality of sound generating devices 31 disposed between the vehicle structure 110 and the vehicle interior material 130 to output a realistic sound S or stereo sound of a multichannel toward the indoor space IS of the vehicle 10, but embodiments of the present disclosure are not limited thereto.

Figure 2:
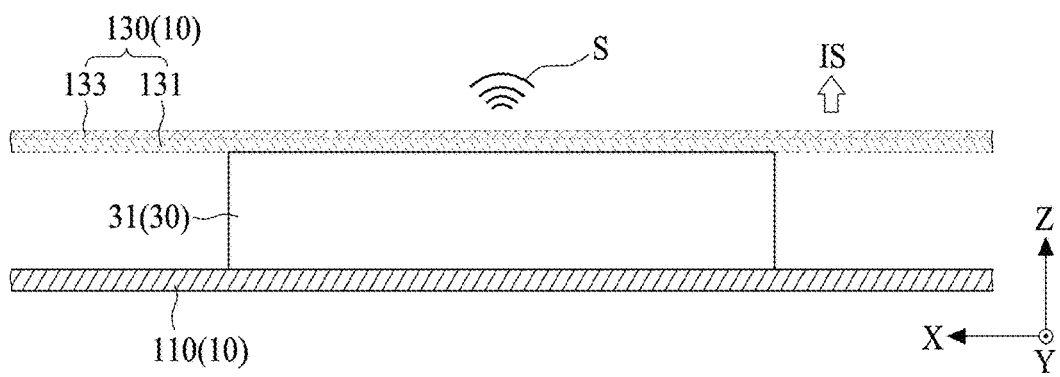
FIG. 2 illustrates a sound generating apparatus for vehicles according to another embodiment of the present disclosure.

FIG. 2 illustrates a sound generating apparatus 30 for vehicles according to another embodiment of the present disclosure. FIG. 2 illustrates an embodiment where an interior material of a vehicle including the sound generating apparatus for vehicles described above with reference to FIG. 1 has been modified. Therefore, in the following description, repetitive descriptions of elements other than a vehicle interior material are omitted or will be briefly given.

With reference to FIG. 2, the sound generating apparatus 30 for vehicles according to another embodiment of the present disclosure may include a sound generating device 31 which vibrates a vehicle interior material 130 to output a sound S.

The vehicle interior material 130 according to an embodiment of the present disclosure may include one or more materials of fiber, leather, cloth, wood, and metal.

The vehicle interior material 130 according to an embodiment of the present disclosure may include a base member 131 and a surface member 133. For example, the base member 131 may be an injection material, a first interior material, an inner interior material, or a rear interior material, but embodiments of the present disclosure are not limited thereto. The surface member 133 may be a second interior material, an outer interior material, a front interior material, an outer surface member, a reinforcement member, or a decoration member, but embodiments of the present disclosure are not limited thereto.

The base member 131 may include a plastic material. The base member 131 according to an embodiment of the present disclosure may include an injection material. For example, the base member 131 may be an injection material which is implemented by an injection process (or injection molding process) using a thermoplastic resin or a thermosetting resin, but embodiments of the present disclosure are not limited thereto. The base member 131 may be configured to cover a vehicle structure 110 in an inner portion or an indoor space IS of a vehicle 10. For example, the base member 131 may be configured to cover one or more surfaces (or an inner surface) of at least one or more of a main frame, a side frame, a door frame, and a handle frame, which are exposed at the indoor space IS of the vehicle 10.

The base member 131 may include one or more of a flat portion (or flat surface portion) and a curved portion (or curved surface portion). For example, the base member 131 may have a surface structure corresponding to a surface structure of a corresponding vehicle structure 110, or may have a surface structure which differs from a surface structure of a corresponding vehicle structure 110.

The surface member (or outer surface member) 133 may be disposed on the base member 131. The surface member 133 may cover the base member 131 at the inner portion or the indoor space IS of the vehicle 10 and may be exposed at the inner portion or the indoor space IS of the vehicle 10. For example, the surface member 133 may be disposed at or coupled to a front surface of the base member 131 exposed at the indoor space IS of the vehicle 10.

The surface member 133 according to an embodiment may include a fiber, leather, cloth, wood, and metal. For example, the surface member 133 including a fiber material may include one or more of a synthetic fiber, a carbon fiber (or an aramid fiber), and a natural fiber. For example, the surface member 133 including a fiber material may be a textile sheet, a knit sheet, or a nonwoven fabric, but embodiments of the present disclosure are not limited thereto. For example, the surface member 133 including a fiber material may be a fabric member, but embodiments of the present disclosure are not limited thereto.

The synthetic fiber may be a thermoplastic resin and may include a polyolefin-based fiber which is an eco-friendly material which does not relatively release a harmful substance. For example, the polyolefin-based fiber may include a polyethylene fiber, a polypropylene fiber, or a polyethylene terephthalate fiber. The polyolefin-based fiber may be a fiber of a single resin or a fiber of a core-shell structure.

The natural fiber may be a composite fiber of one or two or more of a jute fiber, a kenaf fiber, an abaca fiber, a coconut fiber, and a wood fiber.

The sound generating device 31 may be disposed on the vehicle structure 110 and may be covered by the vehicle interior material 130. For example, the sound generating device 31 may be disposed between the vehicle structure 110 and the vehicle interior material 130. Except for that the sound generating device 31 is configured to vibrate the vehicle interior material 130 including the base member 131 and the surface member 133 to output a sound S toward one or more of the indoor space IS and the outside of the vehicle 10, the sound generating device 31 may be the same as or similar to the sound generating device 31 described above with reference to FIG. 1, and thus, its repetitive description may be omitted.

Therefore, the sound generating apparatus 30 for vehicles according to another embodiment of the present disclosure may output the sound S toward one or more of the indoor space IS and the outside of the vehicle 10 by the vehicle interior vibration plate as a vibration plate or a sound vibration plate and may output a realistic sound S or stereo sound of a multichannel toward one or more of the indoor space IS and the outside of the vehicle 10.

Figure 3:
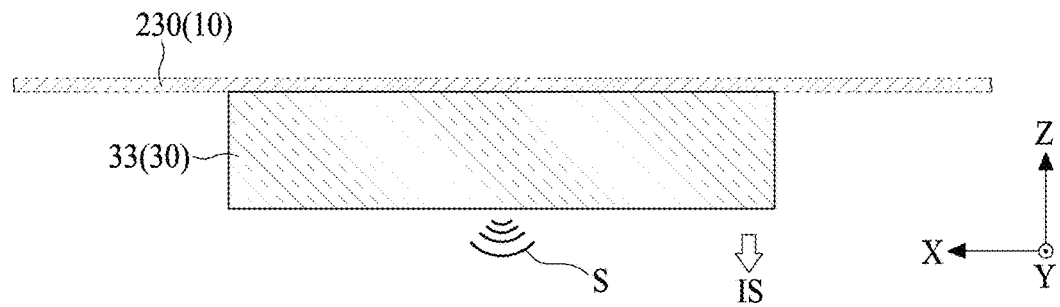
FIG. 3 illustrates a sound generating apparatus for vehicles according to another embodiment of the present disclosure.

FIG. 3 illustrates a sound generating apparatus 30 for vehicles according to another embodiment of the present disclosure.

With reference to FIG. 3, the sound generating apparatus 30 for vehicles according to another embodiment of the present disclosure may include a sound generating device 133 which is disposed at a vehicle glass window 230 of the vehicle 10 and outputs a sound S. In the following description, for convenience of description, "the vehicle glass window 230 of the vehicle 10" may be referred to as "a vehicle glass window 230".

The vehicle glass window 230 of the vehicle 10 may include one or more of a front glass window and a side glass window. The vehicle glass window 230 may further include one or more of a rear glass window and a roof glass window.

The vehicle glass window 230 according to an embodiment of the present disclosure may be configured to be wholly transparent. According to another embodiment of the present disclosure, the vehicle glass window 230 may include a transparent portion and a semitransparent portion surrounding the transparent portion. The vehicle glass window 230 according to another embodiment of the present disclosure may include a transparent portion and an opaque portion surrounding the transparent portion.

The sound generating device 33 may be configured to be transparent or semitransparent. For example, when the vehicle glass window 230 is wholly transparent, the sound generating device 33 may be configured to be transparent and may be disposed at a middle region or a peripheral region of the vehicle glass window 230. When the vehicle glass window 230 includes the semitransparent portion or the opaque portion, the sound generating device 33 may be configured to be semitransparent or opaque and may be disposed at the semitransparent portion or the opaque portion of the vehicle glass window 230. For example, the sound generating device 33 may be one among a transparent sound generating device, a semitransparent sound generating device, and an opaque sound generating device.

The sound generating device 33 may be disposed at one surface (or an indoor surface) exposed at the inner portion or the indoor space IS of the vehicle 10, but embodiments of the present disclosure are not limited thereto. For example, the sound generating apparatus 30 for vehicles may include at least one sound generating device 33 disposed at the vehicle glass window 230, or may include a plurality of sound generating devices 33 disposed at the vehicle glass window 230. In an embodiment of the present disclosure, the sound generating device 33 may be disposed at one or more of the front glass window and the side glass window, and may be additionally disposed at one or more of the rear glass window and the roof glass window.

The sound generating device 31 may output the sound S toward one or more of the indoor space IS and the outside of the vehicle 10 by vibrating itself, or may vibrate the vehicle glass window 230 to output the sound S toward one or more of the indoor space IS and the outside of the vehicle 10.

Therefore, the vehicle glass window 230 according to another embodiment of the present disclosure may be disposed at the vehicle glass window 230 and may output the sound S toward one or more of the indoor space IS and the outside of the vehicle 10 by vibrating itself or by the vehicle glass window 230 as a vibration plate or a sound vibration plate, and moreover, may output a realistic sound S or stereo sound of a multichannel toward one or more of the indoor space IS and the outside of the vehicle 10.

Figure 4:
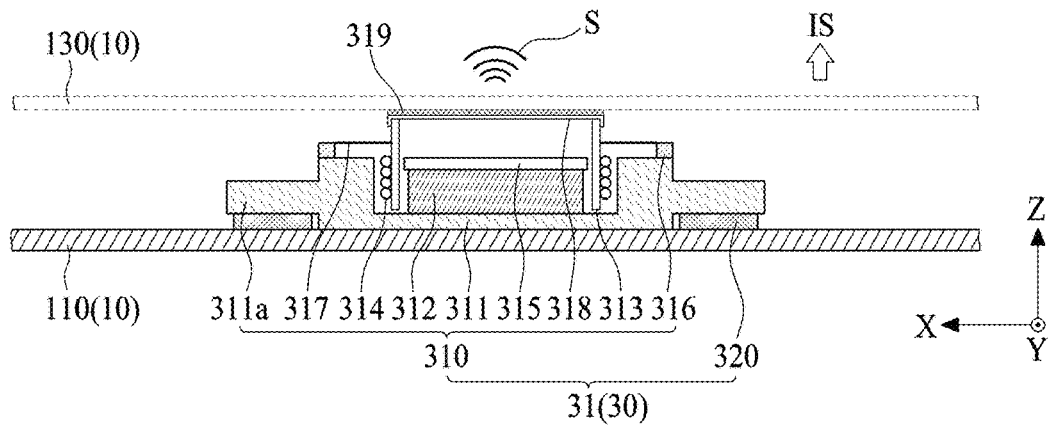
FIG. 4 illustrates a sound generating device according to an embodiment of the present disclosure.

FIG. 4 illustrates a sound generating device according to an embodiment of the present disclosure and illustrates the sound generating device described above with reference to FIG. 1 or FIG. 2.

With reference to FIG. 4, the sound generating device 31 according to an embodiment of the present disclosure may include a sound generator 310 which is disposed to contact a vehicle interior material 130.

The sound generator 310 may include an actuator, an exciter, a transducer, a tweeter, a tweeter speaker, a vibrator, a vibration member, or a vibration generator which uses a bobbin, a coil, and a magnet.

The sound generator 310 according to an embodiment of the present disclosure may include a first frame 311, a magnet 312, a bobbin 313, and a coil 314. The sound generator 310 according to an embodiment of the present disclosure may further include a center pole 315, a second frame 316, and a damper 317.

The first frame 311 may be disposed at or fixed to the vehicle structure 110. The first frame 311 may support one or more of the magnet 312, the center pole 315, and the second frame 316. The first frame 311 may include a metal material having magnetism like iron (Fe). The first frame 311 may be referred to as a base frame, a lower plate, a base plate, or a yoke, but embodiments of the present disclosure are not limited thereto.

The first frame 311 may include a groove portion which accommodates the magnet 312 and the bobbin 313. For example, the groove portion may be formed to be concave from a top surface of the first frame 311 so as to have a circular shape or an elliptical shape (or oval shape).

The magnet 312, the bobbin 313, and the coil 314 may be disposed at the first frame 311 to vibrate the vehicle interior material 130, and thus, may be referred to as a magnetic circuit unit, a magnetic circuit part, a magnetic vibration unit, or a magnetic vibration part.

The magnetic circuit part according to an embodiment of the present disclosure may have an external magnetic type or dynamic type structure where the magnet 312 is disposed outside the coil 314, or may have an internal magnetic type or micro type structure where the magnet 312 is disposed inward from the coil 314. The sound generator 310 including the magnetic circuit part having the internal magnetic type structure may be low in leakage magnetic flux and may have a totally small size. The sound generator 310 according to an embodiment of the present disclosure may have the external magnetic type or internal magnetic type structure. In the following description, it may be assumed that the sound generator 310 has the internal magnetic type structure.

The magnet 312 may be inserted or accommodated into the groove portion of the first frame 311. The magnet 312 may be a permanent magnet having a shape, which may be inserted or accommodated into the bobbin 313.

The bobbin 313 may be disposed on the first frame 311 to surround a periphery of the magnet 312. For example, the bobbin 313 may include a ring structure which includes a material produced by processing pulp or paper, aluminum or magnesium or an alloy thereof, a synthetic resin such as polypropylene, or a polyamide-based fiber, but embodiments of the present disclosure are not limited thereto. The bobbin 313 may vibrate (for example, a vertical reciprocating motion) based on a magnetic force, and thus, may vibrate the vehicle interior material 130 to generate a sound S based on a vibration of the vehicle interior material 130.

The bobbin 313 according to an embodiment of the present disclosure may have a circular shape or an elliptical shape (or oval shape), but embodiments of the present disclosure are not limited thereto. The bobbin 313 having an oval shape may have an elliptical shape, a rectangular shape with rounded corners, or a noncircular curved shape having a width different from its height, but embodiments of the present disclosure are not limited thereto. For example, in the bobbin 313 having an oval shape, a ratio of a diameter of a long axis to a diameter of a short axis may be adjusted to 1.3:1 to 2:1. The bobbin 313 having an oval shape may more improve a sound of a high-pitched sound band than a circular bobbin and the occurrence of heat by a vibration may be reduced, and thus, the bobbin 313 may have an excellent heat dissipation characteristic.

The coil 314 according to an embodiment of the present disclosure may be wound to surround an outer circumference surface of the bobbin 313 and may be supplied with a sound signal (or a voice signal) from the outside. The coil

314 may be raised or lowered along with the bobbin 313. When a current is applied to the coil 314, the entire bobbin 313 may vibrate according to Fleming's left hand rule based on an applied magnetic field generated around the coil 314 and an external magnetic field generated around the magnet 312, and for example, may perform a vertical (or up-and-down) reciprocating motion along a thickness direction Z of the vehicle interior material 130. For example, the coil 314 may be referred to as a voice coil, but embodiments of the present disclosure are not limited thereto.

The center pole 315 may be accommodated or inserted into the bobbin 313 and may guide the raising or lowering of the bobbin 313. For example, the center pole 315 may be inserted or accommodated into the bobbin 313, and thus, an outer circumference surface of the center pole 315 may be surrounded by the bobbin 313. The center pole 315 may be referred to as an elevation guider or pole pieces, but embodiments of the present disclosure are not limited thereto.

The second frame 316 may be disposed at a periphery of the front surface of the first frame 311. The second frame 316 may support the damper 317. The second frame 316 according to an embodiment of the present disclosure may be implemented by a certain height at the periphery of the front surface of the first frame 311 to have the same shape as that of the bobbin 313. According to another embodiment of the present disclosure, the second frame 316 may include a hollow portion which is formed by a certain height at the periphery of the front surface of the first frame 311 and has the same shape as that of the bobbin 313. For example, the second frame 316 may be omitted. For example, the second frame 316 may be an edge frame, but embodiments of the present disclosure are not limited thereto.

The damper 317 may be connected between the second frame 316 and the magnetic circuit part. For example, the damper 317 may be connected between the second frame 316 and the bobbin 313. The damper 317 may be referred to as a spider, a suspension, or an edge, but embodiments of the present disclosure are not limited thereto.

One portion of the damper 317 according to an embodiment of the present disclosure may be connected to the second frame 316, and the other portion of the damper 317 may be connected to an outer surface of the upper portion of the bobbin 313. The damper 317 may be provided in a creased or wrinkled structure which is creased between the one end and the other end thereof and may be contracted and relaxed based on a vertical motion (or up-and-down movement) of the bobbin 313 to control a vibration of the bobbin 313. The damper 317 may be connected between the bobbin 313 and the second frame 316, and thus, may limit or control a vibration distance of the bobbin 313 by a restoring force of the damper 317. For example, when the bobbin 313 vibrates by a certain distance or more or vibrates by a certain distance or less, the bobbin 313 may be restored to its original position by the restoring force of the damper 317.

According to an embodiment of the present disclosure, when the second frame 316 is omitted, the damper 317 may be connected between the first frame 311 and the bobbin 313.

Because the sound generating device 31 or the sound generator 310 is disposed between the vehicle structure 110 and the vehicle interior material 130, the sound generating device 31 or the sound generator 310 should have a relatively thin thickness, and due to this, when a height (or a thickness) of the bobbin 313 is reduced, there may be a problem where a sound pressure level is lowered. Therefore, the inventors have designed a structure where an area of the damper 317 disposed near the bobbin 313 is widely enlarged, to solve a problem where a sound pressure level is lowered due to a reduction in a height of the bobbin 313. When an area of the damper 317 is adjusted to be large, the inventors have recognized that a disposed space of a line for applying a current to the coil 314 is narrowed, and thus, interference between the line and the damper 317 occurs. Therefore, through various experiments, the inventors have configured the damper 317 so that the damper 317 includes a conductor and performs a function of a line.

The damper 317 according to an embodiment of the present disclosure may include a metal material which is electrically connected to the coil 314. For example, the damper 317 may include stainless steel or copper (Cu), but embodiments of the present disclosure are not limited thereto.

The sound generator 310 according to an embodiment of the present disclosure may further include a bobbin protection member 318.

The bobbin protection member 318 may be disposed on a front surface (or a front end portion) of the bobbin 313 and may transfer the raising or lowering (or vibration) of the bobbin 313 to the vehicle interior material 130. The bobbin protection member 318 according to an embodiment of the present disclosure may have a ring shape which is attached on a front surface of the bobbin 313, a disc shape which covers the whole front surface of the bobbin 313, or a gap shape which surrounds the front surface and an upper outer surface of the bobbin 313. The bobbin protection member 318 may be referred to as a bobbin ring, but embodiments of the present disclosure are not limited thereto.

According to an embodiment of the present disclosure, the bobbin protection member 318 may be connected or coupled to the vehicle interior material 130 by an adhesive member 319.

The adhesive member 319 may include a double-sided tape, a double-sided foam tape, a double-sided foam pad, a double-sided foam pad tape, a double-sided adhesive pad, a double-sided adhesive gap pad, or a double-sided adhesive foam pad, which includes an adhesive resin or an adhesive layer, but embodiments of the present disclosure are not limited thereto. According to an embodiment of the present disclosure, an adhesive resin or an adhesive layer of the adhesive member 319 may include an acryl-based adhesive material or a urethane-based adhesive material, but embodiments of the present disclosure are not limited thereto. For example, the adhesive resin or the adhesive layer of the adhesive member 319 may include an acryl-based adhesive material having a characteristic which is relatively high in hardness compared to a urethane-based adhesive material having a relatively ductile characteristic, so that a vibration of the bobbin 313 is transferred to the vehicle interior material 130 without loss of vibration.

The sound generator 310 according to an embodiment of the present disclosure may be disposed in or fixed to the vehicle structure 110 by a coupling member (or a module coupling member) 320.

The coupling member 320 may be disposed between the vehicle structure 110 and the sound generator 310. The first frame 311 may be configured to be disposed at or fixed to the vehicle structure 110 by the coupling member 320. Therefore, the first frame 311 may be supported by or coupled to the vehicle structure 110. For example, the first frame 311 of the sound generator 310 may further include an extension portion 311a. The extension portion 311a may be extended or protruded from a side surface of the first frame 311.

The coupling member 320 according to an embodiment of the present disclosure may be disposed between the vehicle structure 110 and the extension portion 311a of the first frame 311. For example, the coupling member 320 may include a double-sided tape, a double-sided foam tape, a double-sided foam pad, a double-sided foam pad tape, a double-sided adhesive pad, a double-sided adhesive gap pad, or a double-sided adhesive foam pad, which includes an adhesive resin or an adhesive layer, but embodiments of the present disclosure are not limited thereto. For example, an adhesive resin or an adhesive layer of the coupling member 320 may include an acryl-based adhesive material or a urethane-based adhesive material, but embodiments of the present disclosure are not limited thereto.

The coupling member 320 according to an embodiment of the present disclosure may include a plurality of screws. The plurality of screws may pass through the extension portion 311a of the base frame 311 and may be fastened to the vehicle structure 110, and thus, the sound generator 310 may be disposed at the vehicle structure 110.

The coupling member 320 according to an embodiment of the present disclosure may include a bolt and a nut. For example, the nut may be disposed at or fixed to the vehicle structure 110 which overlaps the extension portion 311a of the base frame 311. The bolt may pass through the extension portion 311a of the base frame 311 and may be fastened to the nut. The nut according to an embodiment of the present disclosure may be a self-clinching nut which is disposed at the vehicle structure 110, and the self-clinching nut may be PEM@ nut.

Figure 5:
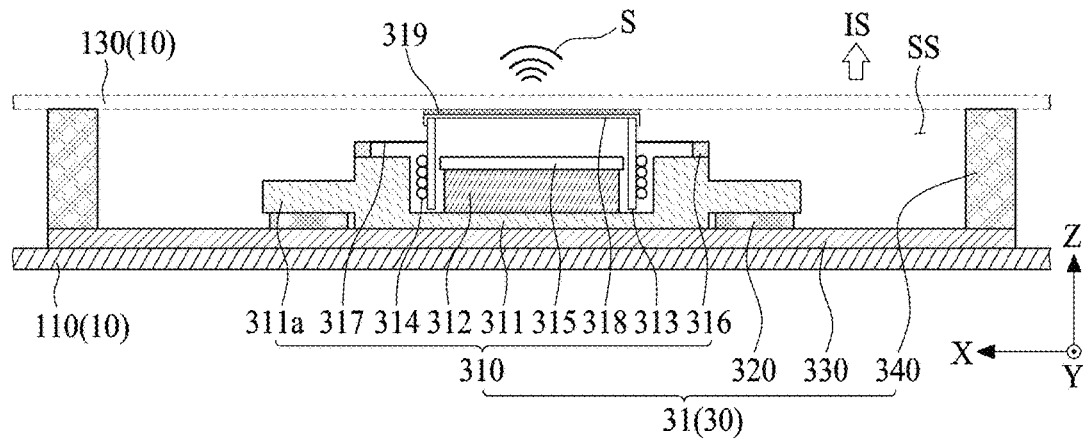
FIG. 5 illustrates a sound generating device according to another embodiment of the present disclosure.

FIG. 5 illustrates a sound generating device according to another embodiment of the present disclosure and illustrates the sound generating device described above with reference to FIG. 1 or FIG. 2.

With reference to FIG. 5, the sound generating device 31 according to another embodiment of the present disclosure may include a sound generator 310, a supporting member 330, and a connection member 340.

The sound generator 310 may be disposed to contact a vehicle interior material 130 and may be substantially the same as the sound generator 310 described above with reference to FIG. 4, and thus, its repetitive description may be omitted.

The supporting member 330 may be supported by a vehicle structure 110 and may support the sound generator 310. The supporting member 330 may be configured to support a first frame 311 of the sound generator 310. For example, the supporting member 330 may be mounted on the vehicle structure 110, or may be coupled to the vehicle structure 110 by an adhesive member.

According to an embodiment of the present disclosure, the supporting member 330 may include a plastic material or a metal material, but embodiments of the present disclosure are not limited thereto. For example, the supporting member 330 may be referred to as a plate mechanism, a base structure, a base mechanism, a module supporting frame, a supporting frame, a module supporting plate, or a supporting plate, but embodiments of the present disclosure are not limited thereto.

The connection member 340 may be disposed between the supporting member 330 and the vehicle interior material 130. For example, the connection member 340 may be disposed at the supporting member 330 to surround the sound generator 310 and may be connected to the vehicle interior material 130. For example, the connection member 340 may be disposed at a periphery portion of the supporting member 330 and may surround the sound generator 310. The connection member 340 may provide a sound space SS which surrounds the sound generator 310, between the vehicle interior material 130 and the supporting member 330. For example, the sound space SS may be referred to as a sound box, sound portion, a resonance box, a resonance portion, or an acoustic space, but embodiments of the present disclosure are not limited thereto. For example, the sound generator 310 may be disposed at a sound space SS which is surrounded by the vehicle interior material 130, the supporting member 330, and the connection member 340.

The connection member 340 according to an embodiment of the present disclosure may define and limit a vibration region of the vehicle interior material 130 which is vibrated by the sound generator, thereby minimizing or preventing interference between a vibration performed at the vibration region of the vehicle interior material 130 and a vibration performed in a region other than the vibration region. For example, the connection member 340 may be referred to as a partition or an enclosure defining the sound space SS, but embodiments of the present disclosure are not limited thereto.

The connection member 340 according to an embodiment of the present disclosure may include a double-sided tape, a double-sided foam tape, a double-sided foam pad, a double-sided foam pad tape, a double-sided adhesive pad, a double-sided adhesive gap pad, or a double-sided adhesive foam pad, which includes an adhesive resin or an adhesive layer, but embodiments of the present disclosure are not limited thereto. For example, an adhesive resin or an adhesive layer of the connection member 340 may include an acryl-based adhesive material or a urethane-based adhesive material, but embodiments of the present disclosure are not limited thereto. For example, the adhesive resin or the adhesive layer of the connection member 340 may include a urethane-based adhesive material having a relatively ductile characteristic compared to an acryl-based adhesive material having a characteristic which is relatively high in hardness, thereby minimizing or preventing a vibration of the vehicle interior material 130 from being transferred to the supporting member 330 or the vehicle structure 110.

The sound generator 310 may be disposed at or fixed to the supporting member 330 by a coupling member 320. For example, the coupling member 320 may couple the extension portion 311a of the first frame 311 to the supporting member 330, and thus, the sound generator 310 and the supporting member 330 may be implemented or integrated as one body.

According to another embodiment of the present disclosure, the sound generating device 31 may be a single structure body or a single structure where the sound generator 310 and the supporting member 330 are modularized as one body or one element. For example, the sound generator 310 and the supporting member 330 may be manufactured as a finished-product type such as a single structure body or a single structure by a modularization process (or an assembly process), and then, the sound generating device 31 may be mounted or disposed between the vehicle structure 110 and the vehicle interior material 130 by a relatively simple part mounting (or positioning) process when an assembly process is performed on the vehicle 10. Accordingly, according to an embodiment of the present disclosure, in a process of placing or assembling the sound generating device 31 in the vehicle 10, the assemblability of the sound generating device 31 may be improved in a process of assembling devices, thereby enhancing a production yield ratio.

Figure 6:
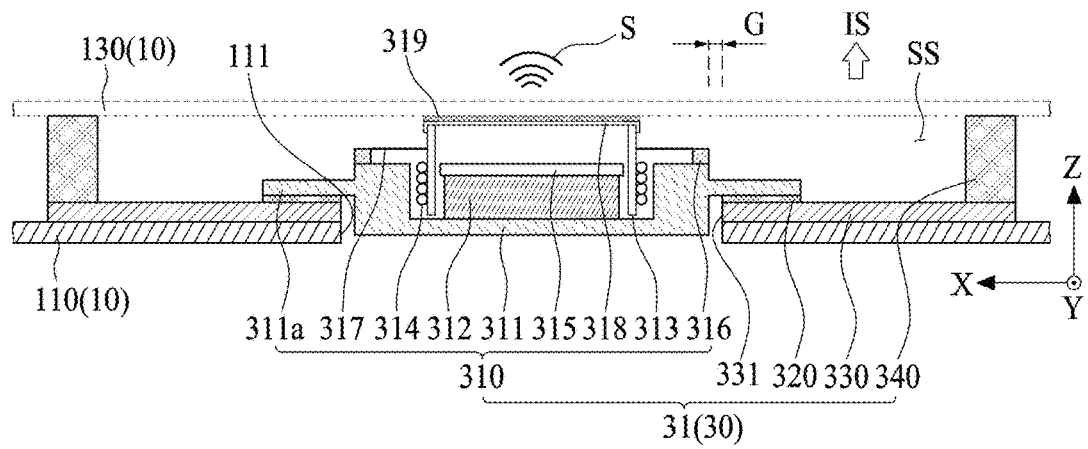
FIG. 6 illustrates a sound generating device according to another embodiment of the present disclosure.

FIG. 6 illustrates a sound generating device according to another embodiment of the present disclosure and illustrates an embodiment where a configuration of the supporting member of the sound generating device described above with reference to FIG. 5 has been modified. Therefore, in the following description, a supporting member of a sound generating device and elements relevant thereto will be mainly described, and the other same elements will be briefly described or will be omitted.

With reference to FIG. 6, in the sound generating device 31 according to another embodiment of the present disclosure, a supporting member 330 may further include a hole 331 which overlaps a sound generator 310.

The hole 331 may pass through the supporting member 330 to accommodate a portion of a rear surface of the sound generator 310. The hole 331 may be formed to pass through the supporting member 330 and may expose the rear surface of the sound generator 310 at a vehicle structure 110. For example, the hole 331 may have a circular shape, an oval shape, or a polygonal shape, but embodiments of the present disclosure are not limited thereto.

The hole 331 according to an embodiment of the present disclosure may have a size which enables a portion of the rear surface of the sound generator 310 to be accommodated thereinto. The sound generator 310 accommodated into the hole 331 may be spaced apart from the supporting member 330 to have a certain gap G therebetween. The gap G between the sound generator 310 and a side surface of the supporting member 330, which defines the hole 331 or is exposed at the hole 331, may be about 1 mm, but embodiments of the present disclosure are not limited thereto. For example, when the gap G is less than 1 mm, an abnormal vibration may occur while the sound generator 310 inserted into the hole 331 is vibrating, and thus, the gap G may be adjusted to 1 mm or more.

In the sound generating device 31 according to another embodiment of the present disclosure, a portion of the rear surface of the sound generator 310 may be accommodated into the hole 331 of the supporting member 330, and thus, a thickness of the sound generating device 31 may be reduced or slimmed.

The vehicle structure 110 may further include a groove portion 111 for accommodating a portion of the rear surface of the sound generator 310 passing through the hole 331 of the supporting member 330. The vehicle structure 110 may directly face the sound generator 310 of the sound generating device 31, and thus, may dissipate heat of the sound generator 310 occurring when the sound generator 310 is being driven.

Figure 7:
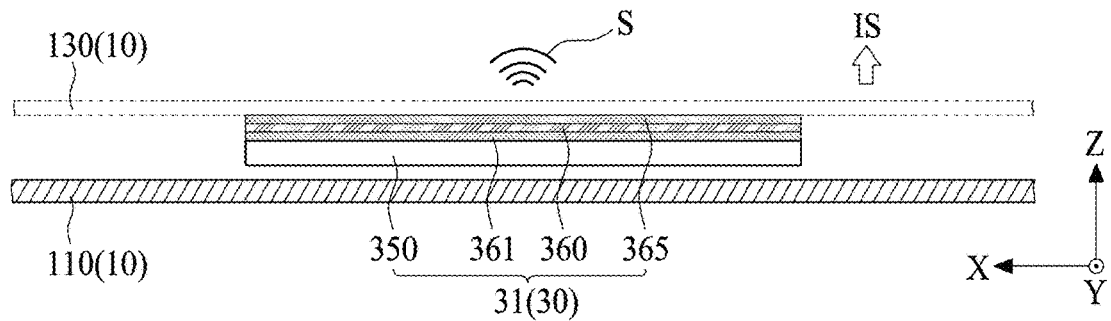
FIG. 7 illustrates a sound generating device according to another embodiment of the present disclosure.

FIG. 7 illustrates a sound generating device according to another embodiment of the present disclosure and illustrates the sound generating device described above with reference to FIG. 1 or FIG. 2.

With reference to FIG. 7, the sound generating device 31 according to another embodiment of the present disclosure may include a sound generator 350 which is connected or attached to a vehicle interior material 130 by an adhesive member 361.

The sound generator 350 may be referred to as a vibration member, a piezoelectric vibrator, a piezoelectric vibration member, a piezoelectric actuator, a piezoelectric exciter, a piezoelectric speaker, a piezoelectric tweeter, a film tweeter, a piezoelectric film actuator, a sound film actuator, a film exciter, a piezoelectric film speaker, a sound film speaker, a sound film tweeter, or a piezoelectric film tweeter, which includes a piezoelectric element having a piezoelectric characteristic, but embodiments of the present disclosure are not limited thereto.

The sound generator 350 may be disposed between the vehicle structure 110 and the vehicle interior material 130 and may vibrate the vehicle interior material 130 to output a sound S. For example, the sound generator 350 may alternately and repeatedly contract and expand based on a piezoelectric effect (or a piezoelectric characteristic) based on a sound signal (or a voice signal) applied from the outside to vibrate and may vibrate the vehicle interior material 130 by a vibration, and thus, the sound S may be generated based on a vibration of the vehicle interior material 130. For example, the sound generator 350 may directly vibrate the vehicle interior material 130, and thus, the sound S may be generated based on a vibration of the vehicle interior material 130. For example, the sound generator 350 may generate a sound S of a middle-high-pitched sound band having a frequency of 500 Hz or more, but embodiments of the present disclosure are not limited thereto.

According to an embodiment of the present disclosure, the sound generator 350 may be spaced apart from the vehicle structure 110, but embodiments of the present disclosure are not limited thereto. For example, a separation space between the sound generator 350 and the vehicle structure 110 may be configured so that a vibration of the sound generator 350 is smooth, but embodiments of the present disclosure are not limited thereto. For example, the separation space between the sound generator 350 and the vehicle structure 110 may be a vibration space of the sound generator 350.

The adhesive member 361 may be a first adhesive member 361. The first adhesive member 361 may be disposed between the sound generator 350 and the vehicle interior material 130. The first adhesive member 361 may be configured to connect or attach the sound generator 350 to the vehicle interior material 130.

The first adhesive member 361 may include a double-sided tape, a double-sided foam tape, a double-sided foam pad, a double-sided foam pad tape, a double-sided adhesive pad, a double-sided adhesive gap pad, or a double-sided adhesive foam pad, which includes an adhesive resin or an adhesive layer, but embodiments of the present disclosure are not limited thereto. For example, an adhesive resin or an adhesive layer of the first adhesive member 361 may include an acryl-based adhesive material or a urethane-based adhesive material, but embodiments of the present disclosure are not limited thereto. For example, the adhesive resin or the adhesive layer of the first adhesive member 361 may include an acryl-based adhesive material having a characteristic which is relatively high in hardness compared to a urethane-based adhesive material having a relatively ductile characteristic, so that a vibration of the sound generator 350 is transferred to the vehicle interior material 130 without loss of vibration.

The sound generating device 31 according to another embodiment of the present disclosure may further include a plate 360 which is disposed between the sound generator 350 and the vehicle interior material 130.

The plate 360 may be a vibration plate 360. The vibration plate 360 may vibrate the vehicle interior material 130 in response to a vibration of the sound generator 350. For example, the vibration plate 360 may vibrate based on a vibration of the sound generator 350 and may transfer a vibration of the sound generator 350 to the vehicle interior material 130, thereby vibrating the vehicle interior material 130.

The vibration plate 360 according to an embodiment of the present disclosure may include at least one of a plastic material, a metal material, and a wood material. In an embodiment of the present disclosure, the vibration plate 360 may include one or more of a plastic material, a metal material, and a wood material. In another embodiment of the present disclosure, the vibration plate 360 may include a multilayer including two or more of a plastic layer, a metal layer, and a wood layer. For example, when the vibration plate 360 includes a metal material or a metal layer, the vibration plate 360 may include one or more materials of aluminum (Al), a magnesium (Mg), a magnesium (Mg) alloy, a magnesium-lithium (Mg—Li) alloy, and an Al alloy, but embodiments of the present disclosure are not limited thereto. For example, the Mg alloy may include one or more materials of Al, zinc (Zn), and manganese (Mn). The Mg alloy may be a lightest material of metal materials usable as a vibration plate of a speaker, may have relatively high non-rigidity (stiffness/specific gravity) and relatively high vibration damping ability (ability to absorb and progressively reduce vibration), and may be good in dimension stability with respect to a variation of a temperature and the elapse of time. Accordingly, the vibration plate 360 may enhance a characteristic of a sound S generated based on a vibration of the vehicle interior material 130 responding to a vibration of the sound generator 350.

The vibration plate 360 may be attached or coupled to the sound generator 350 by the first adhesive member 361. The vibration plate 360 may be attached or coupled to the vehicle interior material 130 of a vehicle 10 by an adhesive member 365. For example, the adhesive member 365 may be a second adhesive member 365. The second adhesive member 365 may include the same material as that of the first adhesive member 361, but embodiments of the present disclosure are not limited thereto.

When the sound generating device 31 according to another embodiment of the present disclosure further includes the vibration plate 360, the vehicle interior material 130 may include a fiber material, but embodiments of the present disclosure are not limited thereto.

Therefore, the sound generating device 31 according to another embodiment of the present disclosure may vibrate the vehicle interior material 130 by the sound generator 350 including a piezoelectric element, and thus, may output the sound S or a stereo sound toward one or more of the indoor space IS and the outside of the vehicle 10. Also, the sound generating device 31 according to another embodiment of the present disclosure may include the sound generator 350 including a piezoelectric element, and thus, may have a thin thickness. Accordingly, the sound generating device 31 according to another embodiment of the present disclosure may be disposed between the vehicle structure 110 and the vehicle interior material 130 without changing a structure of the vehicle structure 110 and/or the vehicle interior material 130.

When the vehicle glass window 230 includes an opaque region, the sound generating device 31 according to another embodiment of the present disclosure may be disposed at an opaque region of the vehicle glass window 230. For example, the opaque region of the vehicle glass window 230 may be a periphery portion of the vehicle glass window 230, but embodiments of the present disclosure are not limited thereto. The sound generating device 31 according to another embodiment of the present disclosure may output the sound S toward one or more of the indoor space IS and the outside of the vehicle 10 by vibrating itself, or may vibrate the opaque region of the vehicle glass window 230 to output the sound S toward one or more of the indoor space IS and the outside of the vehicle 10.

Moreover, as described above with reference to FIG. 3, the sound generating device 31 according to another embodiment of the present disclosure may be disposed at the vehicle glass window 230, and in this case, the sound generator 350 may be configured to be transparent or semitransparent. For example, a piezoelectric vibration portion of the sound generator 350 may be configured to be transparent or semitransparent and may be disposed at the vehicle glass window 230 by a transparent or semitransparent adhesive member. The sound generating device 31 including a transparent or semitransparent sound generator 350 may output the sound S toward one or more of the indoor space IS and the outside of the vehicle 10 by vibrating itself, or may vibrate the vehicle glass window 230 to output the sound S toward one or more of the indoor space IS and the outside of the vehicle 10.

Figure 8:
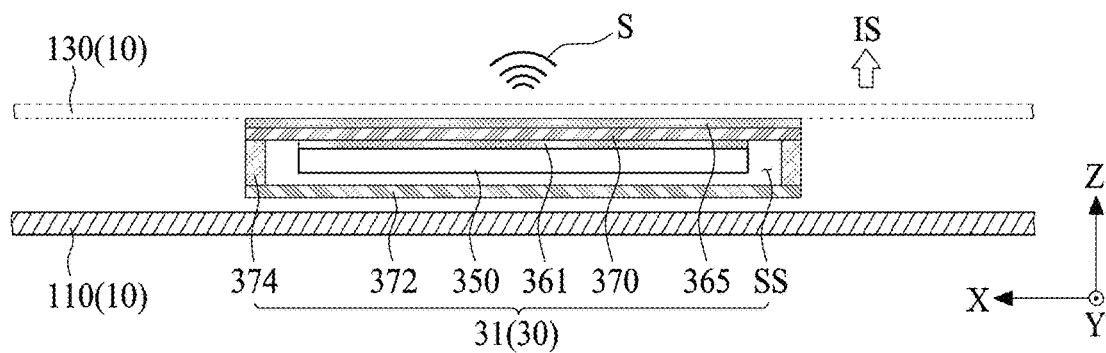
FIG. 8 illustrates a sound generating device according to another embodiment of the present disclosure.

FIG. 8 illustrates a sound generating device according to another embodiment of the present disclosure and illustrates the sound generating device described above with reference to FIG. 1 or FIG. 2.

With reference to FIG. 8, the sound generating device 31 according to another embodiment of the present disclosure may include a first plate 370, a sound generator 350, a second plate 372, and a plate connection member 374.

The first plate 370 may be a vibration plate. The first plate 370 may include one or more of a plastic material, a metal material, and a wood material. The first plate 370 may be substantially the same as the vibration plate 360 described above with reference to FIG. 7, and thus, its repetitive description may be omitted.

The first plate 370 may be attached or coupled to the sound generator 350 by an adhesive member 361. The first plate 370 may be attached or coupled to a vehicle interior material 130 of a vehicle 10 by an adhesive member 365. For example, the adhesive member 361 may be a first adhesive member 361, and the first adhesive member 361 may be substantially the same as the first adhesive member 361 described above with reference to FIG. 7. Therefore, like reference numeral refers to like elements, and its repetitive description may be omitted. For example, the adhesive member 365 may be a second adhesive member 365, and the second adhesive member 365 may be substantially the same as the second adhesive member 365 described above with reference to FIG. 7. Therefore, like reference numeral refers to like elements, and its repetitive description may be omitted.

The sound generator 350 may be attached or coupled to a rear surface of the first plate 370 by the adhesive member 361 and may be substantially the same as the sound generator 350 described above with reference to FIG. 7. Therefore, like reference numeral refers to like elements, and its repetitive description may be omitted.

The second plate 372 may be disposed at a rear surface of the sound generator 350. The second plate 372 may be configured to cover the rear surface of the sound generator 350. According to an embodiment of the present disclosure, the second plate 372 may be spaced apart from the rear surface of the sound generator 350, but embodiments of the present disclosure are not limited thereto. According to an embodiment of the present disclosure, the second plate 372 may be spaced apart from the vehicle structure 110, but embodiments of the present disclosure are not limited thereto. For example, a separation space between the second plate 372 and the vehicle structure 110 may be configured so that a vibration of the sound generator 350 is smooth, but embodiments of the present disclosure are not limited thereto. For example, the separation space between the second plate 372 and the vehicle structure 110 may be a vibration space of the sound generator 350.

The second plate 372 may include one or more of a plastic material, a metal material, and a wood material. The second plate 372 may include a material which is the same as or different from that of the first plate 370. For example, the second plate 372 may include a plastic material. For example, the second plate 372 may be referred to as a plate mechanism, a base structure, a base mechanism, a module supporting frame, a supporting frame, a module supporting plate, or a supporting plate, but embodiments of the present disclosure are not limited thereto.

The plate connection member 374 may be disposed at the first plate 370 and may support the second plate 372. The plate connection member 374 according to an embodiment of the present disclosure may be disposed between the first plate 370 and the second plate 372. The plate connection member 374 according to an embodiment of the present disclosure may be disposed between the first plate 370 and the second plate 372 to surround the sound generator 350. For example, the plate connection member 374 may be disposed between a periphery portion of the first plate 370 and a periphery portion of the second plate 372. The plate connection member 374 may surround the sound generator 350. The plate connection member 374 may provide a sound space SS which surrounds the sound generator 350, between the first plate 370 and the second plate 372. For example, the sound space SS may be referred to as a sound box, sound portion, a resonance box, or a resonance portion, but embodiments of the present disclosure are not limited thereto. For example, the sound generator 350 may be disposed at a sound space SS which is surrounded by the first plate 370, the second plate 372, and the plate connection member 374.

A distance between the first plate 370 and the second plate 372 based on a thickness (or a height) of the plate connection member 374 may be greater than a distance between the first plate 370 and the rear surface of the sound generator 350. For example, a shortest distance between the first plate 370 and the second plate 372 based on a thickness (or a height) of the plate connection member 374 may be greater than a shortest distance between the first plate 370 and the rear surface of the sound generator 350. The plate connection member 374 may include a material which is substantially the same as that of the connection member 340 described above with reference to FIG. 5, and thus, its repetitive description may be omitted.

The plate connection member 374 may couple or connect the first plate 370 to the second plate 372, and thus, may integrate or implement the first plate 370 supporting the sound generator 350 and the second plate 372 covering the rear surface of the sound generator 350 into one body. Therefore, the sound generating device 31 according to an embodiment of the present disclosure may be a single structure body or a single structure where the first plate 370 supporting the sound generator 350 and the second plate 372 covering the rear surface of the sound generator 350 are modularized as one body or one element. For example, the first plate 370 supporting the sound generator 350 and the second plate 372 covering the rear surface of the sound generator 350 may be manufactured as a finished-product type such as a single structure body or a single structure by a modularization process (or an assembly process), and then, the sound generating device 31 may be mounted or disposed between the vehicle structure 110 and the vehicle interior material 130 by a relatively simple part mounting (or positioning) process in an assembly process performed on the vehicle 10. Accordingly, according to an embodiment of the present disclosure, in a process of placing or assembling the sound generating device 31 in the vehicle 10, the assemblability of the sound generating device 31 may be improved in a process of assembling devices, thereby enhancing a production yield ratio.

Figure 9:
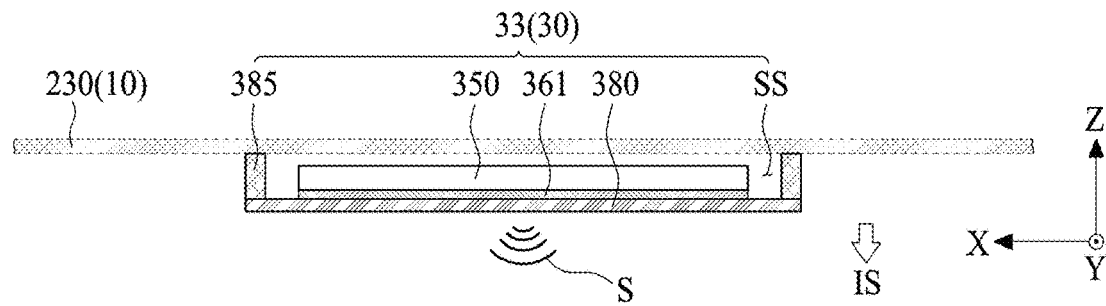
FIG. 9 illustrates a sound generating device according to another embodiment of the present disclosure.

FIG. 9 illustrates a sound generating device according to another embodiment of the present disclosure and illustrates the sound generating device described above with reference to FIG. 3.

With reference to FIG. 9, the sound generating device 33 according to another embodiment of the present disclosure may be disposed at a vehicle glass window 230 and may output a sound S toward one or more of an indoor space IS and the outside of a vehicle 10 based on a vibration of the sound generating device 33 or may vibrate the vehicle glass window 230 to output the sound S toward one or more of the indoor space IS and the outside of the vehicle 10. The sound generating device 33 may be configured to be transparent or semitransparent. For example, when the sound generating device 33 is disposed at a transparent region of the vehicle glass window 230, the sound generating device 33 may be configured to be transparent. For example, when the sound generating device 33 is disposed at a semitransparent region of the vehicle glass window 230, the sound generating device 33 may be configured to be transparent or semitransparent. For example, when the sound generating device 33 is disposed at an opaque region of the vehicle glass window 230, the sound generating device 33 may be configured to be transparent, semitransparent, or opaque. For example, a semitransparent region or an opaque region of the vehicle glass window 230 may be a periphery portion of the vehicle glass window 230, but embodiments of the present disclosure are not limited thereto.

The sound generating device 33 may include a plate 380, a sound generator 350, and a connection member 385.

The plate 380 may be disposed in parallel with the vehicle glass window 230. The plate 380 may support the sound generator 350. The plate 380 may be configured to be transparent or semitransparent. The plate according to an embodiment of the present disclosure may include a transparent or semitransparent plastic material or a glass material. For example, when the sound generating device 33 is disposed at a transparent region of the vehicle glass window 230, the plate 380 may include a transparent material. For example, when the sound generating device 33 is disposed at a semitransparent region of the vehicle glass window 230, the plate 380 may include a transparent material or a semitransparent material.

The plate 380 may vibrate based on a vibration of the sound generator 350, and thus, may output the sound S toward one or more of the indoor space IS and the outside of the vehicle 10. For example, the plate 380 may be referred to as a vibration plate, a sound plate, a sound output plate, or a transparent plate, but embodiments of the present disclosure are not limited thereto.

The sound generator 350 may be attached or coupled to the plate 380 by an adhesive member 361. For example, the sound generator 350 may be disposed at a rear surface of the plate 380 facing the vehicle glass window 230. The sound generator 350 may be attached or coupled to the rear surface of the plate 380 by the adhesive member 361. The sound generator 350 may be substantially the same as the sound generator 350 described above with reference to FIG. 7, and thus, like reference numeral refers to like element and its repetitive description may be omitted.

The adhesive member 361 may be substantially the same as the adhesive member 361 described above with reference to FIG. 7, and thus, like reference numeral refers to like element and its repetitive description may be omitted.

The connection member 385 may be disposed between the plate 380 and the vehicle glass window 230. The connection member 385 may be disposed at the plate 380 to surround the sound generator 350 and may be connected to the vehicle glass window 230. For example, the connection member 385 may be disposed at a periphery portion of the plate 380 and may surround the sound generator 350. The connection member 385 may provide a sound space SS surrounding the sound generator 350, between the vehicle glass window 230 and the plate 380. For example, the sound space SS may be referred to as a sound box, sound portion, a resonance box, or a resonance portion, but embodiments of the present disclosure are not limited thereto. For example, the sound generator 350 may be disposed at a sound space SS which is surrounded by the vehicle glass window 230, the plate 380, and the connection member 385.

A distance between the vehicle glass window 230 and the plate 380 based on a thickness (or a height) of the connection member 385 may be greater than a distance between the plate 380 and the rear surface of the sound generator 350. For example, a shortest distance between the vehicle glass window 230 and the plate 380 based on a thickness (or a height) of the connection member 385 may be greater than a shortest distance between the plate 380 and the rear surface of the sound generator 350.

The connection member 385 according to an embodiment of the present disclosure may include a double-sided tape, a double-sided foam tape, a double-sided foam pad, a double-sided foam pad tape, a double-sided adhesive pad, a double-sided adhesive gap pad, or a double-sided adhesive foam pad, which includes a transparent adhesive resin or a transparent adhesive layer, but embodiments of the present disclosure are not limited thereto. For example, a transparent adhesive resin or a transparent adhesive layer of the connection member 385 may include an adhesive material having a relatively ductile characteristic.

The sound generating device 33 according to another embodiment of the present disclosure may further include a cover plate which is connected to the connection member 385 to cover the sound generator 350.

The cover plate may cover a rear surface of the sound generator 350 facing the vehicle glass window 230. The cover plate may include a transparent material. The cover plate may be attached at the vehicle glass window 230 by an adhesive member. Also, the cover plate may support the plate 380 by the connection member 385. The connection member 385 may be disposed at or coupled to the cover plate, and thus, the plate 380 supporting the sound generator 350 and the cover plate covering the rear surface of the sound generator 350 may be implemented as one body. Therefore, the sound generating device 33 according to another embodiment of the present disclosure may be a single structure body or a single structure where the plate 380 supporting the sound generator 350 and the cover plate covering the rear surface of the sound generator 350 are modularized as one body or one element.

Figure 10:
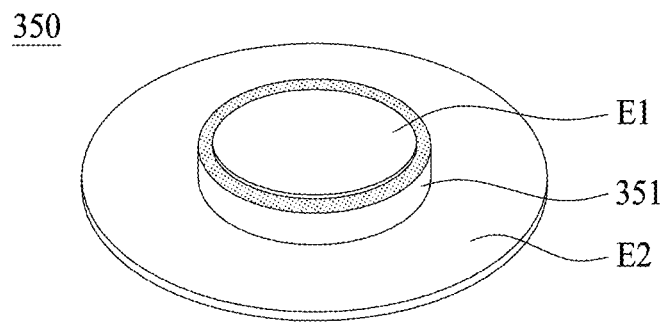
FIG. 10 illustrates a sound generator according to an embodiment of the present disclosure.

FIG. 10 illustrates a sound generator according to an embodiment of the present disclosure and illustrates the sound generator described above with reference to FIGS. 7 to 9.

With reference to FIG. 10, the sound generator 350 according to an embodiment of the present disclosure may be include a piezoelectric vibration portion 351, a first electrode portion E1, and a second electrode portion E2.

The piezoelectric vibration portion 351 may include a piezoelectric material (or an electroactive material) which has a piezoelectric effect. For example, the piezoelectric material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. The piezoelectric vibration portion 351 may be referred to as a vibration layer, a piezoelectric layer, a piezoelectric material layer, an electroactive layer, a vibration portion, a piezoelectric material portion, an electroactive portion, a piezoelectric structure, an inorganic material layer, or an inorganic material portion, but embodiments of the present disclosure are not limited thereto.

The piezoelectric vibration portion 351 may be formed of a transparent, semitransparent, or opaque piezoelectric material (or an electroactive material) and may be transparent, semitransparent (or translucent), or opaque. For example, when the sound generator 350 according to an embodiment of the present disclosure is attached or coupled to the vehicle interior material, the piezoelectric vibration portion 351 may be formed of a transparent, semitransparent, or opaque piezoelectric material to be transparent, semitransparent, or opaque. For example, when the sound generator 350 according to an embodiment of the present disclosure is attached or coupled to the vehicle glass window, the piezoelectric vibration portion 351 may be formed of a transparent or semitransparent piezoelectric material to be transparent or semitransparent.

The piezoelectric vibration portion 351 according to an embodiment of the present disclosure may include a ceramic-based material for generating a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation or alignment. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A", and "B" may be cations, and "O" may be anions. For example, the chemical formula "$ABO_3$" may include one of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

The piezoelectric vibration portion 351 according to an embodiment of the present disclosure may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the piezoelectric vibration portion 351 may include at least one or more of calcium titanate ($CaTiO_3$), $BaTiO_3$, and $SrTiO_3$, each without Pb, but embodiments of the present disclosure are not limited thereto.

The piezoelectric vibration portion 351 according to an embodiment of the present disclosure may include a circular shape, an oval shape, or a polygonal shape, but embodiments of the present disclosure are not limited thereto.

The first electrode portion E1 may be disposed at a first surface (or an upper surface) of the piezoelectric vibration portion 351 and may be electrically connected to the first surface of the piezoelectric vibration portion 351. For example, the first electrode portion E1 may have a single-body electrode which is disposed at a whole first surface of the piezoelectric vibration portion 351. For example, the first electrode portion E1 may have the same shape as the piezoelectric vibration portion 351, but embodiments of the present disclosure are not limited thereto. The first electrode portion E1 according an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. Examples of the opaque conductive material may include aluminum (Al), copper (Cu), gold (Au), silver (Ag), molybdenum (Mo), magnesium (Mg), and an alloy of any thereof, but embodiments of the present disclosure are not limited thereto.

The second electrode portion E2 may be disposed at a second surface (or a rear surface) opposite to the first surface of the piezoelectric vibration portion 351, and may be electrically connected to the second surface of the piezoelectric vibration portion 351. For example, the second electrode portion E2 may have a single-body electrode which is disposed at a whole second surface of the piezoelectric vibration portion 351. For example, the second electrode portion E2 may have a larger size than the piezoelectric vibration portion 351 and have the same shape as the piezoelectric vibration portion 351, but embodiments of the present disclosure are not limited thereto. The second electrode portion E2 according to an embodiment of the present disclosure may include a transparent conductive material, a semitransparent conductive material, or an opaque conductive material. For example, the second electrode portion E2 may include the same material as that of the first electrode portion E1, but embodiments of the present disclosure are not limited thereto. As another example, the second electrode portion E2 may include a material different from that of the first electrode portion E1.

The piezoelectric vibration portion 351 may be polarized (or poling) by a certain voltage applied to the first electrode portion E1 and the second electrode portion E2 in a certain temperature atmosphere, or in a temperature atmosphere that may be changed from a high temperature to a room temperature, but embodiments of the present disclosure are not limited to thereto. For example, the piezoelectric vibration portion 351 may alternately and repeatedly contract and expand based on an inverse piezoelectric effect according to a sound signal (or voice signal) applied to the first electrode portion E1 and the second electrode portion E2 from the outside to vibrate.

According to an embodiment of the present disclosure, any one of the first electrode portion E1 and the second electrode portion E2 may be attached or coupled to a vehicle interior material or a vehicle glass window by an adhesive member. For example, as described above with reference to FIGS. 7 to 9, one of the first electrode portion E1 and the second electrode portion E2 may be attached or coupled to the vehicle interior material 130, the vehicle glass window 230, or the plates 360, 370, and 380 by an adhesive member 361.

The sound generator 350 according to an embodiment of the present disclosure may further include a first protection member and a second protection member.

The first protection member may be disposed on the first electrode portion E1 and may protect the first electrode portion E1. For example, the first protection member may include a plastic material, a fiber material, or a wood material.

The second protection member may be disposed on the second electrode portion E2 and may protect the second electrode portion E2. For example, the second protection member may include a plastic material, a fiber material, or a wood material. For example, the first protection member may include a material which is the same as or different from that of the second protection member.

According to an embodiment of the present disclosure, one of the first protection member and the second protection member may be attached or coupled to a vehicle interior material or a vehicle glass window by an adhesive member. For example, as described above with reference to FIGS. 7 to 9, one of the first protection member and the second protection member may be attached or coupled to the vehicle interior material 130, the vehicle glass window 230, or the plates 360, 370, and 380 by an adhesive member 361.

Figure 11:
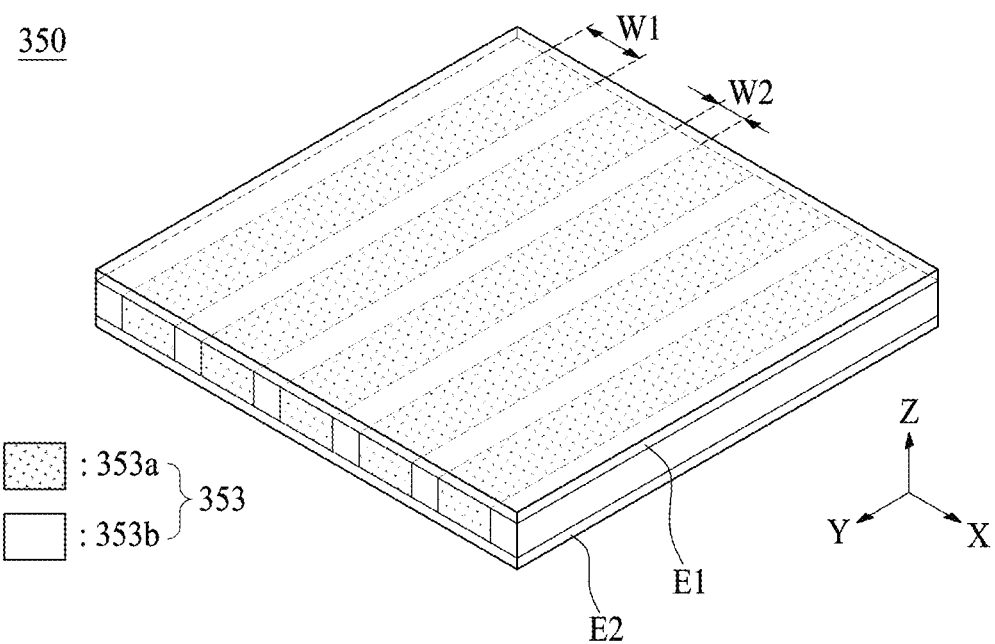
FIG. 11 illustrates a sound generator according to another embodiment of the present disclosure.

FIG. 11 illustrates a sound generator according to another embodiment of the present disclosure and illustrates the sound generator described above with reference to FIGS. 7 to 9.

With reference to FIG. 11, the sound generator 350 according to another embodiment of the present disclosure may be referred to as a flexible sound generator, a flexible vibrator, a flexible vibration generator, a flexible vibration member, a flexible actuator, a flexible exciter, a flexible speaker, a flexible piezoelectric speaker, a film actuator, a film exciter, a film-type piezoelectric composite actuator, a film speaker, a film-type piezoelectric speaker, or a film-type piezoelectric composite speaker, but embodiments of the present disclosure are not limited thereto.

The sound generator 350 according to an embodiment of the present disclosure may be include a piezoelectric vibration portion 353, a first electrode portion E1, and a second electrode portion E2.

The piezoelectric vibration portion 353 may include a piezoelectric material, a composite piezoelectric material, or an electro active material which has a piezoelectric effect. The piezoelectric vibration portion 353 may be referred to as a vibration layer, a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, but embodiments of the present disclosure are not limited thereto. The piezoelectric vibration portion 353 may be formed of a transparent, semitransparent, or opaque piezoelectric material (or an electroactive material) and may be transparent, semitransparent, or opaque.

The piezoelectric vibration portion 353 according to an embodiment of the present disclosure may include a plurality of first portions 353a and a plurality of second portions 353b. For example, the plurality of first portions 353a and the plurality of second portions 353b may be alternately and repeatedly arranged along a first direction X (or a second direction Y). For example, the first direction X may be a widthwise direction or a first horizontal direction of the piezoelectric vibration portion 353. The second direction Y may be a lengthwise direction or a second horizontal direction of the piezoelectric vibration portion 353. An embodiment of the present disclosure is not limited thereto, and the first direction X may be the lengthwise direction or the second horizontal direction of the piezoelectric vibration portion 353, and the second direction Y may be the widthwise direction or the first horizontal direction of the piezoelectric vibration portion 353.

Each of the plurality of first portions 353a may be configured as an inorganic material portion. The inorganic material portion may include the above-described piezoelectric material. For example, each of the plurality of first portions 353a may include a piezoelectric material which is be substantially the same as the piezoelectric vibration portion 351 described above with reference to FIG. 10, and thus, like reference numerals refer to like elements and their repetitive descriptions may be omitted.

Each of the plurality of first portions 353a according to an embodiment of the present disclosure may be disposed between the plurality of second portions 353b. For example, the plurality of first portions 353a may have a first width W1 parallel to the first direction X (or the second direction Y) and a length parallel to the second direction Y (or the first direction X). Each of the plurality of second portions 353b may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 353a and the second portion 353b may include a line shape or a stripe shape which has the same size or different sizes. Therefore, the piezoelectric vibration portion 353 may include a 2-2 composite and thus may have a resonance frequency of 20 kHz or less, but embodiments of the present disclosure are not limited thereto and a resonance frequency of the piezoelectric vibration portion 353 may vary based on one or more of a shape, a length, and a thickness.

In the piezoelectric vibration portion 353, each of the plurality of first portions 353a and the plurality of second portions 353b may be disposed (or arranged) at the same plane (or the same layer) in parallel. Each of the plurality of second portions 353b may be configured to fill a gap between two adjacent first portions of the plurality of first portions 353a and may be connected or attached to a second portion 353b adjacent thereto. The piezoelectric vibration portion 353 may extend by a desired size or length based on the side coupling (or connection) of the first portion 353a and the second portion 353b.

In the piezoelectric vibration portion 353, a width (or a size) W2 of each of the plurality of second portions 353b may progressively decrease in a direction from a center portion to both peripheries (or both ends) of the piezoelectric vibration portion 353 or the sound generator 350.

According to an embodiment of the present disclosure, a second portion 353b, having a largest width W2 among the plurality of second portions 353b, may be located at a portion at which a highest stress may concentrate when the piezoelectric vibration portion 351 or the vibration device is vibrating in a vertical direction Z (or a thickness direction). A second portion 353b, having a smallest width W2 among the plurality of second portions 353b, may be located at a portion where a relatively low stress may occur when the piezoelectric vibration portion 353 or the sound generator 350 is vibrating in the vertical direction Z. For example, the second portion 353b, having the largest width W2 among the plurality of second portions 353b, may be disposed at the center portion of the piezoelectric vibration portion 353, and the second portion 353b, having the smallest width W2 among the plurality of second portions 353b may be disposed at each of the both edges or peripheries of the piezoelectric vibration portion 353. Therefore, when the piezoelectric vibration portion 353 or the sound generator 350 is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure and a lowest sound pressure.

In the piezoelectric vibration portion 353, each of the plurality of first portions 353a may have different sizes (or widths). For example, a size (or a width) of each of the plurality of first portions 353a may progressively decrease or increase in a direction from the center portion to the both peripheries (or both ends) of the piezoelectric vibration portion 353 or the sound generator 350. For example, in the piezoelectric vibration portion 353, a sound pressure level characteristic of a sound may be enhanced and a sound reproduction band may increase, based on various natural vibration frequencies according to a vibration of each of the plurality of first portions 353a having different sizes.

The plurality of second portions 353b may be disposed between the plurality of first portions 353a. Therefore, in the piezoelectric vibration portion 353 or the sound generator 350, vibration energy by a link in a unit lattice of each first portion 353a may increase by a corresponding second portion 353b. Thus, a vibration may increase, and a piezoelectric characteristic and flexibility may be secured. For example, the second portion 353b may include at least one or more of an epoxy-based polymer, an acryl-based polymer, and a silicone-based polymer, but embodiments of the present disclosure are not limited thereto.

The plurality of second portions 353b according to an embodiment of the present disclosure may be configured as an organic material portion. For example, the organic material portion may be disposed between the inorganic material portions and may absorb an impact applied to the inorganic material portion (or the first portion), may release a stress concentrating on the inorganic material portion to enhance the total durability of the piezoelectric vibration portion 353 or the sound generator 350, and may provide flexibility to the piezoelectric vibration portion 353 or the sound generator 350.

The plurality of second portions 353b according to an embodiment of the present disclosure may have modulus and viscoelasticity that are lower than those of each first portion 353a, and thus, the second portion 353b may enhance the reliability of each first portion 353a vulnerable to an impact due to a fragile characteristic. For example, the second portion 353b may include a material having a loss coefficient of about 0.01 to about 1.0 and modulus of about 0.1 [GPa] to about 10 [GPa].

The organic material portion included in the second portion 353b may include one or more of an organic material, an organic polymer, an organic piezoelectric material, and an organic non-piezoelectric material that has a flexible characteristic in comparison with the inorganic material portion of the first portions 353a. For example, the second portion 353b may be referred to as an adhesive portion, an elastic portion, a bending portion, a damping portion, or a flexible portion each having flexibility, but embodiments of the present disclosure are not limited thereto.

Therefore, the plurality of first portions 353a and the second portion 353b may be disposed on (or connected to) the same plane, and thus, the piezoelectric vibration portion 353 of the vibration array 210 according to various embodiments of the present disclosure may have a single thin film-type.

For example, the piezoelectric vibration portion 353 may have a structure in which a plurality of first portions 353a are connected to one side. For example, the plurality of first portions 353a may have a structure connected to a whole the piezoelectric vibration portion 353. For example, the piezoelectric vibration portion 353 may be vibrated in a vertical direction (or a thickness direction) by the first portion 353a having a vibration characteristic and may be bent in a curved shape by the second portion 353b having flexibility. Also, in the piezoelectric vibration portion 353 according to various embodiments of the present disclosure, a size of the first portion 353a and a size of the second portion 353b may be adjusted based on a piezoelectric characteristic and flexibility needed for the piezoelectric vibration portion 353 or the sound generator 350. For example, when the piezoelectric vibration portion 353 needs a piezoelectric characteristic rather than flexibility, a size of the first portion 353a may be adjusted to be greater than that of the second portion 353b. As another example, when the piezoelectric vibration portion 353 needs flexibility rather than a piezoelectric characteristic, a size of the second portion 353b may be adjusted to be greater than that of the first portion 353a. For example, the size of the second portion 353b and the size of the first portion 353a may be one or more of a width, a length, and a thickness. Accordingly, a size of the piezoelectric vibration portion 353 may be adjusted based on a characteristic needed therefor, and thus, the piezoelectric vibration portion 353 may be easy to design.

The first electrode portion E1 may be disposed at a first surface (or an upper surface) of the piezoelectric vibration portion 353. The first electrode portion E1 may be disposed at or coupled to a first surface of each of a plurality of first portions 353a and a first surface of each of a plurality of second portions 353b in common and may be electrically connected to the first surface of each of the plurality of first portions 353a. For example, the first electrode portion E1 may be a single-body electrode which is disposed at a whole first surface of the piezoelectric vibration portion 353. For example, the first electrode portion E1 may have the same shape as that of the piezoelectric vibration portion 353, but embodiments of the present disclosure are not limited thereto. The first electrode portion E1 according to an embodiment of the present disclosure, as described above with reference to FIG. 10, may include a transparent conductive material, a semitransparent conductive material, or an opaque conductive material.

The second electrode portion E2 may be disposed at a second surface (or a rear surface) opposite to the first surface of the piezoelectric vibration portion 353. The second electrode portion E2 may be disposed at or coupled to a second surface of each of a plurality of first portions 353a and the second surface of each of a plurality of second portions 353b in common and may be electrically connected to a second surface of each of the plurality of first portions 353a. For example, the second electrode portion E2 may be a single-body electrode which is disposed on a whole second surface of the piezoelectric vibration portion 353. For example, the second electrode portion E2 may have the same shape as that of the piezoelectric vibration portion 353, but embodiments of the present disclosure are not limited thereto. The second electrode portion E2 according to an embodiment of the present disclosure, as described above with reference to FIG. 10, may include a transparent conductive material, a semitransparent conductive material, or an opaque conductive material.

The piezoelectric vibration portion 353 may be polarized (or poling) by a certain voltage applied to the first electrode portion E1 and the second electrode portion E2 in a certain temperature atmosphere, or a temperature atmosphere that may be changed from a high temperature to a room temperature, but embodiments of the present disclosure are not limited thereto. For example, the piezoelectric vibration portion 353 may alternately and repeatedly contract and expand based on an inverse piezoelectric effect according to a sound signal (or voice signal) applied to the first electrode portion E1 and the second electrode portion E2 from the outside to vibrate.

For example, the piezoelectric vibration portion 353 may vibrate based on a vertical-direction (or a thickness direction Z) vibration d33 and a horizontal-direction (or a planar direction) vibration d31 by the first electrode portion E1 and the second electrode portion E2. The piezoelectric vibration portion 353 may increase the displacement of one or more of the vehicle interior material, the vehicle glass window, and the plate by contraction and expansion in the horizontal-direction, thereby further improving the vibration.

According to an embodiment of the present disclosure, one of the first electrode portion E1 and the second electrode portion E2 may be attached or coupled to a vehicle interior material or a vehicle glass window by an adhesive member. For example, as described above with reference to FIGS. 7 to 9, one of the first electrode portion E1 and the second electrode portion E2 may be attached or coupled to the vehicle interior material 130, the vehicle glass window 230, or the plates 360, 370, and 380 by an adhesive member 361.

The sound generator 350 according to an embodiment of the present disclosure may further include a first protection member and a second protection member.

The first protection member may be disposed on the first electrode portion E1 and may protect the first electrode portion E1. For example, the first protection member may include a plastic material, a fiber material, or a wood material.

The second protection member may be disposed on the second electrode portion E2 and may protect the second electrode portion E2. For example, the second protection member may include a plastic material, a fiber material, or a wood material. For example, the first protection member may include a material which is the same as or different from that of the second protection member.

According to an embodiment of the present disclosure, one of the first protection member and the second protection member may be attached or coupled to a vehicle interior material or a vehicle glass window by an adhesive member. For example, as described above with reference to FIGS. 7 to 9, one of the first protection member and the second protection member may be attached or coupled to the vehicle interior material 130, the vehicle glass window 230, or the plates 360, 370, and 380 by an adhesive member 361.

Figure 12:
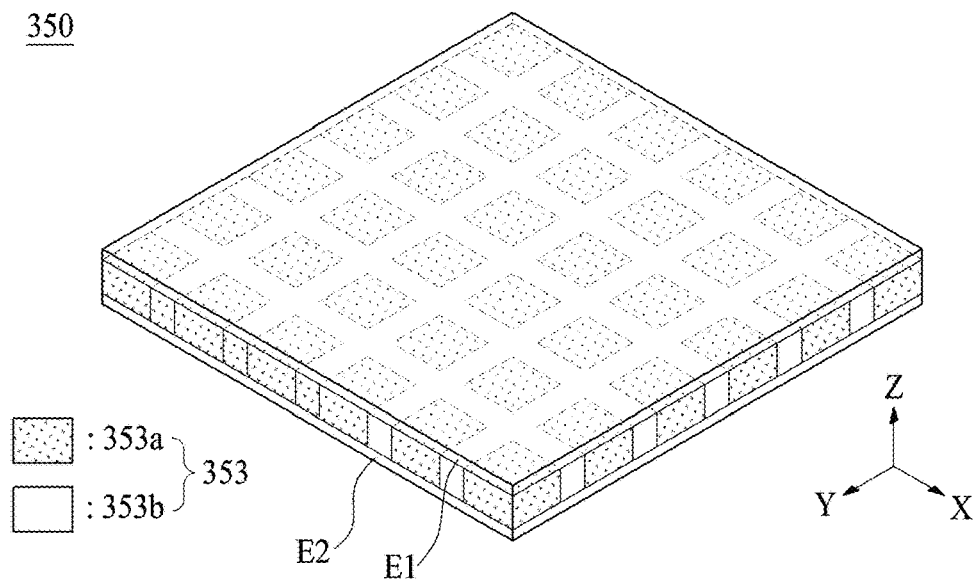
FIG. 12 illustrates a sound generator according to another embodiment of the present disclosure.

FIG. 12 illustrates a sound generator according to another embodiment of the present disclosure and illustrates an embodiment where the piezoelectric vibration portion illustrated in FIG. 11 is modified. Hereinafter, therefore, repetitive descriptions of elements other than the piezoelectric vibration portion may be omitted or will be briefly given.

With reference to FIG. 12, in the sound generator 350 according to another embodiment of the present disclosure, the piezoelectric vibration portion 353 according to an embodiment of the present disclosure may include a plurality of first portions 353a, which are spaced apart from one another along a first direction X and a second direction Y, and a second portion 353b disposed between the plurality of first portions 353a.

Each of the plurality of first portions 353a may be disposed to be spaced apart from one another along the first direction X and the second direction Y. For example, each of the plurality of first portions 353a may have a hexahedral shape (or a six-sided object shape) having the same size and may be disposed in a lattice shape. For example, each of the plurality of first portions 353a may include a piezoelectric material which is be substantially the same as the first portion 353a described above with reference to FIG. 11, and thus, like reference numerals refer to like elements and their repetitive descriptions may be omitted.

The second portion 353b may be disposed between the plurality of first portions 353a along each of the first direction X and the second direction Y. The second portion 353b may be configured to fill a gap or a space between two adjacent first portions 353a or to surround each of the plurality of first portions 353a, and thus, may be connected or attached to an adjacent first portion 353a. According to an embodiment of the present disclosure, a width of a second portion 353b disposed between two first portions 353a adjacent to each other along the first direction X may be the same as or different from that of the first portion 353a, and a width of a second portion 353b disposed between two first portions 353a adjacent to each other along the second direction Y may be the same as or different from that of the first portion 353a. For example, the second portion 353b may include an organic material which is be substantially the same as the second portion 353b described above with reference to FIG. 11, and thus, like reference numerals refer to like elements and their repetitive descriptions may be omitted.

Therefore, the piezoelectric vibration portion 353 of the sound generator 350 may include a 1-3 composite and thus may have a resonance frequency of 30 MHz or less, but embodiments of the present disclosure are not limited thereto and a resonance frequency of the piezoelectric vibration portion 353 may vary based on one or more of a shape, a length, and a thickness.

Figure 13:
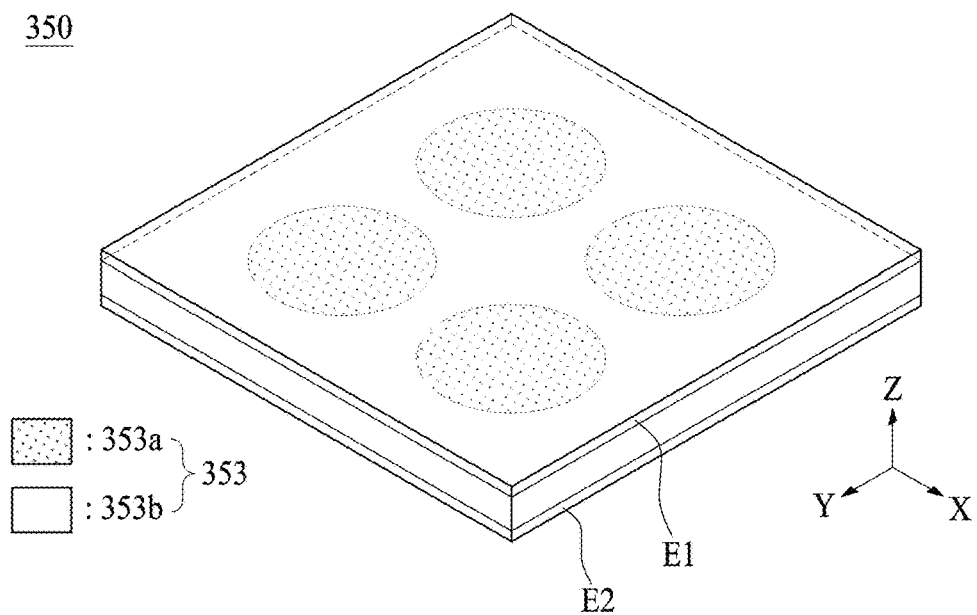
FIG. 13 illustrates a sound generator according to another embodiment of the present disclosure.

FIG. 13 illustrates a sound generator according to another embodiment of the present disclosure and illustrates an embodiment where the piezoelectric vibration portion illustrated in FIG. 11 is modified. Hereinafter, therefore, repetitive descriptions of elements other than the piezoelectric vibration portion may be omitted or will be briefly given.

With reference to FIG. 13, in the sound generator 350 according to another embodiment of the present disclosure, the piezoelectric vibration portion 353 according to an embodiment of the present disclosure may include a plurality of first portions 353a, which are spaced apart from one another along a first direction X and a second direction Y, and a second portion 353b disposed between the plurality of first portions 353a.

Each of the plurality of first portions 353a may be disposed to be spaced apart from one another along the first direction X and the second direction Y. For example, each of the plurality of first portions 353a may have a flat structure of a circular shape, but embodiments of the present disclosure are not limited thereto. For example, each of the plurality of first portions 353a may have a dot shape including an oval shape, a polygonal shape, or a donut shape. For example, each of the plurality of first portions 353a may include a piezoelectric material which is be substantially the same as the first portion 353a described above with reference to FIG. 11, and thus, like reference numerals refer to like elements and their repetitive descriptions may be omitted.

The second portion 353b may be disposed between the plurality of first portions 353a along each of the first direction X and the second direction Y. The second portion 353b may be configured to surround each of the plurality of first portions 353a, and thus, may be connected to or attached on a side surface of each of the plurality of first portions 353a. The plurality of first portions 353a and the second portion 353b may be disposed (or arranged) in parallel on the same plane (or the same layer). For example, the second portion 353b may include an organic material which is be substantially the same as the second portion 353b described above with reference to FIG. 11, and thus, like reference numerals refer to like elements and their repetitive descriptions may be omitted.

Therefore, the piezoelectric vibration portion 353 may include a 1-3 composite and may be implemented as a circular vibration source (or vibrator), and thus, may be enhanced in vibration characteristic or sound output characteristic and may have a resonance frequency of 30 MHz or less. However, embodiments of the present disclosure are not limited thereto, and a resonance frequency of the piezoelectric vibration portion 353 may vary based on one or more of a shape, a length, and a thickness.

In the piezoelectric vibration portion 353 of the sound generator 350 according to another embodiment of the present disclosure, each of the plurality of first portions 353a may have a flat structure of a triangular shape instead of a flat structure of a circular shape. For example, each of the plurality of first portions 353a may have a triangular plate shape.

According to an embodiment of the present disclosure, four adjacent first portions 353a among the plurality of first portions 353a may be adjacent to one another to form a tetragonal or quadrilateral shape (or a square shape). Vertices of the four adjacent first portions 353a forming a tetragonal shape may be adjacent to one another in a center portion (or a central portion) of the tetragonal shape.

According to another embodiment of the present disclosure, six adjacent first portions 353a among the plurality of first portions 353a may be adjacent to one another to form a hexagonal shape (or a regularly hexagonal shape). Vertices of the six adjacent first portions 353a forming a hexagonal shape may be adjacent to one another in a center portion (or a central portion) of the hexagonal shape.

Figure 14:
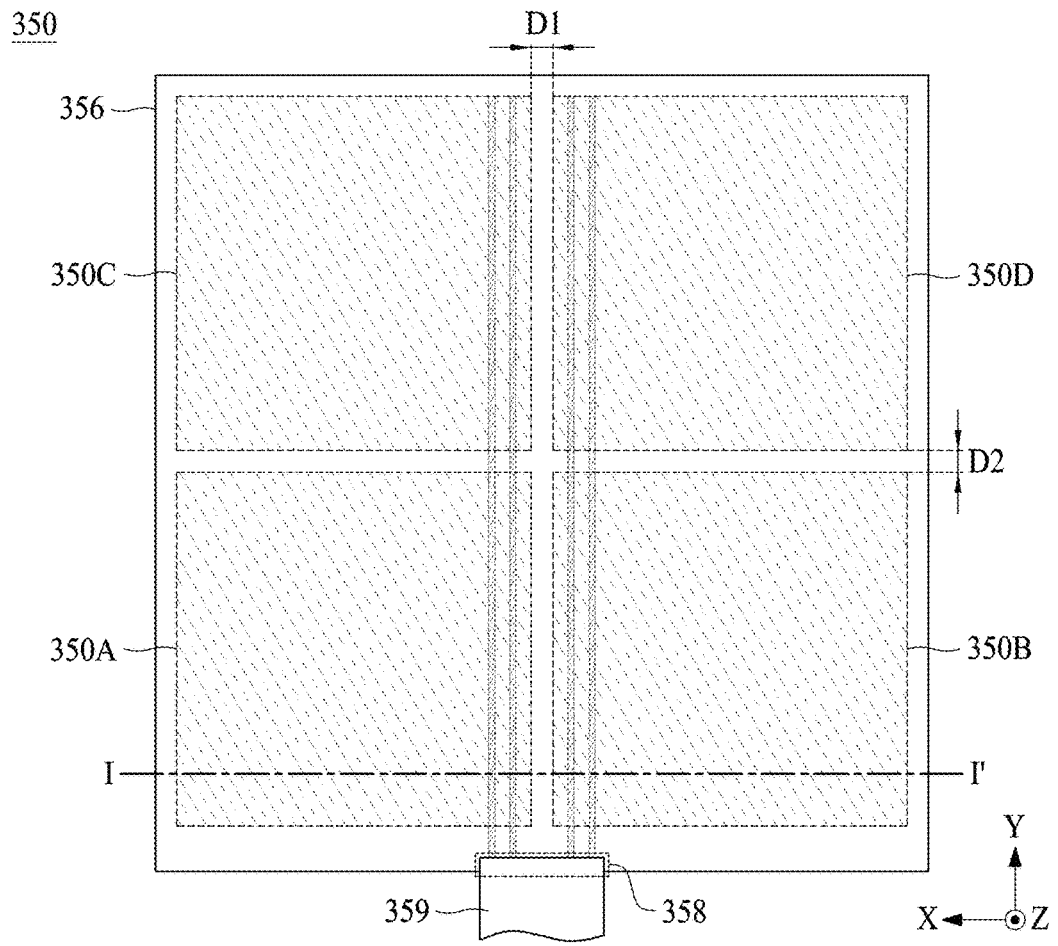
FIG. 14 illustrates a sound generator according to another embodiment of the present disclosure.
Figure 15:
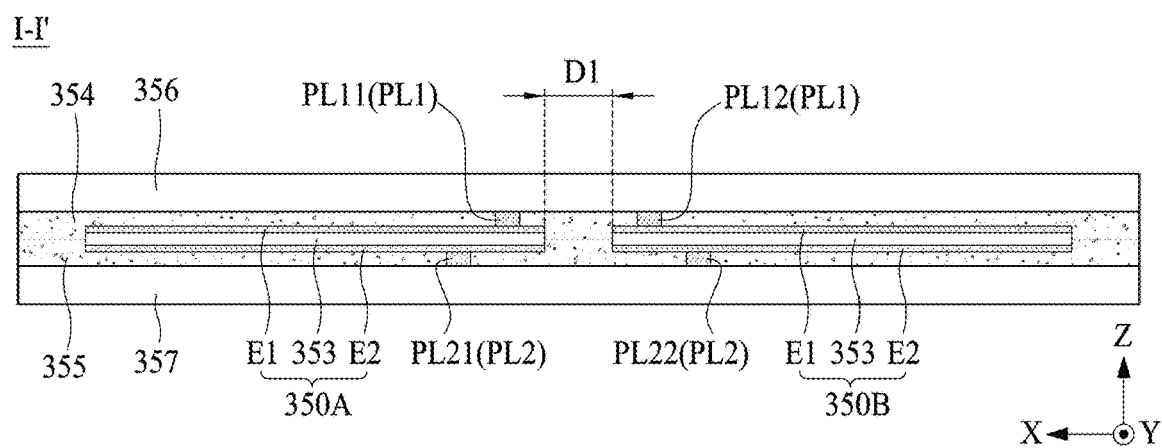
FIG. 15 is a cross-sectional view taken along line I-I' illustrated in FIG. 14.

FIG. 14 illustrates a sound generator according to another embodiment of the present disclosure, FIG. 15 is a cross-sectional view taken along line I-I' illustrated in FIG. 14, and illustrates the sound generator described above with reference to FIGS. 7 to 9.

With reference to FIGS. 14 and 15, a sound generator according to another embodiment of the present disclosure may include at least one or more vibration devices 350A to 350D or a plurality of vibration devices 350A to 350D.

The plurality of vibration devices 350A to 350D may be electrically separated and disposed while being spaced apart from each other along each of a first direction X and a second direction Y intersecting with the first direction X.

Each of the plurality of vibration devices 350A to 350D may alternately and/or repeatedly contract and expand based on a piezoelectric effect to vibrate. For example, each of the plurality of vibration devices 350A to 350D may be arranged or tiled at a certain interval (or distance) along each of the first direction X and the second direction Y. For example, the sound generator 350 in which the plurality of vibration devices 350A to 350D are arranged or tiled may be referred to as a vibration array, a vibration array portion, a vibration device array portion, a vibration array structure, a tiling vibration array, a tiling vibration array device, a tiling vibration array module, or a tiling vibration film, but embodiments of the present disclosure are not limited thereto.

Each of the plurality of vibration devices 350A to 350D according to an embodiment of the present disclosure may have a tetragonal shape having a width of about 5 cm or more. For example, each of the plurality of vibration devices 350A to 350D may have a square shape having a size of 5 cm×5 cm or more, but embodiments of the present disclosure are not limited thereto.

Each of the plurality of vibration devices 350A to 350D may be arranged or tiled in i×j form on the same plane, and thus, the vibration array 210 may have an enlarged area based on tiling of the plurality of vibration devices 350A to 350D having a relatively small size. For example, i may be the number of vibration modules arranged along the first direction X or may be a natural number of 2 or more, and j may be the number of vibration modules arranged along the second direction Y or may be a natural number of 1 or more which is the same as or different from i.

Each of the plurality of vibration devices 350A to 350D may be arranged or tiled at a certain interval (or distance), and thus, may be implemented as one vibration device (or a single vibration device) which is driven as one complete single-body without being independently driven. According to an embodiment of the present disclosure, with respect to the first direction X, a first separation distance (or first distance or first interval) D1 between the plurality of vibration devices 350A to 350D may be 0.1 mm or more and less than 3 cm, but embodiments of the present disclosure are not limited thereto. Also, with respect to the second direction Y, a second separation distance (or second distance or second interval) D2 between the plurality of vibration devices 350A to 350D may be 0.1 mm or more and less than 3 cm, but embodiments of the present disclosure are not limited thereto. For example, the first separation distance D1 may be the same as the second separation distance D2. For example, the first separation distance D1 may be the same as the second separation distance D2 within a process error range.

According to an embodiment of the present disclosure, each of the plurality of vibration devices 350A to 350D may be arranged or tiled to have the separation distances (or intervals) D1 and D2 of 0.1 mm or more and less than 3 cm, and thus, may be driven as one vibration device, thereby increasing a reproduction band and a sound pressure level characteristic of a sound which is generated based on a single-body vibration of the plurality of vibration devices 350A to 350D. For example, the plurality of vibration devices 350A to 350D may be arranged at an interval of 0.1 mm or more and less than 5 mm, in order to increase a reproduction band of a sound generated based on a single-body vibration of the plurality of vibration devices 350A to 350D and to increase a sound of a low-pitched sound band (for example, a sound pressure level characteristic in 500 Hz or less).

According to an embodiment of the present disclosure, when the plurality of vibration devices 350A to 350D are arranged at the intervals D1 and D2 of less than 0.1 mm or without the intervals D1 and D2, the reliability of the vibration devices 350A to 350D or the sound generator 350 may be reduced due to damage or a crack caused by a physical contact therebetween which occurs when each of the vibration devices 350A to 350D vibrates.

According to an embodiment of the present disclosure, when the plurality of vibration devices 350A to 350D are arranged at the intervals D1 and D2 of 3 cm or more, the plurality of vibration devices 350A to 350D may not be driven as one vibration device due to an independent vibration of each of the plurality of vibration devices 350A to 350D. Therefore, a reproduction band and a sound pressure level characteristic of a sound which is generated based on vibrations of the plurality of vibration devices 350A to 350D may be reduced. For example, when the plurality of vibration devices 350A to 350D are arranged at the intervals D1 and D2 of 3 cm or more, a sound characteristic and a sound pressure level characteristic of the low-pitched sound band (for example, in 500 Hz or less) may each be reduced.

According to an embodiment of the present disclosure, when the plurality of vibration devices 350A to 350D are arranged at an interval of 5 mm, each of the plurality of vibration devices 350A to 350D may not be perfectly driven as one vibration device, and thus, a sound characteristic and a sound pressure level characteristic of the low-pitched sound band (for example, in 200 Hz or less) may each be reduced.

According to another embodiment of the present disclosure, when the plurality of vibration devices 350A to 350D are arranged at an interval of 1 mm, each of the plurality of vibration devices 350A to 350D may be driven as one vibration device, and thus, a reproduction band of a sound may increase and a sound of the low-pitched sound band (for example, a sound pressure level characteristic in 500 Hz or less) may increase. For example, when the plurality of vibration devices 350A to 350D are arranged at an interval of 1 mm, the sound generator 350 may be implemented as a large-area vibrator which is enlarged based on optimization of a separation distance between the plurality of vibration devices 350A to 350D. Therefore, the sound generator 350 may be driven as a large-area vibrator based on a single-body vibration of the plurality of vibration devices 350A to 350D, and thus, a sound characteristic and a sound pressure level characteristic may each increase in the low-pitched sound band and a reproduction band of a sound generated based on a large-area vibration of the sound generator 350.

Therefore, to implement a single-body vibration (or one vibration device) of the plurality of vibration devices 350A to 350D, a separation distance between the plurality of vibration devices 350A to 350D may be adjusted to 0.1 mm or more and less than 3 cm. Also, to implement a single-body vibration (or one vibration device) of the plurality of vibration devices 350A to 350D and to increase a sound pressure level characteristic of a sound of the low-pitched sound band, the separation distance between the plurality of vibration devices 350A to 350D may be adjusted to 0.1 mm or more and less than 5 mm.

The sound generator 350 according to an embodiment of the present disclosure may include first to fourth vibration devices 350A to 350D which are electrically disconnected (or separated) and/or structurally separated from one another and are disposed spaced apart from one another along each of the first direction X and the second direction Y. For example, the first to fourth vibration devices 350A to 350D may be arranged or tiled in 2×2 form.

According to an embodiment of the present disclosure, the first and second vibration devices 350A and 350B may be spaced apart from each other along the first direction X. The third and fourth vibration devices 350C and 350D may be spaced apart from each other in the first direction X and may be spaced apart from each of the first and second vibration devices 350A and 350B along the second direction Y. The first and third vibration devices 350A and 350C may be spaced apart from each other along the second direction Y to face each other. The second and fourth vibration devices 350B and 350D may be spaced apart from each other along the second direction Y to face each other.

According to an embodiment of the present disclosure, the first to fourth vibration devices 350A to 350D may be implemented as one vibration device or a single-body vibration device, or a large-area vibrator of the sound generator 350. To implement a vibration of a large-area vibrator of the sound generator 350, the first to fourth vibration devices 350A to 350D may be arranged (or tiled) at the intervals D1 and D2 of 0.1 mm or more and less than 3 cm along each of the first direction X and the second direction Y, or may be arranged (or tiled) at the interval of 0.1 mm or more and less than 5 mm along each of the first direction X and the second direction Y.

Each of the first to fourth vibration devices 350A to 350D according to an embodiment of the present disclosure may include a piezoelectric vibration portion 353, a first electrode portion E1, and a second electrode portion E2.

The piezoelectric vibration portion 353 may include a ceramic-based material capable of realizing a relatively high vibration. For example, the piezoelectric vibration portion 353 may include a 1-3 composite having a piezoelectric characteristic of a 1-3 vibration mode or a 2-2 composite having a piezoelectric characteristic of a 2-2 vibration mode. For example, the piezoelectric vibration portion 353 may include the first portions 353a and the second portion 353b similar to the piezoelectric vibration portion 353 described above with reference to FIGS. 11 to 13, and thus, like reference numerals refer to like elements and their repetitive descriptions may be omitted.

The first electrode portion E1 may be disposed at a first surface of the piezoelectric vibration portion 353 and may be electrically connected to the first surface of the piezoelectric vibration portion 353. For example, the first electrode portion E1 may be substantially the same as the first electrode portion E1 described above with reference to FIGS. 11 to 13, and thus, like reference numerals refer to like elements and their repetitive descriptions may be omitted.

The second electrode portion E2 may be disposed at a second surface of the piezoelectric vibration portion 353, and may be electrically connected to the second surface of the piezoelectric vibration portion 353. For example, the second electrode portion E2 may be substantially the same as the second electrode portion E2 described above with reference to FIGS. 11 to 13, and thus, like reference numerals refer to like elements and their repetitive descriptions may be omitted.

The piezoelectric vibration portion 353 according to an embodiment of the present disclosure, as described above with reference to FIG. 10, may be formed of a transparent, semitransparent, or opaque piezoelectric and may be transparent, semitransparent, or opaque. For example, when the sound generator 350 according to an embodiment of the present disclosure is attached or coupled to the vehicle interior material, the piezoelectric vibration portion 353 may be formed of a transparent, semitransparent, or opaque piezoelectric material to be transparent, semitransparent, or opaque. For example, when the sound generator 350 according to an embodiment of the present disclosure is attached or coupled to the vehicle glass window, the piezoelectric vibration portion 351 may be formed of a transparent or semitransparent piezoelectric material to be transparent or semitransparent.

The sound generator 350 according to another embodiment of the present disclosure may further include a first protection member 356 and a second protection member 357.

The first protection member 356 may be disposed on the first surface of the sound generator 350. For example, the first protection member 356 may cover the first electrode portion E1 disposed on a first surface of each of the plurality of vibration devices 350A to 350D, and thus, may be connected to the first surface of each of the plurality of vibration devices 350A to 350D in common or may support the first surface of each of the plurality of vibration devices 350A to 350D in common. Accordingly, the first protection member 356 may protect the first surface of each of the plurality of vibration devices 350A to 350D or the first electrode portion E1.

The first protection member 356 according to an embodiment of the present disclosure may be disposed at the first surface of each of the plurality of vibration devices 350A to 350D by a first adhesive layer 354. For example, the first protection member 356 may be directly disposed at the first surface of each of the plurality of vibration devices 350A to 350D by a film laminating process using the first adhesive layer 354. Accordingly, the plurality of vibration devices 350A to 350D may be integrated (or disposed) or tiled with the first protection member 356 to have the certain intervals D1 and D2.

The second protection member 357 may be disposed on the second surface of the sound generator 350. For example, the second protection member 357 may cover the second electrode portion E2 disposed on a second surface of each of the plurality of vibration devices 350A to 350D, and thus, may be connected to the second surface of each of the plurality of vibration devices 350A to 350D in common or may support the second surface of each of the plurality of vibration devices 350A to 350D in common. Accordingly, the second protection member 357 may protect the second surface of each of the plurality of vibration devices 350A to 350D or the second electrode portion E2.

The second protection member 357 according to an embodiment of the present disclosure may be disposed at the second surface of each of the plurality of vibration devices 350A to 350D by a second adhesive layer 355. For example, the second protection member 357 may be directly disposed at the second surface of each of the plurality of vibration devices 350A to 350D by a film laminating process by the second adhesive layer 355. Accordingly, the plurality of vibration devices 350A to 350D may be integrated (or disposed) or tiled with the second protection member 357 to have the certain intervals D1 and D2.

Each of the first protection member 356 and the second protection member 357 according to an embodiment of the present disclosure may include a plastic material, a fiber material, or a wood material. Any one of the first protection member 356 and the second protection member 357 may be attached or coupled to a vehicle interior material or a vehicle glass window by an adhesive member. For example, as described above with reference to FIGS. 7 to 9, any one of the first protection member 356 and the second protection member 357 may be attached or coupled to the vehicle interior material 130, the vehicle glass window 230, or the plates 360, 370, and 380 by an adhesive member 361.

The first adhesive layer 354 may be disposed at the first surface of each of the plurality of vibration devices 350A to 350D, and between the plurality of vibration devices 350A to 350D. For example, the first adhesive layer 354 may be formed at a rear surface (or an inner surface) of the first protection member 356 facing the first surface of the sound generator 350, disposed at the first surface of each of the plurality of vibration devices 350A to 350D, and filled between the plurality of vibration devices 350A to 350D.

The second adhesive layer 355 may be disposed at the second surface of each of the plurality of vibration devices 350A to 350D, and between the plurality of vibration devices 350A to 350D. For example, the second adhesive layer 355 may be formed at a front surface (or an inner surface) of the second protection member 357 facing the second surface of the sound generator 350, disposed at the second surface of each of the plurality of vibration devices 350A to 350D, and filled between the plurality of vibration devices 350A to 350D.

The first and second adhesive layers 354 and 355 may be connected or coupled to each other between the plurality of vibration devices 350A to 350D. Therefore, each of the plurality of vibration devices 350A to 350D may be surrounded by the first and second adhesive layers 354 and 355. For example, the first and second adhesive layers 354 and 355 may entirely surround the whole plurality of vibration devices 350A to 350D. For example, the plurality of vibration devices 350A to 350D may be embedded between the first and second adhesive layers 354 and 355. For example, the first and second adhesive layers 354 and 355 may be referred to as a cover member, but embodiments of the present disclosure are not limited thereto. When each of the first and second adhesive layers 354 and 355 is a cover member, the first protection member 356 may be disposed at a first surface of the cover member, and the second protection member 357 may be disposed at a second surface of the cover member.

Each of the first and second adhesive layers 354 and 355 according to an embodiment of the present disclosure may include an electric insulating material which has adhesiveness and is capable of compression and decompression. For example, each of the first and second adhesive layers 354 and 355 may include an epoxy resin, an acryl resin, a silicone resin, or a urethane resin, but embodiments of the present disclosure are not limited thereto. For example, each of the first and second adhesive layers 354 and 355 may be configured to be transparent, semitransparent, or opaque according to the location of the vehicle where the sound generator 350 is disposed.

The sound generator 350 according to another embodiment of the present disclosure may further include a first power supply line PL1 disposed at the first protection member 356, a second power supply line PL2 disposed at the second protection member 357, and a pad part 358 electrically connected to the first power supply line PL1 and the second power supply line PL2.

The first power supply line PL1 may be disposed at a rear surface of the first protection member 356 facing the first surface of the sound generator 350. The first power supply line PL1 may be electrically connected to the first electrode portion E1 of each of the plurality of vibration devices 350A to 350D. For example, the first power supply line PL1 may be directly and electrically connected to the first electrode portion E1 of each of the plurality of vibration devices 350A to 350D. For example, the first power supply line PL1 may be electrically connected to the first electrode portion E1 of each of the plurality of vibration devices 350A to 350D by an anisotropic conductive film. As another example of the present disclosure, the first power supply line PL1 may be electrically connected to the first electrode portion E1 of each of the plurality of vibration devices 350A to 350D by a conductive material (or particle) included in the first adhesive layer 354.

The first power supply line PL1 according to an embodiment of the present disclosure may include first and second upper power lines PL11 and PL12 disposed along a second direction Y. For example, the first upper power line PL11 may be electrically connected to the first electrode portion E1 of each of the first and third vibration devices 350A and 350C (or a first module group or a first group) arranged at a first column parallel to the second direction Y among the plurality of vibration devices 350A to 350D. The second upper power line PL12 may be electrically connected to the first electrode portion E1 of each of the second and fourth vibration devices 350B and 350D (or a second module group or a second group) arranged at a second column parallel to the second direction Y among the plurality of vibration devices 350A to 350D.

The second power supply line PL2 may be disposed at a front surface of the second protection member 357 facing the second surface of the sound generator 350. The second power supply line PL2 may be electrically connected to the second electrode portion E2 of each of the plurality of vibration devices 350A to 350D. For example, the second power supply line PL2 may be directly and electrically connected to the second electrode portion E2 of each of the plurality of vibration devices 350A to 350D. For example, the second power supply line PL2 may be electrically connected to the second electrode portion E2 of each of the plurality of vibration devices 350A to 350D by an anisotropic conductive film. As another example, the second power supply line PL2 may be electrically connected to the second electrode portion E2 of each of the plurality of vibration devices 350A to 350D by a conductive material (or particle) included in the second adhesive layer 355.

The second power supply line PL2 according to an embodiment of the present disclosure may include first and second lower power lines PL21 and PL22 disposed along a second direction Y. For example, the first lower power line PL21 may be electrically connected to the second electrode portion E2 of each of the first and third vibration devices 350A and 350C (or a first module group or a first group) arranged at the first column parallel to the second direction Y among the plurality of vibration devices 350A to 350D. The second lower power line PL22 may be electrically connected to the second electrode portion E2 of each of the second and fourth vibration devices 350B and 350D (or a second module group or a second group) arranged at the second column parallel to the second direction Y among the plurality of vibration devices 350A to 350D.

The pad part 358 may be disposed at the sound generator 350 so as to be electrically connected to one portion (or one end or one side) of at least one or more among the first power supply line PL1 and the second power supply line PL2. The pad part 358 according to an embodiment of the present disclosure may include a first pad electrode electrically connected to one portion of the first power supply line PL1 and a second pad electrode electrically connected to one portion of the second power supply line PL2.

The first pad electrode may be connected to one portion of each of the first and second upper power lines PL11 and PL12 of the first power supply line PL1. For example, the one portion of each of the first and second upper power lines PL11 and PL12 may branch from the first pad electrode.

The second pad electrode may be connected to one portion of each of the first and second lower power lines PL21 and PL22 of the second power supply line PL2. For example, the one portion of each of the first and second lower power lines PL21 and PL22 may branch from the second pad electrode.

According to an embodiment of the present disclosure, each of the first power supply line PL1, the second power supply line PL2, and the pad part 358 may be configured to be a transparent conductive material, a semitransparent conductive material, or an opaque conductive material so as to be transparent, translucent, or opaque according to the location of the vehicle where the sound generator 350 is disposed.

The sound generator 350 according to another embodiment of the present disclosure may further include a flexible cable 359.

The flexible cable 359 may be electrically connected to the pad part 358 disposed at the sound generator 350 and may supply the sound generator 350 with one or more vibration driving signals (or a sound signal) provided from a sound processing circuit. The flexible cable 359 according to an embodiment of the present disclosure may include a first terminal electrically connected to the first pad electrode of the pad part 358 and a second terminal electrically connected to the second pad electrode of the pad part 358. For example, the flexible cable 359 may be a flexible printed circuit cable or a flexible flat cable, but embodiments of the present disclosure are not limited thereto.

The sound processing circuit may generate an alternating current (AC) vibration driving signal including a first vibration driving signal and a second vibration driving signal based on a sound source. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode portion E1 of each of the plurality of vibration devices 350A to 350D through a first terminal of the flexible cable 359, the first pad electrode of the pad part 358, and the first power supply line PL1. The second vibration driving signal may be supplied to the second electrode portion E2 of each of the plurality of vibration devices 350A to 350D through a second terminal of the flexible cable 359, the second pad electrode of the pad part 358, and the second power supply line PL2.

Therefore, the sound generator 350 according to an embodiment of the present disclosure may include the plurality of vibration devices 350A to 350D which are arranged (or tiled) at a certain interval D1 and D2 so as to be implemented as a single vibrator without being independently driven, and thus, may be driven as a large-area vibrator based on a single-body vibration of the plurality of vibration devices 350A to 350D. Accordingly, a large area of a vehicle interior material or a vehicle glass window may vibrate or vibrate by itself in a large-area, thereby increasing or enhancing a sound characteristic and a sound pressure level characteristic in the low-pitched sound band and a reproduction band of a sound output toward one or more of the indoor space IS and the outside of the vehicle.

Figure 16:
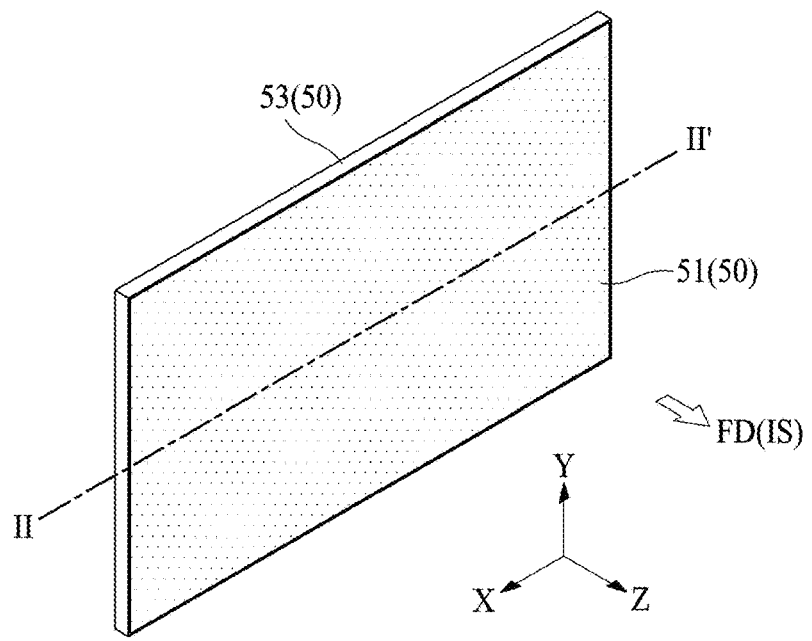
FIG. 16 illustrates a display apparatus including a sound generating apparatus for vehicles according to an embodiment of the present disclosure.
Figure 17:
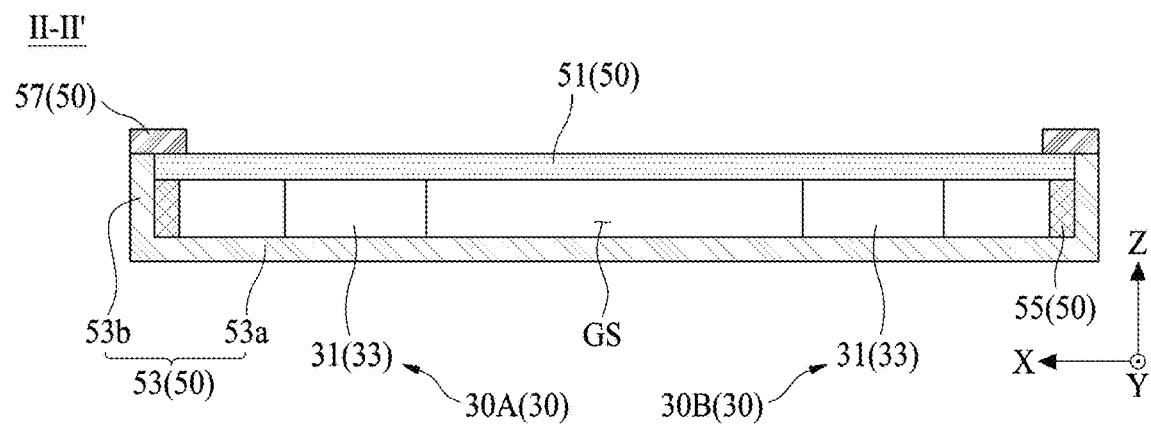
FIG. 17 is a cross-sectional view taken along line II-IF illustrated in FIG. 16.

FIG. 16 illustrates a display apparatus including a sound generating apparatus for vehicles according to an embodiment of the present disclosure, and FIG. 17 is a cross-sectional view taken along line II-IF illustrated in FIG. 16.

With reference to FIGS. 16 and 17, the display apparatus 50 according to an embodiment of the present disclosure may be a display which is disposed at at least one or more among an instrument panel device (or an instrument panel module, or a dashboard module, or a dashboard device) and an infotainment device (or an infotainment module) which are classified into vehicle interior materials, or may be a display which is embedded in or buried into at least one or more among a headrest and a rear surface of a seat of a vehicle, but embodiments of the present disclosure are not limited thereto. For example, the display apparatus 50 disposed at the instrument panel device may provide a driver with various information such as vehicle state information and driving-related information such as a driving time, a velocity, fuel quantity, and engine revolutions per minute (RPM) of a vehicle. For example, the display apparatus 50 disposed at the infotainment device (or an infotainment module or an infotainment system) may be connected to a vehicle convenience system, such as an audio system, an air conditioning system, and a multimedia system, and a navigation system which are mounted in a vehicle, may display a control icon for controlling a corresponding vehicle convenience system and navigation information provided from the navigation system, and may provide a passenger of a vehicle with a sound corresponding to a sound signal provided from the audio system and/or the multimedia system.

The display apparatus 50 according to an embodiment of the present disclosure may include a display panel 51 and at least one or more sound generating apparatus 30 on a rear surface of the display panel 51.

The display panel 51 may display an electronic image or a digital image. For example, the display panel 51 may output light and display an image.

According an embodiment of the present disclosure, the display panel 51 may be a curved display panel, or may be any type of display panel, such as a liquid crystal display panel, an organic light-emitting display panel, a quantum dot light-emitting display panel, a micro light-emitting diode display panel, an electrophoresis display panel, and an electro-wetting display panel, but embodiments of the present disclosure are not limited thereto. According another embodiment of the present disclosure, the display panel 51 may be a transparent display panel or a flexible display panel. According to another embodiment of the present disclosure, the display panel 51 may be a display panel with integrated touch panel. For example, the display panel with integrated touch panel may include a touch panel attached on a display panel, or may include a touch electrode portion disposed at the display panel.

The display apparatus 50 according to an embodiment of the present disclosure may further include a rear structure (or rear surface structure) 53 disposed at a rear surface of the display panel 51 and a panel connection member 55 disposed between the display panel 51 and the rear structure 53.

The rear structure 53 may be disposed at a rear surface of the display panel 51. For example, the rear structure 53 may cover the rear surface of the display panel 51. For example, the rear structure 53 may cover a whole rear surface of the display panel 51 with a gap space GS therebetween. For example, the rear structure 53 may be implemented as a frame or a plate structure of an arbitrary type disposed at the rear surface of the display panel 51.

The rear structure 53 according to an embodiment of the present disclosure may additionally cover a side surface of the display panel 51. For example, the rear structure 53 may include a rear surface portion 53a that covers the rear surface of the display panel 51 with the gap space GS therebetween, and a side surface portion 53b connected to an end of the rear surface portion 53a and covering the side surface of the display panel 51. However, embodiments of the present disclosure are not limited thereto. For example, the rear surface portion 53a and the side surface portion 53b of the rear structure 53 may be integrated as one body.

The display apparatus 50 according to an embodiment of the present disclosure may further include a front member 57 that covers a periphery of a front surface of the display panel 51. The front member 57 may have a frame shape that may include an opening overlapping the display area of the display panel 51. For example, the front member 57 may be connected to the side surface portion 53b of the rear structure 53.

The at least one or more sound generating apparatus 30 may vibrate the display panel 51 by the display panel 51 as a vibration plate to output a sound in a forward direction (FD) of the display panel 51 or to one or more of the indoor space IS and the outside of a vehicle. For example, the at least one or more sound generating apparatus 30 may directly vibrate the display panel 51 and output the sound S in the forward direction of the display panel 51 or to one or more of the indoor space IS and the outside of the vehicle. For example, the at least one or more sound generating apparatus 30 may be configured to vibrate the display panel 51, and thus, may be a vibration device or a display vibration device.

The at least one or more sound generating apparatus 30 may include sound generating devices 31 and 33 which are disposed at or connected to a rear surface (or a back surface) of the display panel 51.

In an embodiment of the present disclosure, the sound generating devices 31 and 33 may be disposed at the rear surface portion 53a of the rear structure 53. For example, the sound generating devices 31 and 33 may be supported by or coupled to the rear surface portion 53a of the rear structure 53 and may be connected to the rear surface (or the back surface) of the display panel 51. In another embodiment of the present disclosure, the sound generating devices 31 and 33 may be spaced apart from the rear surface portion 53a of the rear structure 53. For example, the sound generating devices 31 and 33 may be spaced apart from the rear surface portion 53a of the rear structure 53 and may be connected to the rear surface (or the back surface) of the display panel 51.

The sound generating devices 31 and 33 according to an embodiment of the present disclosure may include the sound generating devices 31 and 33 described above with reference to one of FIGS. 1 to 9. For example, except for that the vehicle structure 110 in the sound generating devices 31 and 33 described above with reference to FIGS. 1, 2, and 4 to 8 has been changed to the rear structure 53 and the vehicle interior material 130 therein is changed to the display panel 51, the sound generating devices 31 and 33 according to an embodiment of the present disclosure may be substantially the same as the sound generating devices 31 and 33 described above with reference to FIGS. 1, 2, and 4 to 8, and thus, like reference numerals refer to like elements and their repetitive descriptions may be omitted. For example, except for that the vehicle glass window 230 in the sound generating devices 31 and 33 described above with reference to FIGS. 3 and 9 has been changed to the display panel 51, the sound generating devices 31 and 33 according to an embodiment of the present disclosure may be substantially the same as the sound generating devices 31 and 33 described above with reference to FIGS. 3 and 9, and thus, like reference numerals refer to like elements and their repetitive descriptions may be omitted. Also, the sound generator 350 of the sound generating devices 31 and 33 described above with reference to FIGS. 7 to 9 may be configured as the sound generator 350 described above with reference to FIGS. 10 to 15.

The display apparatus 50 according to an embodiment of the present disclosure may include a plurality of sound generating apparatuses 30A and 30B which are disposed at the rear surface of the display panel 51. For example, the display apparatus 50 may include first and second sound generating apparatuses 30A and 30B which are respectively disposed at a first rear region (or a left region) and a second rear region (or a right region) of the display panel 51. At least one or more of the first and second sound generating apparatuses 30A and 30B may include the sound generating devices 31 and 33 described above with reference to one or more of FIGS. 1 to 9. For example, the display apparatus 50 may include a third sound generating apparatus which is further disposed at a third rear region (or a middle region) between the first rear region and the second rear region of the display panel 51. The third sound generating apparatus may include the sound generating devices 31 and 33 described above with reference to one or more of FIGS. 1 to 9.

The sound generating devices 31 and 33 according to an embodiment of the present disclosure may vibrate the display panel 51 in response to a sound signal (or a voice signal) from the outside. For example, the sound generating devices 31 and 33 may directly vibrate the display panel 51 in response to the sound signal (or the voice signal) from the outside. For example, the sound generating devices 31 and 33 may vibrate based on a sound signal synchronized with an image displayed by the display panel 51 to vibrate the display panel 51. As another example, the sound generating devices 31 and 33 may vibrate based on a haptic feedback signal (or a tactile feedback signal) synchronized with a user touch applied to a touch panel (or a touch sensor layer). Accordingly, the display panel 51 may vibrate based on vibrations of the sound generating devices 31 and 33 to provide a user (or a viewer) with one or more of a sound and a haptic feedback.

Figure 18:
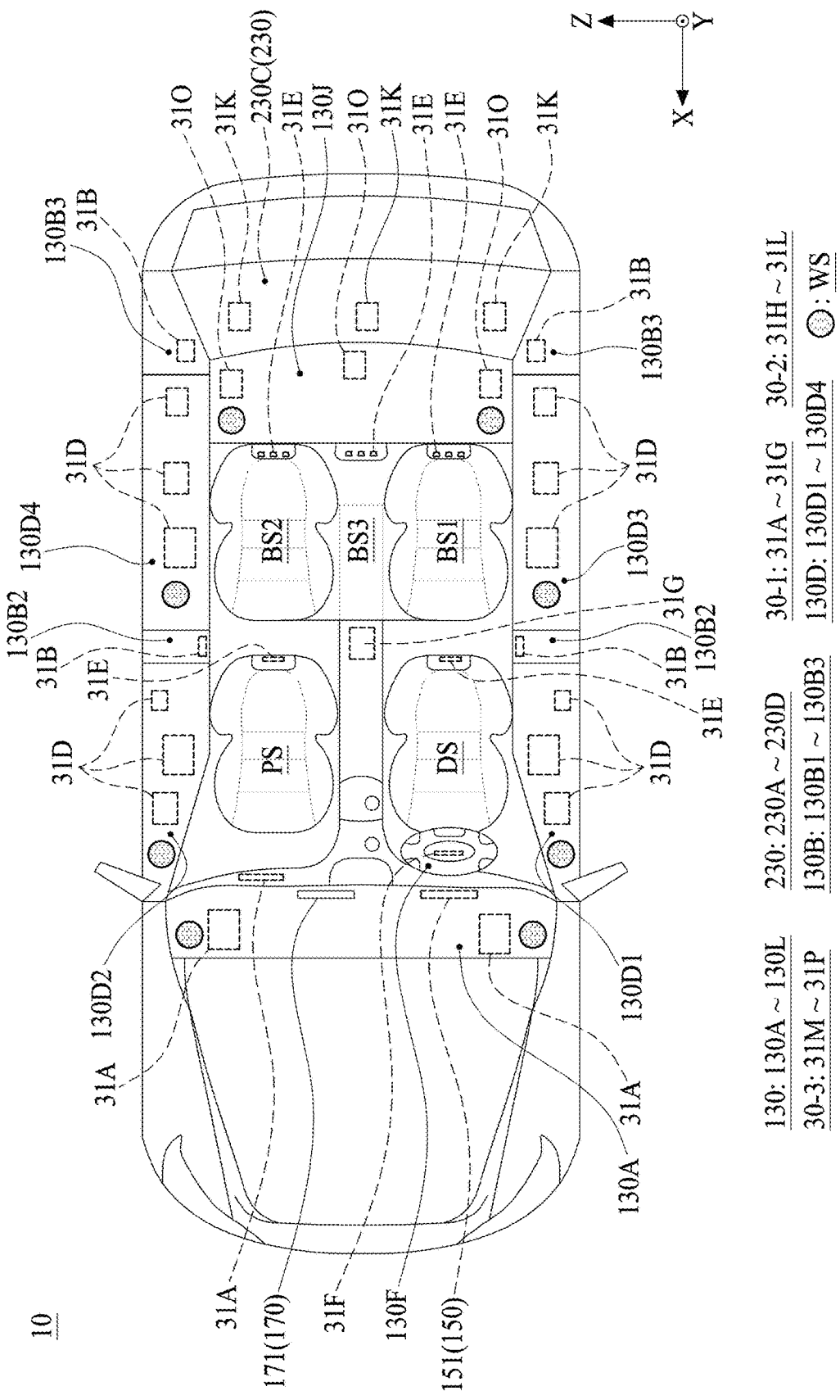
FIG. 18 illustrates a vehicle according to an embodiment of the present disclosure.
Figure 19:
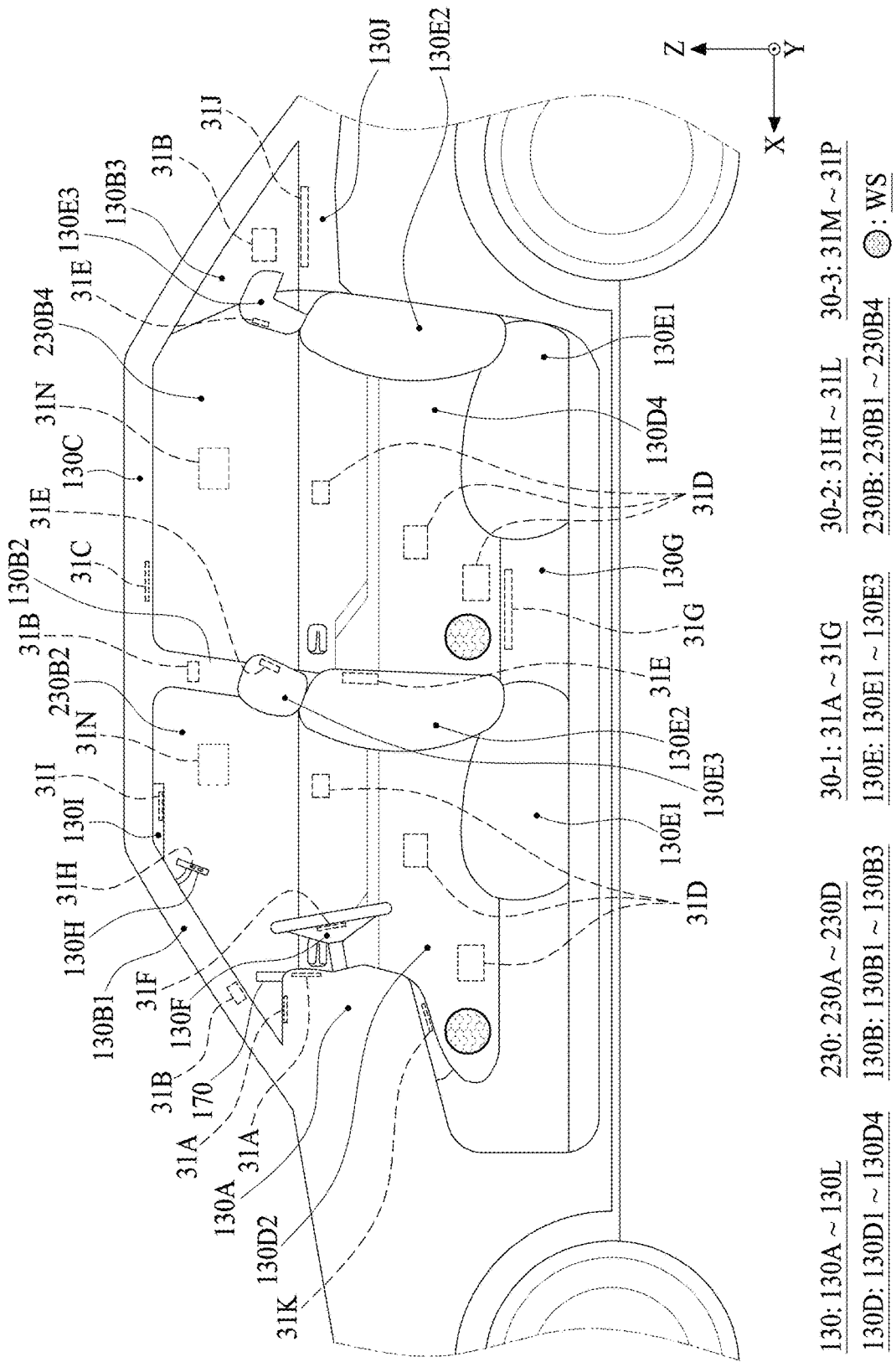
FIG. 19 is a cross-sectional view illustrating a vehicle according to an embodiment of the present disclosure.
Figure 20:
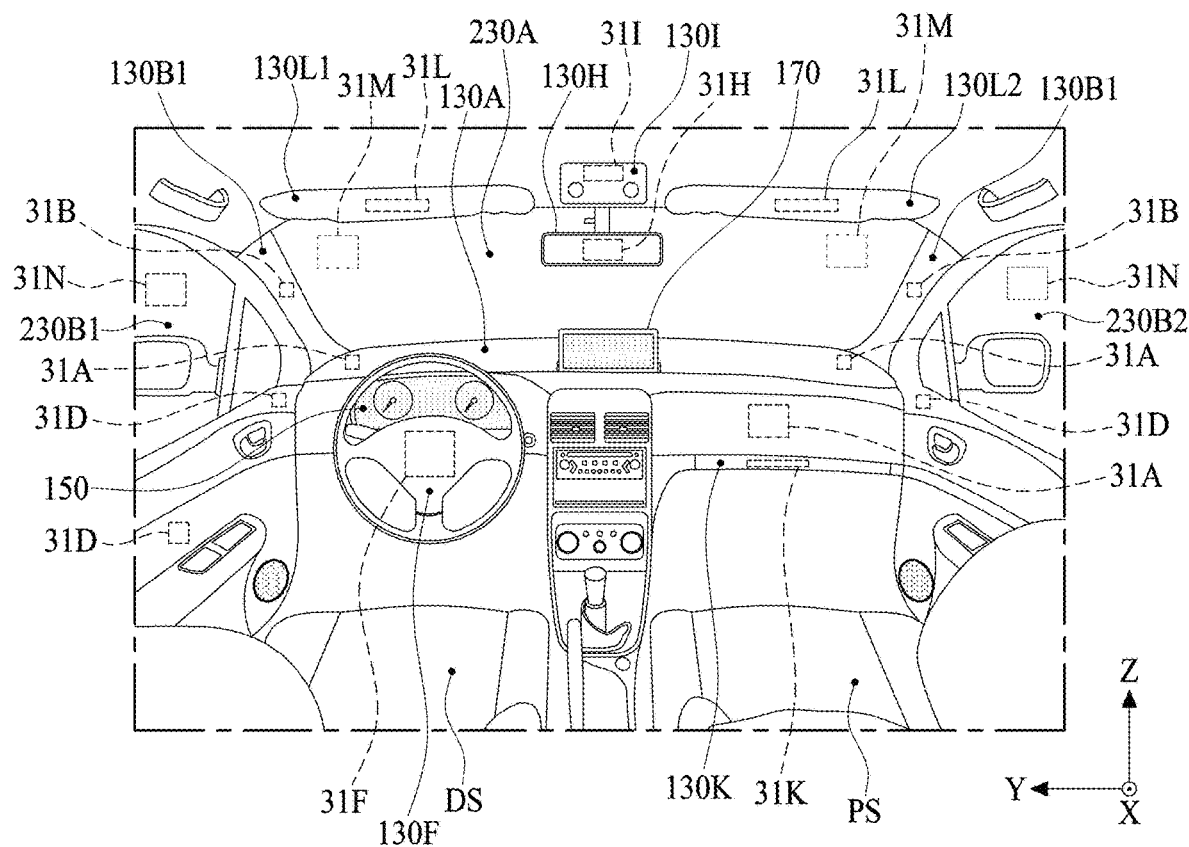
FIG. 20 illustrates a sound generating apparatus disposed near a driver seat and a passenger seat of FIGS. 18 and 19.
Figure 21:
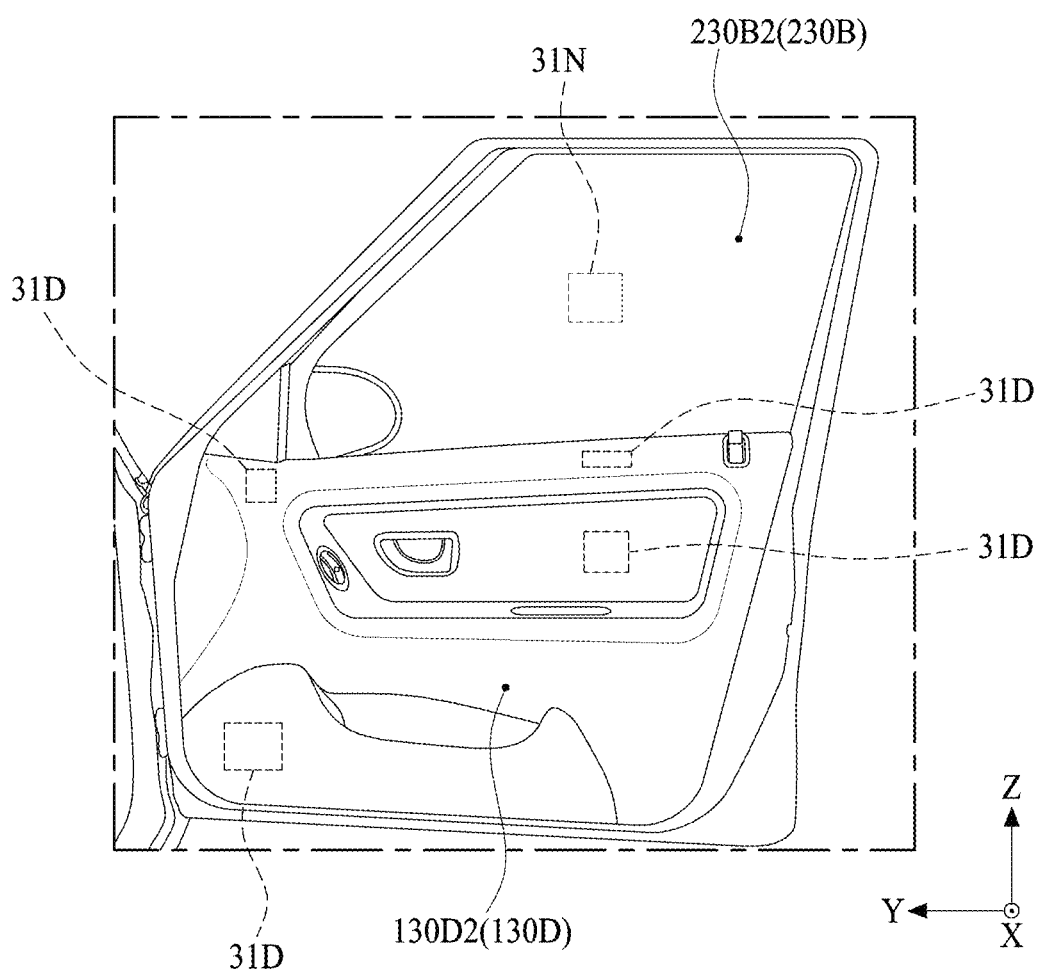
FIG. 21 illustrates a sound generating apparatus disposed near a door and a glass window of FIGS. 18 and 19.
Figure 22:
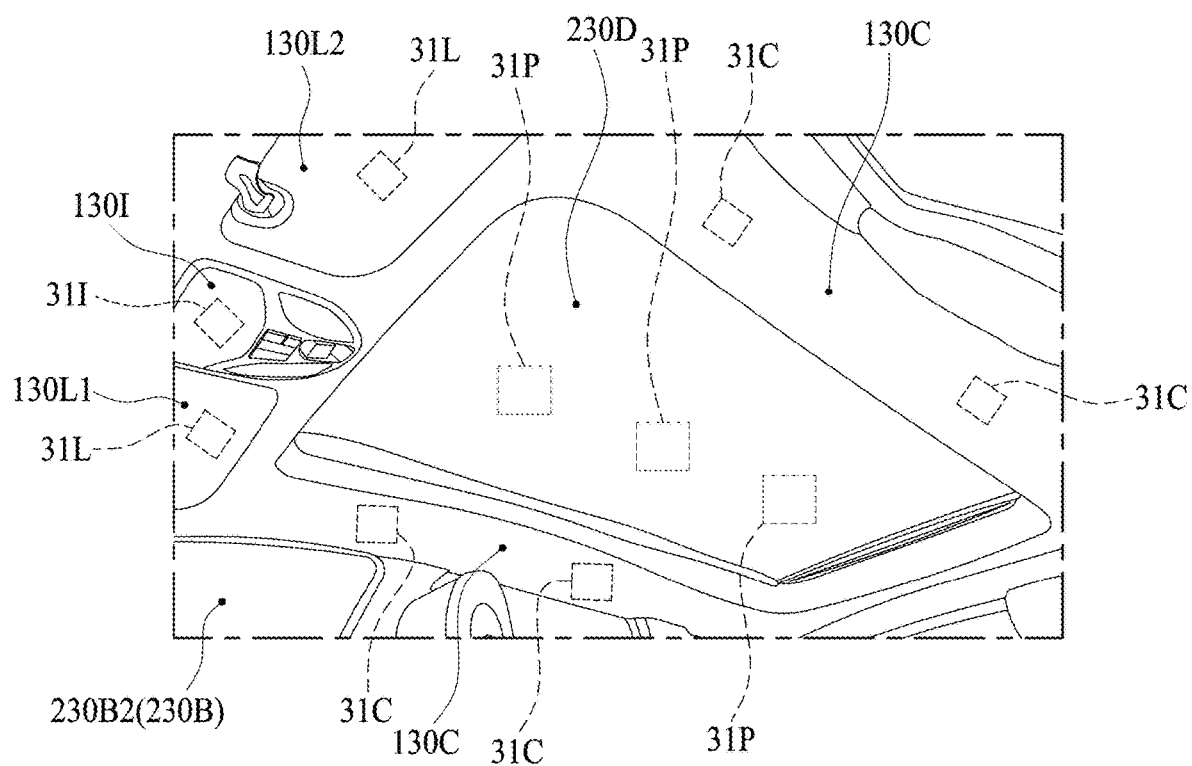
FIG. 22 illustrates a sound generating apparatus disposed near a roof a vehicle of FIGS. 18 and 19.
Figure 23:
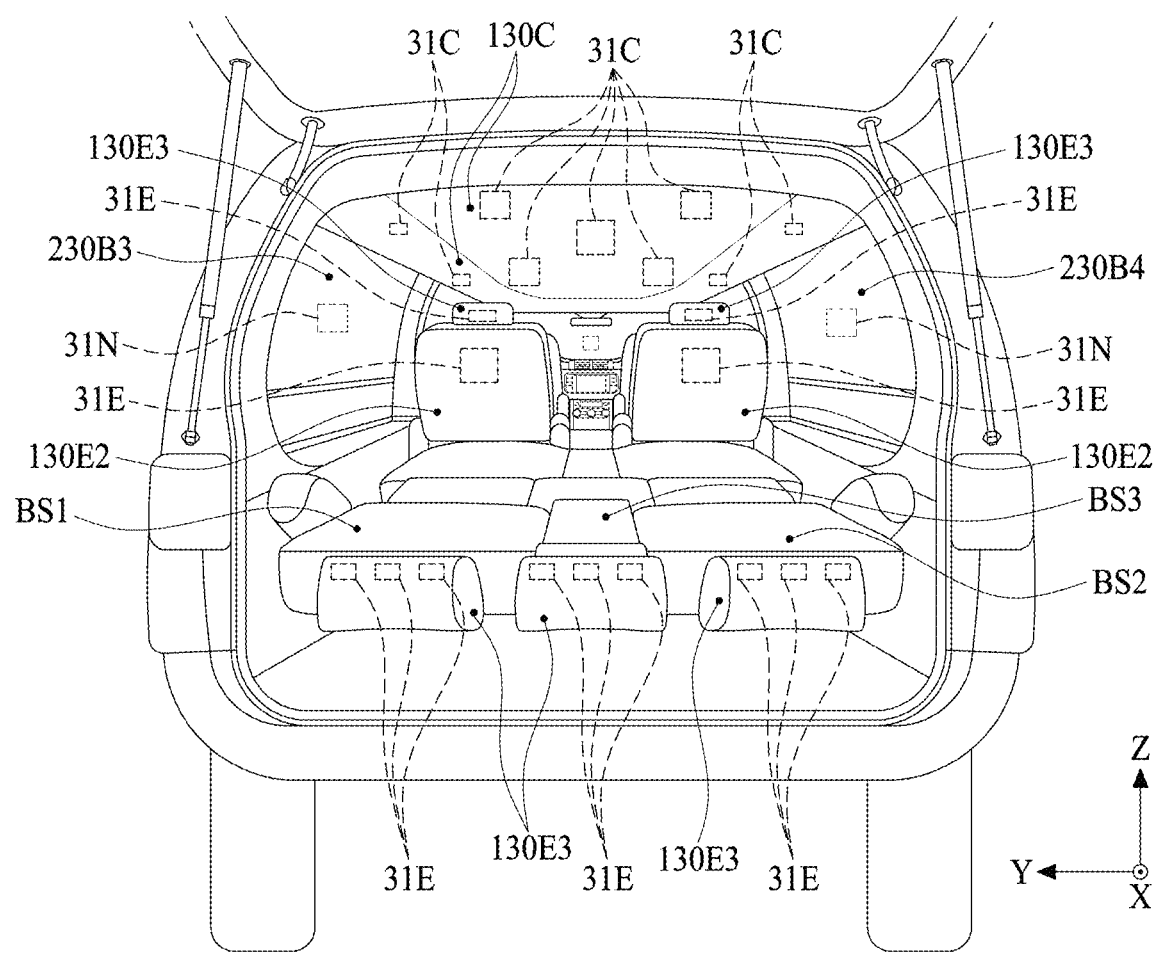
FIG. 23 illustrates a sound generating apparatus disposed at a roof and a seat of a vehicle of FIGS. 18 and 19.

FIG. 18 illustrates a vehicle according to an embodiment of the present disclosure. FIG. 19 is a cross-sectional view illustrating a vehicle according to an embodiment of the present disclosure. FIG. 20 illustrates a sound generating apparatus disposed near a driver seat and a passenger seat of FIGS. 18 and 19. FIG. 21 illustrates a sound generating apparatus disposed near a door and a glass window of FIGS. 18 and 19. FIG. 22 illustrates a sound generating apparatus disposed near a roof a vehicle of FIGS. 18 and 19. FIG. 23 illustrates a sound generating apparatus disposed at a roof and a seat of a vehicle of FIGS. 18 and 19.

With reference to FIGS. 18 to 23, a vehicle 10 according to an embodiment of the present disclosure may include a vehicle interior material 130 and a first sound generating apparatus 30-1. The vehicle interior material 130 may cover a vehicle structure and may be exposed at an indoor space. The first sound generating apparatus 30-1 may be disposed between the vehicle structure 110 and the vehicle interior material 130.

The first sound generating apparatus 30-1 may include at least one or more sound generating devices 31A to 31G which are disposed between the vehicle structure and one or more of a dashboard 130A, a pillar interior material 130B, a roof interior material 130C, a door interior material 130D, a seat interior material 130E, a handle interior material 130F, and a floor interior material 130G. For example, the first sound generating apparatus 30-1 may include at least one or more of the first to seventh sound generating devices 31A to 31G and may output sounds of one or more channels by the one or more sound generating devices.

With reference to FIGS. 18 to 20, the first sound generating device 31A according to an embodiment of the present disclosure may be disposed between the dashboard 130A and a dash panel among a main frame of the vehicle structure and may vibrate the dashboard 130A to output a sound based on a vibration of the dashboard 130A. For example, the first sound generating device 31A may be configured to directly vibrate the dashboard 130A to output a sound based on a vibration of the dashboard 130A. For example, the first sound generating device 31A may include the sound generating devices 31 and 33 described above with reference to FIGS. 1, 2, and 4 to 8, and thus, its repetitive description may be omitted. For example, the first sound generating device 31A may be a dashboard speaker or a first vehicle speaker.

According to an embodiment of the present disclosure, at least one or more of the dash panel and the dashboard 130A may include a first region corresponding to a driver seat DS, a second region corresponding to a passenger seat PS, and a third region (or a middle region) between the first region and the second region. At least one or more of the dash panel and the dashboard 130A may include a fourth region which is inclined to face the passenger seat PS. According to an embodiment of the present disclosure, the first sound generating device 31A may be configured to dispose to vibrate at least one or more among the first to fourth regions of the dashboard 130A. For example, the first sound generating device 31A may be disposed at each of the first and second regions of the dashboard 130A, or may be disposed at each of the first to fourth regions. For example, the first sound generating device 31A may be disposed at each of the first and second regions of the dashboard 130A, or may be disposed at at least one or more of the first to fourth regions. For example, the first sound generating device 31A may be configured to output a sound of about 150 Hz to about 20 kHz. For example, the first sound generating device 31A configured to vibrate at least one or more among the first to fourth regions of the dashboard 130A may have the same sound output characteristic or different sound output characteristics. For example, the first sound generating device 31A configured to vibrate each of the first to fourth regions of the dashboard 130A may have the same sound output characteristic or different sound output characteristics.

The second sound generating device 31B according to an embodiment of the present disclosure may be disposed between the pillar interior material 130B and a pillar panel among the main frame of the vehicle structure and may vibrate the pillar interior material 130B to output a sound based on a vibration of the pillar interior material 130B. For example, the second sound generating device 31B may directly vibrate the pillar interior material 130B to output a sound based on a vibration of the pillar interior material 130B. For example, the second sound generating device 31B may include the sound generating devices 31 and 33 described above with reference to FIGS. 1, 2, and 4 to 8, and thus, its repetitive description may be omitted. For example, the second sound generating device 31B may be a pillar speaker, a tweeter speaker, a tweeter, or a second vehicle speaker.

According to an embodiment of the present disclosure, the pillar panel may include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 130B may include a first pillar interior material 130B1 covering the first pillar, a second pillar interior material 130B2 covering the second pillar, and a third pillar interior material 130B3 covering the third pillar. According to an embodiment of the present disclosure, the second sound generating device 31B may be disposed in at least one or more of a region between the first pillar and the first pillar interior material 130B1, a region between the second pillar and the second pillar interior material 130B2, and a region between the third pillar and the third pillar interior material 130B3, and thus, may vibrate at least one or more of the first to third pillar interior materials 130B1 to 130B3. For example, the second sound generating device 31B may be configured to output a sound at about 2 kHz to about 20 kHz, but embodiments of the present disclosure are not limited thereto. For example, the second sound generating device 31B may be configured to output a sound at about 150 Hz to about 20 kHz. For example, the second sound generating device 31B configured to vibrate at least one or more of the first to third pillar interior materials 130B1 to 130B3 may have the same sound output characteristic or different sound output characteristics.

With reference to FIGS. 19, 22, and 23, the third sound generating device 31C according to an embodiment of the present disclosure may be disposed between the roof interior material 130C and a roof panel among the main frame of the vehicle structure and may vibrate the roof interior material 130C to output a sound based on a vibration of the roof interior material 130C. For example, the third sound generating device 31C may directly vibrate the roof interior material 130C to output a sound based on a vibration of the roof interior material 130C. For example, the third sound generating device 31C may include the sound generating devices 31 and 33 described above with reference to FIGS. 1, 2, and 4 to 8, and thus, its repetitive description may be omitted. For example, the third sound generating device 31C may be a roof speaker or a third vehicle speaker.

According to an embodiment of the present disclosure, at least one or more of the roof panel and the roof interior material 130C covering the roof panel may include the first region corresponding to the driver seat DS, the second region corresponding to the passenger seat PS, a third region corresponding to a region between the driver seat DS and the passenger seat PS, a fourth region corresponding to a first rear seat BS1 behind the driver seat DS, a fifth region corresponding to a second rear seat BS2 behind the passenger seat PS, a sixth region corresponding to a region between the first rear seat BS1 and the second rear seat BS2, and a seventh region between the third region and the sixth region. For example, the third sound generating device 31C may be disposed to vibrate at least one or more among the first to seventh regions of the roof interior material 130C. For example, the third sound generating device 31C may be configured to output a sound of about 150 Hz to about 20 kHz. For example, the third sound generating device 31C configured to vibrate at least one or more among the first to seventh regions of the roof interior material 130C may have the same sound output characteristic or different sound output characteristics. For example, the third sound generating device 31C configured to vibrate each of the first to seventh regions of the roof interior material 130C may have the same sound output characteristic or different sound output characteristics. For example, at least one or more third sound generating devices 31C configured to vibrate at least one or more among the first to seventh regions of the roof interior material 130C may be configured to output a sound of about 2 kHz to about 20 kHz, and the other third sound generating devices 31C may be configured to output a sound at about 150 Hz to about 20 kHz. For example, at least one or more third sound generating devices 31C configured to vibrate each of the first to seventh regions of the roof interior material 130C may be configured to output a sound of about 2 kHz to about 20 kHz, and the other third sound generating devices 31C may be configured to output a sound at about 150 Hz to about 20 kHz.

With reference to FIGS. 18 to 21, the fourth sound generating device 31D according to an embodiment of the present disclosure may be disposed between the door interior material 130D and a door frame of the vehicle structure and may vibrate the door interior material 130D to output a sound based on a vibration of the door interior material 130D. For example, the fourth sound generating device 31D may directly vibrate the door interior material 130D to output a sound based on a vibration of the door interior material 130D. According to an embodiment of the present disclosure, the fourth sound generating device 31D may include the sound generating devices 31 and 33 described above with reference to FIGS. 1, 2, and 4 to 8, and thus, its repetitive description may be omitted. For example, the fourth sound generating device 31D may be a door speaker or a fourth vehicle speaker.

According to an embodiment of the present disclosure, at least one or more of the door frame and the door interior material 130D may include an upper region, a middle region, and a lower region with respect to a height direction Z of the vehicle 10. For example, the fourth sound generating device 31D may be disposed at at least one or more of an upper region, a middle region, and a lower region between the door frame and the door interior material 130D, and thus, may vibrate at least one or more among an upper region, a middle region, and a lower region of the door interior material 130D.

According to an embodiment of the present disclosure, the upper region of the door interior material 130D may have a relatively small curvature radius. The fourth sound generating device 31D for vibrating the upper region of the door interior material 130D may include the sound generator 350 having a flexible characteristic described above with reference to FIGS. 11 to 15.

According to an embodiment of the present disclosure, the door frame may include a first door frame (or a left front door frame), a second door frame (or a right front door frame), a third door frame (or a left rear door frame), and a fourth door frame (or a right rear door frame). According to an embodiment of the present disclosure, the door interior material 130D may include a first door interior material (or a left front door interior material) 130D1 covering the first door frame, a second door interior material (or a right front door interior material) 130D2 covering the second door frame, a third door interior material (or a left rear door interior material) 130D3 covering the third door frame, and a fourth door interior material (or a right rear door interior material) 130D4 covering the fourth door frame. For example, the fourth sound generating device 31D may be disposed at at least one or more of an upper region, a middle region, and a lower region between each of the first to fourth door frames and the first to fourth door interior materials 130D1 to 130D4 and may vibrate at least one or more among an upper region, a middle region, and a lower region of each of the first to fourth door interior materials 130D1 to 130D4.

According to an embodiment of the present disclosure, the fourth sound generating device 31D configured to vibrate the upper region of each of the first to fourth door interior materials 130D1 to 130D4 may be configured to output a sound of about 2 kHz to about 20 kHz, or may be configured to output a sound of about 150 Hz to about 20 kHz. For example, the fourth sound generating device 31D configured to vibrate the upper regions of at least one or more among the first to fourth door interior materials 130D1 to 130D4 may be configured to output a sound of about 2 kHz to about 20 kHz, or may be configured to output a sound of about 150 Hz to about 20 kHz.

According to an embodiment of the present disclosure, the fourth sound generating device 31D configured to vibrate the middle regions or/and the lower regions of at least one or more among the first to fourth door interior materials 130D1 to 130D4 may be configured to output a sound of about 150 Hz to about 20 kHz. For example, the fourth sound generating device 31D configured to vibrate the middle region or/and the lower region among each of the first to fourth door interior materials 130D1 to 130D4 may be configured to output a sound of about 150 Hz to about 20 kHz. For example, the fourth sound generating device 31D configured to vibrate the middle regions or/and the lower regions of at least one or more among the first to fourth door interior materials 130D1 to 130D4 may be one or more of a woofer, a mid-woofer, and a sub-woofer. For example, the fourth sound generating device 31D configured to vibrate the middle region or/and the lower region among each of the first to fourth door interior materials 130D1 to 130D4 may be one or more of a woofer, a mid-woofer, and a sub-woofer.

Sounds, which are respectively output from the fourth sound generating device 31D disposed at the first door interior material 130D1 and the fourth sound generating device 31D disposed at the second door interior material 130D2, may be combined and output. For example, sounds, which are output from at least one or more of the fourth sound generating device 31D disposed at the first door interior material 130D1 and the fourth sound generating device 31D disposed at the second door interior material 130D2, may be combined and output. Also, a sound output from the fourth sound generating device 31D disposed at the third door interior material 130D3 and a sound output from the fourth sound generating device 31D disposed at the fourth door interior material 130D4 may be combined and output.

According to an embodiment of the present disclosure, an upper region of each of the first to fourth door interior materials 130D1 to 130D4 may include a first upper region adjacent to the dashboard 130A, a second upper region adjacent to the rear seats BS1 to BS3, and a third upper region between the first upper region and the second upper region. For example, the fourth sound generating device 31D may be disposed in one or more among the first to third upper regions of each of the first to fourth door interior materials 130D1 to 130D4. For example, the fourth sound generating device 31D may be disposed at the first upper region of each of the first and second door interior materials 130D1 and 130D2 and may be disposed at one or more of the second and third upper regions of each of the first and second door interior materials 130D1 and 130D2. For example, the fourth sound generating device 31D may be disposed at one or more among the first to third upper regions of one or more among the first to fourth door interior materials 130D1 to 130D4. For example, the fourth sound generating device 31D configured to vibrate the first upper regions of one or more among the first and second door interior materials 130D1 and 130D2 may be configured to output a sound of about 2 kHz to about 20 kHz, and the fourth sound generating device 31D configured to vibrate one or more among the second and third upper regions of each of the first and second door interior materials 130D1 and 130D2 may be configured to output a sound of about 2 kHz to about 20 kHz, or may be configured to output a sound of about 150 Hz to about 20 kHz. For example, the fourth sound generating device 31D configured to vibrate one or more among the second and third upper regions of one or more among the first and second door interior materials 130D1 and 130D2 may be configured to output a sound of about 2 kHz to about 20 kHz, or may be configured to output a sound of about 150 Hz to about 20 kHz.

With reference to FIGS. 18, 19, and 23, the fifth sound generating device 31E according to an embodiment of the present disclosure may be disposed between a seat frame and the seat interior material 130E and may vibrate the seat interior material 130E to output a sound based on a vibration of the seat interior material 130E. For example, the fifth sound generating device 31E may directly vibrate the seat interior material 130E to output a sound based on a vibration of the seat interior material 130E. For example, the fifth sound generating device 31E may include the sound generating devices 31 and 33 described above with reference to FIGS. 1, 2, and 4 to 8, and thus, its repetitive description may be omitted. For example, the fifth sound generating device 31E may be a sheet speaker, a headrest speaker, or a fifth vehicle speaker.

According to an embodiment of the present disclosure, the seat frame may include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the first seat interior material surrounding the first seat frame, the second seat interior material surrounding the second seat frame, the third seat interior material surrounding the third seat frame, the fourth seat interior material surrounding the fourth seat frame, and the fifth seat interior material surrounding the fifth seat frame.

According to an embodiment of the present disclosure, at least one or more among the first to fifth seat frames may include a seat bottom frame, a seat back frame, and a headrest frame. The seat interior material 130E may include a seat bottom interior material 130E1 surrounding the seat bottom frame, a seat back interior material 130E2 surrounding the seat back frame, and a headrest interior material 130E3 surrounding the headrest frame. At least one or more among the seat bottom interior material 130E1, the seat back interior material 130E2, and the headrest interior material 130E3 may include an inner seat interior material and an outer seat interior material. The inner seat interior material may include a foam layer. The outer seat interior material may include a surface layer including a fiber or leather. The outer seat interior material may further include a base layer including a plastic material which supports the surface layer.

According to an embodiment of the present disclosure, the fifth sound generating device 31E may be disposed at at least one or more among a region between the seat back frame and the seat back interior material 130E2 and a region between the headrest frame and the headrest interior material 130E3, and thus, may vibrate at least one or more among the outer seat interior material of the seat back interior material 130E2 and the outer seat interior material of the headrest interior material 130E3.

According to an embodiment of the present disclosure, the fifth sound generating device 31E disposed at at least one or more of the driver seat DS and the passenger seat PS may be disposed at at least one or more among the region between the seat back frame and the seat back interior material 130E2 and the region between the headrest frame and the headrest interior material 130E3.

According to an embodiment of the present disclosure, the fifth sound generating device 31E disposed at at least one or more among the first to third rear seats BS1 to BS3 may be disposed between the headrest frame and the headrest interior material 130E3. For example, at least one or more among the first to third rear seats BS1 to BS3 may include at least one or more fifth sound generating devices 31E disposed between the headrest frame and the headrest interior material 130E3.

According to an embodiment of the present disclosure, the fifth sound generating device 31E vibrating the seat back interior materials 130E2 of at least one or more among the driver seat DS and the passenger seat PS may be configured to output a sound of about 150 Hz to about 20 kHz.

According to an embodiment of the present disclosure, the fifth sound generating device 31E vibrating the headrest interior materials 130E3 of at least one or more among the driver seat DS, the passenger seat PS, and the first to third rear seats BS1 to BS3 may be configured to output a sound of about 2 kHz to about 20 kHz, or may be configured to output a sound of about 150 Hz to about 20 kHz.

With reference to FIGS. 18 to 20, the sixth sound generating device 31F according to an embodiment of the present disclosure may be disposed between a handle frame and the handle interior material 130F and may vibrate the handle interior material 130F to output a sound based on a vibration of the handle interior material 130F. For example, the sixth sound generating device 31F may directly vibrate the handle interior material 130F to output a sound based on a vibration of the handle interior material 130F. According to an embodiment of the present disclosure, the sixth sound generating device 31F may include the sound generating devices 31 and 33 described above with reference to FIGS. 1, 2, and 4 to 8, and thus, its repetitive description may be omitted. For example, the sixth sound generating device 31F may be a handle speaker, a steering speaker, or a sixth vehicle speaker.

According to an embodiment of the present disclosure, the sixth sound generating device 31F may vibrate the handle interior material 130F to provide a driver with a sound based on a vibration of the handle interior material 130F. For example, the sixth sound generating device 31F may directly vibrate the handle interior material 130F to provide the driver with the sound based on the vibration of the handle interior material 130F. A sound output by the sixth sound generating device 31F may be a sound which is the same as or different from a sound output from each of the first to fifth sound generating devices 31A to 31E. For example, a sound output by the sixth sound generating device 31F may be a sound which is the same as or different from sounds output from at least one or more among the first to fifth sound generating devices 31A to 31E. In an embodiment of the present disclosure, the sixth sound generating device 31F may output a sound which is to be provided to only the driver. In another embodiment of the present disclosure, the sound output by the sixth sound generating device 31F and a sound output by each of the first to fifth sound generating devices 31A to 31E may be combined and output. For example, the sound output by the sixth sound generating device 31F and the sound output by at least one or more among the first to fifth sound generating devices 31A to 31E may be combined and output.

With reference to FIGS. 18 and 19, the seventh sound generating device 31G may be disposed between the floor interior material 130G and the floor panel among the main frame of the vehicle structure and may vibrate the floor interior material 130G to output a sound based on a vibration of the floor interior material 130G. For example, the seventh sound generating device 31G may directly vibrate the floor interior material 130G to output the sound based on the vibration of the floor interior material 130G.

The seventh sound generating device 31G may be disposed between the floor interior material 130G and the floor panel disposed between the front seats DS and PS and the third rear seat BS3. For example, the seventh sound generating device 31G may include the sound generating devices 31 and 33 described above with reference to FIGS. 1, 2, and 4 to 8, and thus, its repetitive description may be omitted. For example, the seventh sound generating device 31G may be configured to output a sound of about 150 Hz to about 20 kHz. For example, the seventh sound generating device 31G may be a floor speaker, a bottom speaker, an under speaker, or a seventh vehicle speaker.

With reference to FIGS. 18 to 22, the vehicle 10 according to an embodiment of the present disclosure may further include a second sound generating apparatus 30-2 which is disposed in the vehicle interior material 130 exposed at an indoor space. For example, the vehicle 10 according to an embodiment of the present disclosure may include only the second sound generating apparatus 30-2 instead of the first sound generating apparatus 30-1, or may include all of the first sound generating apparatus 30-1 and the second sound generating apparatus 30-2.

According to an embodiment of the present disclosure, the vehicle interior material 130 may further include a rear view mirror 130H, an overhead console 130I, a rear package interior material 130J, a glove box 130K, and a sun visor 130L.

The second sound generating apparatus 30-2 may include at least one or more sound generating devices 31H to 31L which are disposed at at least one of the rear view mirror 130H, the overhead console 130I, the rear package interior material 130J, the glove box 130K, and the sun visor 130L. For example, the second sound generating apparatus 30-2 may include at least one or more among eighth to twelfth sound generating devices 31H to 31L, and thus, may output sounds of one or more channels.

With reference to FIGS. 18 to 22, the eighth sound generating device 31H may be disposed at the rear view mirror 130H and may vibrate the rear view mirror 130H to output a sound based on a vibration of the rear view mirror 130H. For example, the eighth sound generating device 31H may be configured to directly vibrate the rear view mirror 130H to output the sound based on the vibration of the rear view mirror 130H.

The eighth sound generating device 31H may be disposed between a mirror housing connected to a vehicle body structure and the rear view mirror 130H supported by the mirror housing. According to an embodiment of the present disclosure, the eighth sound generating device 31H may include the sound generating devices 31 and 33 described above with reference to FIGS. 1 and 3 to 9, and thus, its repetitive description may be omitted. For example, the seventh sound generating device 31G may be configured to output a sound of about 150 Hz to about 20 kHz. For example, the eighth sound generating device 31H may be a mirror speaker or an eighth vehicle speaker.

With reference to FIGS. 19, 20, and 22, the ninth sound generating device 31I may be disposed at the overhead console 130I and may vibrate a console cover of the overhead console 130I to output a sound based on a vibration of an interior material (or the console cover) of the overhead console 130I. For example, the ninth sound generating device 31I may be configured to directly vibrate the console cover of the overhead console 130I to output the sound based on the vibration of the interior material (or the console cover) of the overhead console 130I.

According to an embodiment of the present disclosure, the overhead console 130I may include a console box buried (or embedded) into the roof panel, a lighting device disposed at the console box, and a console cover covering the lighting device and the console box.

The ninth sound generating device 31I may be disposed between the console cover and the console box of the overhead console 130I and may vibrate the console cover. For example, the ninth sound generating device 31I may be disposed between the console cover and the console box of the overhead console 130I and may directly vibrate the console cover. According to an embodiment of the present disclosure, the ninth sound generating device 31I may include the sound generating devices 31 and 33 described above with reference to FIGS. 1 and 4 to 9, and thus, its repetitive description may be omitted. For example, the ninth sound generating device 31I may be configured to output a sound of about 150 Hz to about 20 kHz. For example, the ninth sound generating device 31I may be a console speaker, a lighting speaker, or a ninth vehicle speaker.

For example, the vehicle 10 may further include a center lighting box disposed at a center region of the roof interior material 130C, a center lighting device disposed at the center lighting box, and a center lighting cover covering the center lighting device. In this case, the ninth sound generating device 31I may be further disposed between a center lighting cover and a center lighting box of the center lighting device and may additionally vibrate the center lighting cover.

With reference to FIGS. 18 and 19, the tenth sound generating device 31J may be disposed in the rear package interior material 130J and may vibrate the rear package interior material 130J to output a sound based on a vibration of the rear package interior material 130J. For example, the ninth sound generating device 31I may be configured to directly vibrate the rear package interior material 130J to output the sound based on the vibration of the rear package interior material 130J.

The rear package interior material 130J may be disposed behind (or back portion) the first to third rear seats BS1 to BS3. For example, a portion of the rear package interior material 130J may be disposed under a rear glass window 230C.

The tenth sound generating device 31J may be disposed at a rear surface of the rear package interior material 130J and may vibrate the rear package interior material 130J. For example, the tenth sound generating device 31J may directly vibrate the rear package interior material 130J. According to an embodiment of the present disclosure, the tenth sound generating device 31J may include the sound generating devices 31 and 33 described above with reference to FIGS. 1, 2, and 4 to 8, and thus, its repetitive description may be omitted. For example, the tenth sound generating device 31J may be a rear speaker or a tenth vehicle speaker.

According to an embodiment of the present disclosure, the rear package interior material 130J may include a first region corresponding to a rear portion of the first rear seat BS1, a second region corresponding to a rear portion of the second rear seat BS2, and a third region corresponding to a rear portion of the third passenger seat BS3. According to an embodiment of the present disclosure, the tenth sound generating device 31J may be disposed to vibrate at least one or more among the first to third regions of the rear package interior material 130J. For example, the tenth sound generating device 31J may be disposed at each of the first and second regions of the rear package interior material 130J, or may be disposed at each of the first to third regions of the rear package interior material 130J. For example, the tenth sound generating device 31J may be disposed at at least one or more among the first and second regions of the rear package interior material 130J, or may be disposed at at least one or more among the first to third regions of the rear package interior material 130J. For example, the tenth sound generating device 31J may be configured to output a sound at about 150 Hz to about 20 kHz. For example, the tenth sound generating device 31J configured to vibrate each of the first to third regions of the rear package interior material 130J may have the same sound output characteristic or different sound output characteristics. For example, the tenth sound generating device 31J configured to vibrate at least one or more among the first to third regions of the rear package interior material 130J may have the same sound output characteristic or different sound output characteristics.

With reference to FIGS. 18 to 20, the eleventh sound generating device 31K may be disposed at a glove box 130K and may vibrate the glove box 130K to output a sound based on a vibration of the glove box 130K. For example, the eleventh sound generating device 31K may directly vibrate the glove box 130K to output the sound based on the vibration of the glove box 130K.

The glove box 130K may be disposed at a dashboard 130A corresponding to a front portion of the passenger seat PS.

The eleventh sound generating device 31K may be disposed at an inner surface of the glove box 130K and may vibrate the glove box 130K. For example, the eleventh sound generating device 31K may directly vibrate the glove box 130K. According to an embodiment of the present disclosure, the eleventh sound generating device 31K may include the sound generating devices 31 and 33 described above with reference to FIGS. 1, 2, and 4 to 8, and thus, its repetitive description may be omitted. For example, the eleventh sound generating device 31K may be configured to output a sound of about 150 Hz to about 20 kHz, or may be one or more of a woofer, a mid-woofer, and a sub-woofer. For example, the eleventh sound generating device 31K may be a glove box speaker or an eleventh vehicle speaker.

With reference to FIG. 20, the twelfth sound generating device 31L may be disposed at the sun visor 130L and may vibrate the sun visor 130L to output a sound based on a vibration of the sun visor 130L. For example, the twelfth sound generating device 31L may directly vibrate the sun visor 130L to output the sound based on the vibration of the sun visor 130L.

The sun visor 130L may include a first sun visor 130L1 corresponding to the driver seat DS and a second sun visor 130L2 corresponding to the passenger seat PS.

The twelfth sound generating device 31L may be disposed at at least one or more among the first sun visor 130L1 and the second sun visor 130L2 and may vibrate at least one or more among the first sun visor 130L1 and the second sun visor 130L2. For example, the twelfth sound generating device 31L may directly vibrate at least one or more among the first sun visor 130L1 and the second sun visor 130L2. According to an embodiment of the present disclosure, the twelfth sound generating device 31L may include the sound generating devices 31 and 33 described above with reference to FIGS. 1, 2, and 4 to 8, and thus, its repetitive description may be omitted. For example, the twelfth sound generating device 31L may be configured to output a sound of about 150 Hz to about 20 kHz. For example, the twelfth sound generating device 31L may be a sun visor speaker or a twelfth vehicle speaker.

For example, at least one or more among the first sun visor 130L1 and the second sun visor 130L2 may further include a sun visor mirror. In this case, the twelfth sound generating device 31L may be configured to vibrate a sun visor mirror of at least one or more among the first sun visor 130L1 and the second sun visor 130L2. The twelfth sound generating device 31L may directly vibrate the sun visor mirror of at least one or more among the first sun visor 130L1 and the second sun visor 130L2. The twelfth sound generating device 31L vibrating the sun visor mirror may include the sound generating devices 31 and 33 described above with reference to FIGS. 1, 3, and 4 to 9, and thus, its repetitive description may be omitted.

With reference to FIGS. 18 to 22, the vehicle 10 according to an embodiment of the present disclosure may further include a third sound generating apparatus 30-3 disposed at the vehicle glass window 230. For example, the vehicle 10 according to an embodiment of the present disclosure may include the third sound generating apparatus 30-3 instead of at least one or more of the first and second sound generating apparatuses 30-1 and 30-2, or may include all of the first to third sound generating apparatuses 30-1 to 30-3.

The third sound generating apparatus 30-3 may include at least one or more sound generating devices 31M to 31P disposed at the vehicle glass window 230. For example, the third sound generating apparatus 30-3 may include at least one or more among thirteenth to sixteenth sound generating devices 31M to 31P, and thus, may output sounds of one or more channels. For example, the third sound generating apparatus 30-3 may be a transparent sound generating apparatus, a transparent speaker, or a transparent vehicle speaker.

At least one or more among the thirteenth to sixteenth sound generating devices 31M to 31P according to an embodiment of the present disclosure may include the transparent or semitransparent sound generating device 33 described above with reference to FIGS. 3 and 9, and thus, its repetitive description may be omitted. For example, when at least one or more among the thirteenth to sixteenth sound generating devices 31M to 31P include the sound generating device 33 described above with reference to FIG. 3, at least one or more among the thirteenth to sixteenth sound generating devices 31M to 31P may vibrate the vehicle glass window 230 to output a sound based on a vibration of the vehicle glass window 230. For example, one or more of the thirteenth to sixteenth sound generating devices 31M to 31P may directly vibrate the vehicle glass window 230 to output a sound based on a vibration of the vehicle glass window 230. For example, when at least one or more among the thirteenth to sixteenth sound generating devices 31M to 31P include the sound generating device 33 described above with reference to FIG. 9, at least one or more among the thirteenth to sixteenth sound generating devices 31M to 31P may output a sound by vibrating itself or self-vibration thereof.

According to an embodiment of the present disclosure, the vehicle glass window 230 may include a front glass window 230A, a side glass window (or side surface glass window) 230B, and a rear glass window (or rear portion glass window) 230C. According to an embodiment of the present disclosure, the vehicle glass window 230 may further include a roof glass window 230D. For example, when the vehicle 10 includes the roof glass window 230D, a portion of a region of the roof interior material 130C and the roof frame described above may be replaced with the roof glass window 230D. For example, when the vehicle 10 includes the roof glass window 230D, the third sound generating device 31C may be configured to vibrate a periphery portion of the roof interior material 130C surrounding the roof glass window 230D.

With reference to FIGS. 18 to 20, the thirteenth sound generating device 31M according to an embodiment of the present disclosure may be disposed at the front glass window 230A and may output a sound based on a vibration thereof or may vibrate the front glass window 230A to output a sound based on a vibration of the front glass window 230A. For example, the thirteenth sound generating device 31M may directly vibrate the front glass window 230A to output the sound based on the vibration of the front glass window 230A.

According to an embodiment of the present disclosure, the front glass window 230A may include a first region corresponding to the driver seat DS, a second region corresponding to the passenger seat PS, and a third region (or a middle region) between the first region and the second region. For example, the thirteenth sound generating device 31M may be disposed at at least one or more among the first to third regions. For example, the thirteenth sound generating device 31M may be disposed at each of the first and second regions of the front glass window 230A, or may be disposed at each of the first to third regions. For example, the thirteenth sound generating device 31M may be disposed at at least one or more among the first and second regions of the front glass window 230A, or may be disposed at at least one or more among the first to third regions. For example, the thirteenth sound generating device 31M disposed in each of the first to third regions of the front glass window 230A may have the same sound output characteristic or different sound output characteristics. For example, the thirteenth sound generating device 31M disposed at at least one or more among the first to third regions of the front glass window 230A may have the same sound output characteristic or different sound output characteristics. For example, the thirteenth sound generating device 31M may be configured to output a sound of about 150 Hz to about 20 kHz. For example, the thirteenth sound generating device 31M may be a front window speaker or a thirteenth vehicle speaker.

With reference to FIGS. 19 to 21 and 23, the fourteenth sound generating device 31N according to an embodiment of the present disclosure may be disposed at the side glass window 230B and may output a sound based on a vibration thereof or may vibrate the side glass window 230B to output a sound based on a vibration of the side glass window 230B. For example, the fourteenth sound generating device 31N may directly vibrate the side glass window 230B to output the sound based on the vibration of the side glass window 230B.

According to an embodiment of the present disclosure, the side glass window 230B may include a first side glass window (or a left front window) 230B1, a second side glass window (or a right front window) 230B2, a third side glass window (or a left rear window) 230B3, and a fourth side glass window (or a right rear window) 230B4.

According to an embodiment of the present disclosure, the fourteenth sound generating device 31N may be disposed at at least one or more among the first to fourth side glass windows 230B1 to 230B4. For example, at least one or more among the first to fourth side glass windows 230B1 to 230B4 may include at least one or more fourteenth sound generating devices 31N.

For example, the fourteenth sound generating device 31N may be disposed at at least one or more among the first to fourth side glass windows 230B1 to 230B4 and may output a sound based on a vibration thereof, or may vibrate a corresponding side glass window of the first to fourth side glass windows 230B1 to 230B4 to output the sound S. For example, the fourteenth sound generating device 31N may directly vibrate the first to fourth side glass windows 230B1 to 230B4 to output a sound. For example, the fourteenth sound generating device 31N may be configured to output a sound of about 150 Hz to about 20 kHz. For example, the fourteenth sound generating device 31N disposed at at least one or more among the first to fourth side glass windows 230B1 to 230B4 may have the same sound output characteristic or different sound output characteristics. For example, the fourteenth sound generating device 31N may be configured to output a sound of about 150 Hz to about 20 kHz. For example, the fourteenth sound generating device 31N may be a side window speaker or a fourteenth vehicle speaker.

With reference to FIG. 18, the fifteenth sound generating device 31O according to an embodiment of the present disclosure may be disposed at the rear glass window 230C and may output a sound by vibrating itself, or may vibrate the rear glass window 230C to output a sound based on a vibration of the rear glass window 230C. For example, the fifteenth sound generating device 31O may directly vibrate the rear glass window 230C to output the sound based on the vibration of the rear glass window 230C.

According to an embodiment of the present disclosure, the rear glass window 230C may include a first region corresponding to a rear portion of the first rear seat BS1, a second region corresponding to a rear portion of the second rear seat BS2, and a third region corresponding to a rear portion of the third rear seat BS3. According to an embodiment of the present disclosure, the fifteenth sound generating device 31O may be disposed at each of first to third regions of the rear glass window 230C. For example, the fifteenth sound generating device 31O may be disposed at at least one or more among the first to third regions of the rear glass window 230C. For example, the fifteenth sound generating device 31O may be disposed at each of the first and second regions of the rear glass window 230C, or may be disposed at each of the first to third regions. For example, the fifteenth sound generating device 31O may be disposed at at least one or more among the first and second regions of the rear glass window 230C, or may be disposed at at least one or more among the first to third regions. For example, the fifteenth sound generating device 31O may be configured to output a sound of about 150 Hz to about 20 kHz. For example, the fifteenth sound generating device 31O disposed at each of the first to third regions of the rear glass window 230C may have the same sound output characteristic or different sound output characteristics. For example, the fifteenth sound generating device 31O disposed at at least one or more among the first to third regions of the rear glass window 230C may have the same sound output characteristic or different sound output characteristics. For example, the fifteenth sound generating device 31O disposed at at least one or more among the first and second regions of the rear glass window 230C may be configured to output a sound of about 150 Hz to about 20 kHz, or may be one or more of a woofer, a mid-woofer, and a sub-woofer. For example, the fifteenth sound generating device 31O may be a rear window speaker or a fifteenth vehicle speaker.

With reference to FIG. 22, the sixteenth sound generating device 31P according to an embodiment of the present disclosure may be disposed at the roof glass window 230D and may output a sound by vibrating itself, or may vibrate the roof glass window 230D to output a sound based on a vibration of the roof glass window 230D. For example, the sixteenth sound generating device 31P may directly vibrate the roof glass window 230D to output the sound based on the vibration of the roof glass window 230D.

The roof glass window 230D according to an embodiment of the present disclosure may be disposed on the front seats DS and PS of the vehicle 10. For example, the sixteenth sound generating device 31P may be disposed at a middle region of the roof glass window 230D. For example, the sixteenth sound generating device 31P may be configured to output a sound of about 150 Hz to about 20 kHz. For example, the sixteenth sound generating device 31P may be a roof window speaker or a sixteenth vehicle speaker.

According to another embodiment of the present disclosure, the roof glass window 230D may be disposed on the front seats DS and PS of the vehicle 10, or may be disposed on the front seats DS and PS and the rear seats BS1 to BS3. For example, the roof glass window 230D may include a first region corresponding to the front seats DS and PS and a second region corresponding to the rear seats BS1 to BS3. Also, the roof glass window 230D may include a third upper region between the first upper region and the second upper region. For example, the sixteenth sound generating device 31P may be disposed at at least one or more among the first and second regions, or may be disposed at at least one or more among the first to third regions of the roof glass window 230D. For example, the sixteenth sound generating device 31P may be configured to output a sound of about 150 Hz to about 20 kHz. For example, the sixteenth sound generating device 31P disposed at at least one or more among the first to third regions of the roof glass window 230D may have the same sound output characteristic or different sound output characteristics.

With reference to FIGS. 18 to 20, the vehicle 10 according to an embodiment of the present disclosure may further include a woofer speaker WS which is disposed at at least one or more among a dashboard 130A, a door frame, and a rear package interior material 130J.

The woofer speaker WS according to an embodiment of the present disclosure may include at least one or more among a woofer, a mid-woofer, and a sub-woofer. For example, the woofer speaker WS may be a speaker which outputs a sound of about 60 Hz to about 150 Hz. Therefore, the woofer speaker WS may output a sound of about 60 Hz to about 150 Hz, and thus, may enhance a low-pitched sound band characteristic of a sound which is output to an indoor space.

According to an embodiment of the present disclosure, the woofer speaker WS may be disposed at at least one or more among first and second regions of the dashboard 130A. According to an embodiment of the present disclosure, the woofer speaker WS may be disposed at each of first to fourth door frames of the door frame and may be exposed at a lower region among each of the first to fourth door interior materials 130D1 to 130D4 of the door interior material 130D. For example, the woofer speaker WS may be disposed at at least one or more among the first to fourth door frames of the door frame and may be exposed at the lower regions of at least one or more among the first to fourth door interior materials 130D1 to 130D4 of the door interior material 130D. According to an embodiment of the present disclosure, the woofer speaker WS may be disposed at at least one or more among the first and second regions of the rear package interior material 130J. For example, the fourth sound generating device 31D disposed at the lower region among each of the first to fourth door interior materials 130D1 to 130D4 may be replaced by the woofer speaker WS. For example, the fourth sound generating device 31D disposed in the lower regions of at least one or more among the first to fourth door interior materials 130D1 to 130D4 may be replaced by the woofer speaker WS.

With reference to FIGS. 18 to 20, the vehicle 10 according to an embodiment of the present disclosure may further include an instrument panel device 150 and an infotainment device 170.

The instrument panel device 150 according to an embodiment of the present disclosure may be disposed at a first region of the dashboard 130A to face the driver seat DS. The instrument panel device 150 may include a display (or a first display) 151 which is disposed at the first region of the dashboard 130A to face the driver seat DS.

The first display 151 may include the display apparatus 50 described above with reference to FIGS. 16 and 17, and thus, like reference numerals refer to like elements and their repetitive descriptions may be omitted. For example, the instrument panel device 150 may output a sound, generated based on a vibration of a display panel based on a vibration of at least one or more sound generating apparatuses 30 included in the first display 151, toward the driver seat DS. For example, the sound generating apparatus 30 disposed in the first display 151 of the instrument panel device 150 may be configured to output a sound of about 150 Hz to about 20 kHz.

The infotainment device 170 may be disposed at a third region of the dashboard 130A.

The infotainment device 170 according to an embodiment of the present disclosure may be fixed on the third region of the dashboard 130A in an upright state.

According to another embodiment of the present disclosure, the infotainment device 170 may be installed to be raised and lowered at the third region of the dashboard 130A. For example, the infotainment device 170 may be received or accommodated into the dashboard 130A based on the turn-off of the vehicle 10 or the manipulation of a vehicle passenger and may protrude to a region on the dashboard 130A based on the turn-on of the vehicle 10 or the manipulation of the vehicle passenger.

The infotainment device 170 according to an embodiment of the present disclosure may include a display (or a second display) 171 disposed at the third region of the dashboard 130A, and a display elevation part.

The second display 171 may include the display apparatus 50 described above with reference to FIGS. 16 and 17, and thus, like reference numerals refer to like elements and their repetitive descriptions may be omitted. For example, the infotainment device 170 may output a sound, generated based on a vibration of a display panel based on a vibration of at least one or more sound generating apparatuses 30 included in the second display 171 toward the driver seat DS. For example, the sound generating apparatus 30 disposed at the second display 171 of the infotainment device 170 may be configured to output a sound of about 150 Hz to about 20 kHz.

The display elevation part may be disposed at the third region of the dashboard 130A and may support the second display 171 so as to be raised and lowered. For example, the display elevation part may raise the second display 171 based on the turn-on of the vehicle or the manipulation of the vehicle passenger, thereby allowing the second display 171 to protrude to a region on the dashboard 130A. Also, the display elevation part may lower the second display 171 based on the turn-off of the vehicle 10 or the manipulation of the vehicle passenger, thereby allowing the second display 171 to be received or accommodated into the dashboard 130A.

The vehicle 10 according to an embodiment of the present disclosure may output a sound to one or more of the indoor space and the outside through at least one or more among the first sound generating apparatus 30-1 disposed between the vehicle structure and the vehicle interior material 130, the second sound generating apparatus 30-2 disposed at the vehicle interior material 130 exposed at the indoor space, and the third sound generating apparatus 30-3 disposed at the vehicle glass window 230, and thus, may output the sound by a vehicle interior material as a vibration plate or a sound vibration plate, thereby outputting a multichannel surround stereo sound. Also, the vehicle 10 according to an embodiment of the present disclosure may output a sound by, as a vibration plate or a sound vibration plate, a display panel of at least one of the displays 151 and 171 of at least one or more among the instrument panel device 150 and the infotainment device 170 and may output a more realistic multichannel surround stereo sound through each of the first to third sound generating apparatuses 30-1 to 30-3, the instrument panel device 150, and the infotainment device 170.

A sound generating apparatus for vehicles according to an embodiment of the present disclosure will be described below.

According to an embodiment of the present disclosure, a sound generating apparatus for vehicles may include a sound generating device to be covered by a vehicle interior material of a vehicle, the sound generating device may be configured to vibrate the vehicle interior material.

According to some embodiments of the present disclosure, the sound generating device may include a sound generator configured to output a sound, and the sound generator may include a base frame, a bobbin on the base frame and configured to be connected to the vehicle interior material, and a coil wound around the bobbin.

According to some embodiments of the present disclosure, the sound generating device may include a supporting member configured to be supported by a vehicle structure of the vehicle and support the base frame of the sound generator, and a connection member disposed at the supporting member to surround the sound generator, and the connection member may be configured to be connected to the vehicle interior material.

According to some embodiments of the present disclosure, the supporting member may further include a hole accommodating a portion of the base frame.

According to some embodiments of the present disclosure, the sound generating device may include a sound generator including a piezoelectric vibration portion, and the sound generator may be configured to be connected to the vehicle interior material by an adhesive member.

According to some embodiments of the present disclosure, the sound generating device may include a first plate, a sound generator configured to be connected to the first plate and including a piezoelectric vibration portion, a second plate at a rear surface of the sound generator, and a connection member between the first plate and the second plate and surround the sound generator, and the first plate may be configured to be connected to the vehicle interior material.

According to some embodiments of the present disclosure, the sound generating device may include a plate, a sound generator configured to be connected to the plate and including a piezoelectric vibration portion, and a connection member disposed at the plate to surround the sound generator, and the connection member may be configured to be connected to the vehicle interior material.

According to some embodiments of the present disclosure, a sound generating apparatus for vehicles may further include a transparent sound generating device to be disposed at a vehicle glass window of the vehicle, the transparent sound generating device may include a sound generator including a piezoelectric vibration portion, and the sound generator may be configured to be connected to the vehicle glass window by an adhesive member.

According to some embodiments of the present disclosure, a sound generating apparatus for vehicles may further include a transparent sound generating device at the vehicle glass window, the transparent sound generating device may include a plate, a sound generator configured to be connected to the plate and including a piezoelectric vibration portion, and a connection member disposed at the plate to surround the sound generator, and the connection member may be configured to be connected to the vehicle glass window.

According to some embodiments of the present disclosure, the piezoelectric vibration portion may include a plurality of inorganic material portions including a piezoelectric characteristic, and an organic material portion configured to be connected between the plurality of inorganic material portions.

According to some embodiments of the present disclosure, the piezoelectric vibration portion may include a plurality of vibration devices spaced apart from one another, and the sound generating device may include a first protection member at a first surface of the piezoelectric vibration portion, and a second protection member at a second surface opposite to the first surface of the piezoelectric vibration portion.

According to some embodiments of the present disclosure, each of the plurality of vibration devices may include a plurality of inorganic material portions including a piezoelectric characteristic, an organic material portion configured to be connected between the plurality of inorganic material portions, a first electrode portion between the first protection member and each of the organic material portion and the plurality of inorganic material portions, and a second electrode portion between the second protection member and each of the organic material portion and the plurality of inorganic material portions.

According to some embodiments of the present disclosure, the vibration devices may be configured to be arranged on the same plane in an i×j form, where i is a natural number of 2 or more, and j is a natural number which is equal to i or 1 or more.

According to some embodiments of the present disclosure, a width of each of the organic material portions progressively may decrease in a direction from a center portion to peripheries of the piezoelectric vibration portion.

According to some embodiments of the present disclosure, the organic material portion has modulus and viscoelasticity that are lower than those of the inorganic material portion.

According to some embodiments of the present disclosure, a size of the piezoelectric vibration portion is configured to adjust by one or more of a piezoelectric characteristic and a flexible characteristic.

A vehicle according to an embodiment of the present disclosure will be described below.

According to an embodiment of the present disclosure, a vehicle may include a vehicle interior material covering a vehicle structure, and at least one sound generating apparatus disposed at the vehicle interior material, the vehicle interior material may be configured to vibrate according to a vibration of the sound generating apparatus and to output a sound.

According to some embodiments of the present disclosure, the vehicle interior material may include one or more materials of plastic, a fiber, leather, wood, cloth, metal, and glass.

According to some embodiments of the present disclosure, the sound generating apparatus may include at least one or more among a first sound generating apparatus disposed between the vehicle structure and the vehicle interior material, and a second sound generating apparatus disposed at the vehicle interior material.

According to some embodiments of the present disclosure, the vehicle interior material may include at least one or more among a dashboard, a pillar interior material, a roof interior material, a door interior material, a seat interior material, a handle interior material, and a floor interior material, and the first sound generating apparatus may be configured to vibrate at least one or more among the dashboard, the pillar interior material, the roof interior material, the door interior material, the seat interior material, the handle interior material, and the floor interior material. According to some embodiments of the present disclosure, the vehicle interior material may include at least one or more among a dashboard, a pillar interior material, a roof interior material, a door interior material, a seat interior material, a handle interior material, and a floor interior material, and the first sound generating apparatus may be configured to vibrate the vehicle interior material.

According to some embodiments of the present disclosure, the vehicle interior material may include at least one or more of a rear view mirror, an overhead console, a rear package interior material, a glove box, and a sun visor, and the second sound generating apparatus may be configured to vibrate at least one or more among the rear view mirror, the overhead console, the rear package interior material, the glove box, and the sun visor. According to some embodiments of the present disclosure, the vehicle interior material may include at least one or more of a rear view mirror, an overhead console, a rear package interior material, a glove box, and a sun visor, and the second sound generating apparatus may be configured to vibrate the vehicle interior material.

According to some embodiments of the present disclosure, a vehicle may further include a vehicle glass window, and a transparent sound generating apparatus at the vehicle glass window.

According to some embodiments of the present disclosure, the vehicle glass window may include a front glass window and a side glass window and further comprises at least one or more of a rear glass window and a roof glass window, and the transparent sound generating apparatus may be configured to be disposed at at least one or more among the front glass window, the side glass window, the rear glass window, and the roof glass window. According to some embodiments of the present disclosure, the vehicle glass window may include a front glass window and a side glass window and further comprises at least one or more of a rear glass window and a roof glass window, and the transparent sound generating apparatus may be configured to be disposed at the vehicle glass window.

According to some embodiments of the present disclosure, at least one or more among the first sound generating apparatus and the second sound generating apparatus may include the sound generating apparatus for vehicles, the sound generating apparatus for vehicles may include a sound generating device covered by a vehicle interior material of a vehicle, the sound generating device may be configured to vibrate the vehicle interior material.

According to some embodiments of the present disclosure, at least one or more among the first sound generating apparatus and the second sound generating apparatus may include a sound generating device covered by the vehicle interior material.

According to some embodiments of the present disclosure, the sound generating device may include a sound generator including a piezoelectric vibration portion, and the sound generator may be configured to be connected to the vehicle interior material by an adhesive member.

According to some embodiments of the present disclosure, the sound generating device may include a first plate, a sound generator configured to be connected to the first plate and including a piezoelectric vibration portion, a second plate at a rear surface of the sound generator, and a connection member between the first plate and the second plate to surround the sound generator, and the first plate may be configured to be connected to the vehicle interior material by an adhesive member.

According to some embodiments of the present disclosure, the sound generating device may include a plate, a sound generator connected to the plate, the sound generator including a piezoelectric vibration portion, and a connection member disposed at the plate to surround the sound generator and configured to be connected to the vehicle interior material.

According to some embodiments of the present disclosure, a vehicle may further include a vehicle glass window, and a third sound generating apparatus disposed at the vehicle glass window and including a sound generating device, the sound generating device may include a sound generator including a piezoelectric vibration portion, and the sound generator may be connected to the vehicle glass window by an adhesive member.

According to some embodiments of the present disclosure, a vehicle may further include a vehicle glass window, and a third sound generating apparatus disposed at the vehicle glass window and including a sound generating device, the sound generating device may include a plate, a sound generator configured to be connected to the plate and including a piezoelectric vibration portion, and a connection member disposed at the plate to surround the sound generator and configured to be connected to the vehicle glass window.

According to some embodiments of the present disclosure, the piezoelectric vibration portion may include a plurality of inorganic material portions including a piezoelectric characteristic, and an organic material portion configured to be connected between the plurality of inorganic material portions.

According to some embodiments of the present disclosure, the piezoelectric vibration portion may include a plurality of vibration devices configured to be spaced apart from one another, and the sound generating device may include a first protection member at a first surface of the piezoelectric vibration portion, and a second protection member at a second surface opposite to the first surface of the piezoelectric vibration portion.

According to some embodiments of the present disclosure, each of the plurality of vibration devices may include a plurality of inorganic material portions including a piezoelectric characteristic, an organic material portion configured to be connected between the plurality of inorganic material portions, a first electrode portion between the first protection member and each of the organic material portion and the plurality of inorganic material portions, and a second electrode portion between the second protection member and each of the organic material portion and the plurality of inorganic material portions.

According to some embodiments of the present disclosure, a vehicle may further include an instrument panel device including a display, the display may include a display panel, and a vibration device at a rear surface of the display panel, and the instrument panel device may be configured to be output a sound according to a vibration of the display panel.

According to some embodiments of the present disclosure, a vehicle may further include an infotainment device disposed at a dashboard, the infotainment device including a display, the display may include a display panel, and a vibration device at a rear surface of the display panel, and the infotainment device may be configured to be output a sound according to a vibration of the display panel.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A sound generating apparatus for vehicles, comprising:
   a sound generator including a sound generating member configured to vibrate a vehicle interior material of a vehicle,
   wherein the sound generating member comprises:
      a plurality of vibration generator spaced apart from one another;
      a first protection member at a first surface of the plurality of vibration generators; and
      a second protection member at a second surface opposite to the first surface of the plurality of vibration generators.

2. The sound generating apparatus of claim 1, wherein the sound generating member further comprises:
   a first adhesive layer between the plurality of vibration generators and the first protection member; and
   a second adhesive layer between the plurality of vibration generators and the second protection member.

3. The sound generating apparatus of claim 1, wherein the first and second adhesive layers are connected to each other between the plurality of vibration generators.

4. The sound generating apparatus of claim 1, wherein the sound generating member is connected to the vehicle interior material by an adhesive member.

5. The sound generating apparatus of claim 1, wherein the sound generator further comprises a plate between the sound generating member and the vehicle interior material.

6. The sound generating apparatus of claim 5, wherein the sound generator further comprises:
   a first adhesive member between the plate and the sound generating member; and
   a second adhesive member between the plate and the vehicle interior material.

7. The sound generating apparatus of claim 5, wherein the plate comprises at least one of a plastic material, a metal material, and a wood material.

8. The sound generating apparatus of claim 1, wherein the sound generator further comprises:
   a first plate between the sound generating member and the vehicle interior material and connected to the sound generating member;
   a second plate at a rear surface of the sound generating member; and
   a connection member between the first plate and the second plate to surround the sound generating member.

9. The sound generating apparatus of claim 8, wherein the second plate is spaced apart from a rear surface of the sound generating member.

10. The sound generating apparatus of claim 8, wherein:
    the first plate comprises a material which is the same as or different from that of the second plate; and/or
    the first plate comprises at least one of a plastic material, a metal material, and a wood material.

11. The sound generating apparatus of claim 8, wherein the sound generator further comprises:
    a first adhesive member between the first plate and the sound generating member; and
    a second adhesive member between the first plate and the vehicle interior material.

12. The sound generating apparatus of claim 1, wherein the sound generator further comprises:
    a plate configured to support the sound generating member; and
    a connection member at the plate to surround the sound generating member, and
    wherein the connection member is configured to be connected to the vehicle interior material.

13. The sound generating apparatus of claim 12, wherein the sound generating member is spaced apart from the vehicle interior material.

14. The sound generating apparatus of claim 12, wherein:
    the plate comprises a transparent material or a semitransparent material; and/or
    the sound generator is configured to be transparent or semitransparent.

15. The sound generating apparatus of claim 1, wherein the plurality of vibration generators are configured to be arranged on the same plane in an i×j form (where i is a natural number of 2 or more, and j is a natural number which is equal to i or 1 or more).

16. The sound generating apparatus of claim 1, wherein each of the plurality of vibration generators comprises:
    a piezoelectric vibration portion;
    a first electrode portion between the first protection member and the piezoelectric vibration portion; and
    a second electrode portion between the second protection member and the piezoelectric vibration portion.

17. The sound generating apparatus of claim 16, wherein the piezoelectric vibration portion comprises:
    a plurality of inorganic material portions including a piezoelectric characteristic; and
    a plurality of organic material portions configured to be connected between the plurality of inorganic material portions.

18. The sound generating apparatus of claim 17, wherein a width of each of the plurality of organic material portions gradually decreases from a center portion of the piezoelectric vibration portion toward both end portions of the piezoelectric vibration portion.

19. The sound generating apparatus of claim 17, wherein the plurality of organic material portions have lower modulus and viscoelasticity than the plurality of inorganic material portions.

20. A display apparatus, comprising:
a display panel configured to display an image; and
at least one sound generating apparatus configured to vibrate the display panel,
wherein the at least one sound generating apparatus comprises the sound generating apparatus for vehicles of claim 1.

21. The display apparatus of claim 20, wherein the plurality of vibration generators in the at least one sound generating apparatus are configured to be arranged on the same plane in an i×j form (where i is a natural number of 2 or more, and j is a natural number which is equal to i or 1 or more).

22. The display apparatus of claim 20, wherein each of the plurality of vibration generators in the at least one sound generating apparatus comprises:
a piezoelectric vibration portion;
a first electrode portion between the first protection member and the piezoelectric vibration portion; and
a second electrode portion between the second protection member and the piezoelectric vibration portion.

23. The display apparatus of claim 22, wherein the piezoelectric vibration portion comprises:
a plurality of inorganic material portions including a piezoelectric characteristic; and
a plurality of organic material portions configured to be connected between the plurality of inorganic material portions.

24. The display apparatus of claim 22, wherein a width of each of the plurality of organic material portions gradually decreases from a center portion of the piezoelectric vibration portion toward both end portions of the piezoelectric vibration portion.

25. The display apparatus of claim 22, wherein the plurality of organic material portions have lower modulus and viscoelasticity than the plurality of inorganic material portions.

26. A vehicle, comprising:
a vehicle interior material covering a vehicle structure; and
a sound generating apparatus configured to vibrate the vehicle interior material to output a sound,
wherein the sound generating apparatus comprises the sound generating apparatus for vehicles of claim 1.

27. The vehicle of claim 26, wherein the sound generating apparatus comprises at least one or more of a first sound generating apparatus disposed between the vehicle structure and the vehicle interior material, and a second sound generating apparatus disposed at the vehicle interior material.

28. The vehicle of claim 26, further comprising:
a vehicle glass window; and
a transparent sound generating apparatus disposed at the vehicle glass window.

29. The vehicle of claim 26, wherein the plurality of vibration generators in the sound generating apparatus are configured to be arranged on the same plane in an i×j form (where i is a natural number of 2 or more, and j is a natural number which is equal to i or 1 or more).

30. The vehicle of claim 26, wherein each of the plurality of vibration generators in the sound generating apparatus comprises:
a piezoelectric vibration portion;
a first electrode portion between the first protection member and the piezoelectric vibration portion; and
a second electrode portion between the second protection member and the piezoelectric vibration portion.

31. The vehicle of claim 30, wherein the piezoelectric vibration portion comprises:
a plurality of inorganic material portions including a piezoelectric characteristic; and
a plurality of organic material portions configured to be connected between the plurality of inorganic material portions.

32. The vehicle of claim 31, wherein a width of each of the plurality of organic material portions gradually decreases from a center portion of the piezoelectric vibration portion toward both end portions of the piezoelectric vibration portion.

33. The vehicle of claim 31, wherein the plurality of organic material portions have lower modulus and viscoelasticity than the plurality of inorganic material portions.

34. The vehicle of claim 26, wherein:
the vehicle interior material comprises one or more materials of plastic, a fiber, leather, wood, cloth, metal, and glass; or
the vehicle interior material comprises at least one or more of a dashboard, a pillar interior material, a roof interior material, a door interior material, a seat interior material, a handle interior material, a floor interior material, a rear view mirror, an overhead console, a rear package interior material, a glove box, and a sun visor.

35. The vehicle of claim 26, further comprising one or more of an instrument panel device including a display and an infotainment device including a display which is at a dashboard,
wherein the display comprises:
a display panel; and
a vibration device at a rear surface of the display panel, and
wherein the instrument panel device is configured to be output a sound according to a vibration of the display panel.

* * * * *